United States Patent
Liu et al.

(10) Patent No.: US 12,472,501 B2
(45) Date of Patent: Nov. 18, 2025

(54) MAGNETIC SYSTEM FOR DETECTION AND SORTING OF CELLS

(71) Applicant: Microsensor Labs, LLC, Chicago, IL (US)

(72) Inventors: Peng Liu, Chicago, IL (US); Zerikhun Filatov, Chicago, IL (US)

(73) Assignee: Microsensor Labs, LLC, Chicago, IL (US)

( * ) Notice: Subject to any disclaimer, the term of this patent is extended or adjusted under 35 U.S.C. 154(b) by 1429 days.

(21) Appl. No.: 17/027,253

(22) Filed: Sep. 21, 2020

(65) Prior Publication Data

US 2021/0001339 A1 Jan. 7, 2021

Related U.S. Application Data

(63) Continuation-in-part of application No. 15/862,394, filed on Jan. 4, 2018, now Pat. No. 10,780,444.

(60) Provisional application No. 62/442,818, filed on Jan. 5, 2017.

(51) Int. Cl.
| | |
|---|---|
| *B01L 1/00* | (2006.01) |
| *B01L 3/00* | (2006.01) |
| *C12M 1/00* | (2006.01) |
| *C12M 1/26* | (2006.01) |
| *G01N 15/0227* | (2024.01) |
| *G01N 15/10* | (2024.01) |
| *G01N 15/1031* | (2024.01) |
| *G01N 33/543* | (2006.01) |
| *G06T 7/70* | (2017.01) |
| *G06V 20/69* | (2022.01) |

(52) U.S. Cl.
CPC ....... *B01L 3/502761* (2013.01); *C12M 33/00* (2013.01); *C12M 47/04* (2013.01); *G01N 15/0227* (2013.01); *G01N 15/1031* (2013.01); *G01N 33/54326* (2013.01); *G06T 7/70* (2017.01); *G06V 20/698* (2022.01); *B01L 2200/0668* (2013.01); *B01L 2300/0663* (2013.01); *B01L 2300/0816* (2013.01); *B01L 2400/043* (2013.01); *G01N 2015/1028* (2024.01); *G06T 2207/10056* (2013.01); *G06T 2207/30024* (2013.01); *G06T 2207/30072* (2013.01)

(58) Field of Classification Search
None
See application file for complete search history.

(56) References Cited

U.S. PATENT DOCUMENTS

| | | |
|---|---|---|
| 2004/0262210 A1 | 12/2004 | Westervelt |
| 2006/0020371 A1 | 1/2006 | Ham |
| 2008/0246470 A1 | 10/2008 | Kahlman |
| 2010/0006439 A1 | 1/2010 | Ham |
| 2010/0255556 A1 | 10/2010 | Hunt |
| 2011/0018532 A1 | 1/2011 | Florescu |
| 2014/0248632 A1 | 9/2014 | Kopelman |
| 2015/0219544 A1 | 8/2015 | Liu |
| 2015/0253284 A1 | 9/2015 | Sudarsan |

FOREIGN PATENT DOCUMENTS

| | | |
|---|---|---|
| EP | 2073016 A1 | 6/2009 |
| EP | 2488866 | 4/2015 |
| WO | 03039753 A1 | 5/2003 |

OTHER PUBLICATIONS

Kagan, M., et al. "A sample preparation and analysis system for identification of circulating tumor cells." Journal of Clinical Ligand Assay 25 (2002): 104-10. (Year: 2002).*
Riethdorf, S., et al. "Detection of circulating tumor cells in peripheral blood of patients with metastatic breast cancer: a validation study of the CellSearch system." Clinical cancer research 13.3 (2007): 920-928. (Year: 2007).*
Schultz, M. L., et al. "High resolution shading correction." Journal of Histochemistry & Cytochemistry 22.7 (1974): 751-754 (Year: 1974).*
Valente, J., et al. "A magneto-electro-optical effect in a plasmonic nanowire material." Nature communications 6.1 (2015): 7021. (Year: 2015).*
Lee, Hakho, et al. "Integrated cell manipulation system-CMOS/microfluidic hybrid." Lab on a Chip 7.3 (2007): 331-337.
Lee, Hakho, et al. "An IC/microfluidic hybrid microsystem for 2D magnetic manipulation of individual biological cells." Solid-Slate Circuits Conference, 2005. ISSCC. 2005 IEEE International.
Lee, Hakho, et al. "IC/microfluidic hybrid system for magnetic manipulation of biological cells." IEEE Journal of Solid-State Circuits 41.6 (2006): 1471-1480.
Liu, Peng. (2012). "Magnetic Relaxation Detector for Microbead Labels." IEEE J Solid-Slate Circuits. 47(4): 1056-1064.
Liu, Yong, et al. "IC/microfluidic hybrid system for biology_" Bipolar/BiCMOS Circuits and Technology Meeting, 2005. Proceedings of the. IEEE, 2005.
PCT International Search Report for PCT Application No. PCT/US2018/012340, (5 pages).

(Continued)

*Primary Examiner* — Ellen J Marcsisin
(74) *Attorney, Agent, or Firm* — Lempia Summerfield Katz LLC

(57) ABSTRACT

A system and method for detection of cells and sorting of cells are disclosed. Target cells, such as circulating tumor cells (CTCs) or antigen-specific antibody producing circulating memory B cells from COVID-19 patients, may be of interest. Magnetic beads may be bound to the target cells. After which, the bead-bound target cells may be identified using an applied magnetic field. In one example, magnetic sensors may be used to detect movement of the bead-bound target cells responsive to an applied magnetic field. In another example, an optical sensor may be used to detect movement of the bead-bound target cells responsive to an applied magnetic field. Further, separate from identification of the target cells, the bead-bound target cells may be sorted using an applied magnetic field. In this way, a magnetic field may be used for target cell identification and target cell sorting in order to detect and collect target cells of interest at the single-cell resolution.

21 Claims, 67 Drawing Sheets

(56) References Cited

OTHER PUBLICATIONS

PCT Written Opinion for PCT Application No. PCT/US2018/012340, (7 pages).
Reyes, Darwin R., et al. "Micro total analysis systems. 1. Introduction, theory, and technology_" Analytical chemistry 74.12 (2002): 2623-2636.
US Office Action for U.S. Appl. No. 14/171,661, mailed Apr. 30, 2015, (17 pages).
US Office Action for U.S. Appl. No. 14/171,661, mailed Aug. 27, 2015, (16 pages).
US Office Action for U.S. Appl. No. 15/862,394, mailed May 7, 2019, (17 pages).
US Office Action for U.S. Appl. No. 15/862,394, mailed Dec. 16, 2019, (27 pages).

\* cited by examiner arrowhead: metal wires;
arrow: reference points

On-chip Bead Manipulation

MAGNETIC SYSTEM FOR DETECTION AND SORTING OF CELLS

REFERENCE TO RELATED APPLICATIONS

This application is a continuation-in-part of U.S. application Ser. No. 15/862,394 (now U.S. Pat. No. 10,780,444), which claims the benefit of U.S. Provisional Application No. 62/442,818 filed on Jan. 5, 2017, the entirety of U.S. application Ser. No. 15/862,394 (now U.S. Pat. No. 10,780,444) and U.S. Provisional Application No. 62/442,818 are incorporated by reference herein.

BACKGROUND

Every year, more than $250 billion is spent on cancer treatment in the United States. In general, more than 90% of cancer-related deaths are related to metastasis. Research on circulating tumor cells (CTCs), the metastatic precursors in the bloodstream, can potentially be pivotal in managing this disease as it aids in early cancer detection, personalized medicine and minimal residual disease monitoring. Compared to fresh tissue biopsy, "liquid biopsy" of CTCs in blood samples is much more accessible and affordable, and is much less invasive. During the past ten years, CTCs have received attention as new biomarkers and the subject of basic research. Some studies indicate that the systematic dissemination of cancer can occur early during cancer progression. Other clinical studies show that CTC counts can be used as a prognostic indicator of survival for a variety of cancers. Despite the significant clinical relevance of CTCs, their clinical utility is hampered by low sensitivity, requisite sample purification and high instrument cost.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
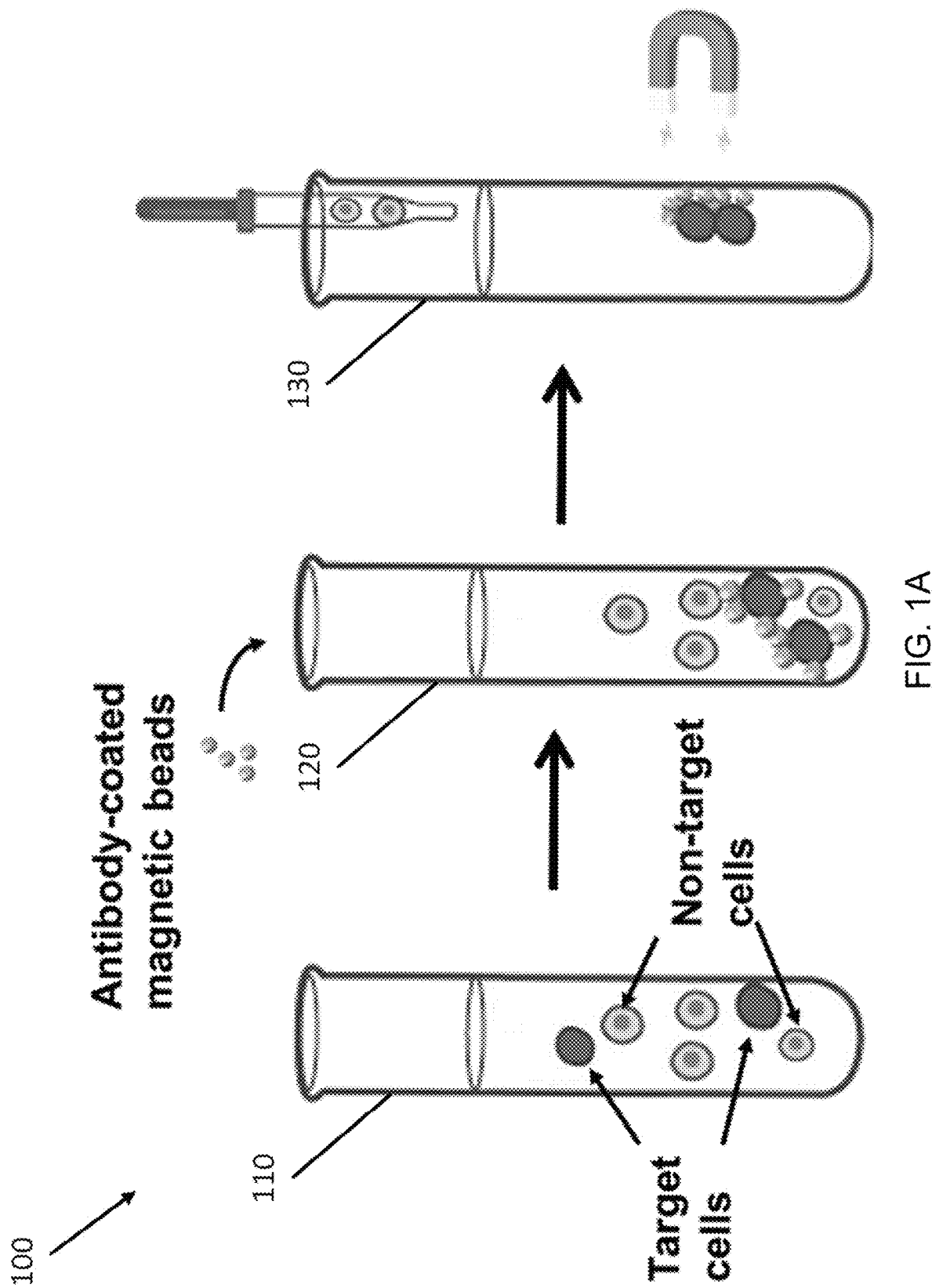
FIG. 1A is an illustration of binding magnetic beads to target cells and to cell isolation (e.g., enrichment) of the target cells.

Analysis and/or sorting of cells (such as rare cells) may be applied to any one, any combination, or all of the following areas: oncology; immunology; neurobiology; stem cell biology; and developmental biology. For example, functional studies and molecular analysis of circulating tumor cells (CTCs) at the single-cell level may potentially lead to early cancer detection and guide the targeted therapy. In stem cell biology, it may be beneficial to assess a cell's self-renewal and differentiation potential at single-cell resolution. Research on rare cells such as circulating fetal cells, antigen-specific T- or B-cells, and disseminated tumor cells (DTCs), cells infected by virus or parasites are potentially of importance to the advancement in diagnosis, prognosis and therapeutics. As another example, antigen-specific antibody-producing circulating memory B cells from coronavirus disease 2019 (COVID-19) patients may be identified. In particular, the antigen-specific B cells may be used to: (1) identify high-affinity neutralizing antibodies for COVID-19 treatment; and (2) determine if the concentration of antigen-specific B cells may be used as an immune response biomarker.

The below discussion focuses on identifying CTCs or on antigen-specific B cells in a sample. However, the systems and methods disclosed herein may be used for identification of other items of interest. For example, the discussed systems and methods may be used to identify a variety of cells, such as bacteria cells. Other examples of cells of interest include fetal cells, stem cells, antigen-specific T- or B-cells, and the like. Thus, in one implementation, the system and method may be used to identify any target cell that may be tagged with a marker or other type of particle (e.g., any type of magnetic marker or other type of magnetic particle), such as an antibody coated magnetic bead. In this regard, any discussion below regarding isolation, identification, and/or sorting with regard to CTCs may be equally applied to any target cell of interest. Further, the cells may be resident in a variety of fluids. As one example, the cells may be resident in a blood sample. As another example, the cells may be resident in a water sample. Thus, any discussion below regarding processing a blood sample may be equally applied to any other type of sample (e.g., a fluid sample), such as a water sample.

In addition, the disclosed platform includes one or more of the following benefits, including: short assay time; high throughput; cell viability; cost effectiveness; or ease of use. With regard to the short assay time, with the platform, the target cells may be labelled with magnetic bead labels instead of fluorescent labels, thus allowing for rapid sample processing. a protocol may enrich rare cells from blood in 30 minutes and identifying/sorting a single cell in a matter of minutes (e.g., within an average of 3 minutes). Thus, it may be estimated that the total assay time using the platform to enrich, identify and sort 100 single rare cells from blood is less than 4 hours. This is in contrast to 2-3 days for other solutions, which includes 4-5 hours of hands-on time.

With regard to high throughput, enrichment, cell identification, and cell sorting may be scaled and automated with high throughput. Specifically, the platform may perform magnetic cell isolation, to enrich rare cells from 6 blood samples in 30 minutes with yield, purity and viability all above 80%. With regard to cell viability, the platform does not require fixation or staining, allowing single live cells to be obtained. Magnetic sensing and magnetic manipulation on the platform are both contactless, gentle and exerts no shear force or strain on the cells. The surface of the semiconductor chip, discussed further below, may comprise a SiO2 protection and insulation layer, so the sample will not be contaminated by microelectronic components. The platform's full automation and short assay time may also help to reduce the risk of contamination and maintain cell integrity. With regard to cost effectiveness, the semiconductor chip may be inexpensive, costing several orders of magnitude lower than the cost of a fluorescent imaging system and micromanipulator. With regard to ease of use, all three functions of enrichment, cell identification, and cell sorting may be fully automated, thus making the platform easy to operate. The control computer for controlling the platform and data transmission may comprise a standalone computer or a mobile device. In this regard, the platform is configured to perform any one, any combination, or all of: (1) rapid and automated enrichment of rare cells from human blood samples; (2) identify a single target cell in a well (which may be on a semiconductor chip) based on its magnetic bead label; and (3) precisely control the movement of the single target cell (such as within the well to an outlet and/or removal from the outlet).

With regard to CTCs, due to the scarcity of CTCs (e.g., as few as one CTC per billion blood cells in the circulation of patients with advanced cancer), detection and enumeration of CTCs may be preceded by a cell isolation (e.g., enrichment) step. Immunomagnetic cell isolation is one technique to enrich rare cells of interest from a heterogeneous cell population and is adopted by many CTC detection systems. In this technique, cell suspension is first mixed with magnetic beads conjugated with antibodies that bind specifically to target cell surface antigens, followed by exposure of the suspension to a magnet to isolate the target cells. However, due to the lack of analytical capabilities in the magnetic isolation, during the detection step, most CTC detection systems rely on optical methods (e.g., fluorescent imaging), which requires extensive sample processing (e.g. cell fixation and immunostaining) and often leads to the loss of target cells, the decay of biomarkers and the degradation of assay sensitivity and specificity. In addition, in such a system, the CTCs may not suitable for downstream molecular analysis. In particular, applying fluorescent biomarkers for optical analysis may kill the cells subject to analysis. This may result in downstream molecular analysis becoming more difficult to perform (e.g., in DNA downstream processing) or becoming impossible to perform (e.g., RNA downstream processing).

With regard to COVID-19, a system may be developed in order to perform any one, any combination, or all of: on demand identification; isolation; characterization; or manufacturing of antibodies from peripheral blood mononuclear cells (PBMCs) collected from patients with COVID-19. Specifically, neutralizing monoclonal antibodies isolated from convalescent patient's memory B cells may serve as an intervention to SARS-CoV-2 due to their scalability and effectiveness, either as a treatment of COVID-19 patients or as a preventative option for high-risk populations such as healthcare workers. Synthesized monoclonal antibodies may recognize, bind to and neutralize the SARS-CoV-2 virus, and thus may mitigate disease progression on infected patients or protect those exposed to the virus from infection. One key step to develop antibodies against the SARS-CoV-2 virus is the collection of antibody-producing B cells from patients who have recovered from COVID-19.

Population health policy establishment and implementation requires accurate and timely measurement of population immunity. Serological antibody testing (IgG, IgM, etc.) is currently the most widely used method to assesses the development of immunity against COVID-19. However, antibody responses may subside after the acute phase in an unpredictable and heterogenous way. Using the SARS coronavirus as an example, IgM antibodies generally rise above the detectable threshold in approximately 5 to 7 days after the initial onset of symptoms and then remains above the detection threshold for 14 to 21 days. Around day 14 after symptom onset, IgG will rise above the detection level. IgG production generally continues to rise for 28 to 35 days after symptom onset, peaking around or after clinical recovery. This relatively small window makes it difficult and unreliable to detect immunity with antibody tests alone. For many people who have long recovered from COVID-19, their antibody levels may be undetectable as the virus load drops. SARS-CoV-2 antibody producing B cells, on the other hand, may be a better biomarker for immune response detection and monitoring as its population might be more consistent and longer lasting than that of the antibodies. The presence of high-affinity SARS-CoV-2 antibody producing B cells may still offer abundant immunity to the virus in the future even without detectable antibodies. Therefore, studying the SARS-CoV-2 antibody producing B cells from the acute phase to 1 year after recovery may result in a better understanding, in more accurately tracking, and better characterizing their functions, as well as analyze their contributions over the natural course of COVID-19.

As discussed above, the collection of antibody-producing B cells may be essential for both antibody-based treatment and immune response biomarker development. In addition, for monoclonal antibody identification and production, the cells of interest may be sorted at a single-cell resolution due to VDJ recombination, somatic hypermutation and resultant diverse B cell repertoires. However, collecting these rare antigen-specific B cells at high efficiency may not be feasible for conventional single-cell sorting techniques. For instance, micromanipulation and limiting dilution are time consuming and labor intensive, while fluorescent-activated cell sorting (FACS) suffers from low sensitivity and remarkable cell loss when isolating rare cells. In addition, many such techniques require cell fixation and/or fluorescent staining, which decreases cell viability and thus limits downstream applications in molecular analysis and cell culture.

Thus, one application of the system disclosed herein may include a cell sorting platform, such as a single-cell sorting platform, that allows for fast identification and efficient isolation of single high-affinity SARS-CoV-2 antibody producing B cells from peripheral blood samples. The system may rapidly isolate, identify and sort single intact rare cells from heterogeneous cell suspensions.

With the collected antigen-specific B cells, single-cell analysis may be conducted in order to identify potential high-affinity SARS-CoV-2 antibody. Alternatively, or in addition, the disclosed system may study patient blood samples longitudinally to enumerate SARS-CoV-2 antibody producing B cells during the acute phase (e.g., symptom onset in mild; hospitalization for moderate; mechanical ventilation for severe COVID-19 patients), early, middle and late convalescent phases.

Thus, the disclosed platform may assist in exploring the novel immune response biomarker (SARS-CoV-2 antibody producing memory B cells) for COVID-19, with a direct impact on the readiness and deployability of military personnel, healthcare workers and first responders for future waves of the COVID-19 pandemic. The disclosed platform also may provide a better solution for the entire community to determine reopening time, PPE allocation, hospital and business capacity and needed precautions.

The attendant research using the platform may also help answer several critical scientific and epidemiological questions in an accurate and efficient way regarding COVID-19. For example, it is currently unknown how the B cell receptor repertoire changes over time after COVID-19 infection (i.e. whether the SARS-CoV-2 antibody producing B cells are still present and for how long after the acute phase), which makes health policy and prevention strategy impractical to implement. The platform may assist in shedding light on this critical immune response and correlate it with disease progression, severity and recovery.

Patients respond very differently to SARS-CoV-2 infection. The ability to quickly identify the most important neutralizing antibody producing B cells in one specific patient may therefore be critical for precision medicine as applied to the treatment of COVID-19 and potentially other future respiratory virus infections. The targeted treatment may, in turn, reduce side effects and improve efficacy dramatically.

Thus, the disclosed single-cell sorting technology platform may significantly benefit a wide range of fields in biomedical research. Driven by the strong demand in precision medicine, single cell sorting and analysis of rare cells from clinical samples has shown great potential in basic and translational research. Studies on rare cells (e.g. CTCs, circulating fetal cells, antigen-specific T-cells or B cells, disseminated tumor cells (DTCs), and cells infected by viruses or parasites), are having an increasing impact in oncology, immunology, neurobiology, stem cell biology and developmental biology In this regard, in one implementation, cell isolation is performed while maintaining the viability of the cells subject to analysis. Specifically, in one implementation, a system and method is disclosed which directly detects the bead-labeled target cells. In particular, the system and method may include one or more structures and/or one or more processes that enable the detection of the bead-labeled target cells.

In a first specific implementation, the system includes one or more wells and one or more sensors that work in combination to enable detection of the bead-labeled target cells. As discussed in more detail below, the sensor may comprise a Hall effect sensor (or a series of Hall effect sensors), a Giant Magnetoresistance (GMR) sensor, a Superconducting Quantum Interference Device (SQUID) sensor, an imaging sensor (e.g., a camera). The sensors may be configured to sense at least one magnetic characteristic. Further, the sensors listed are merely for illustration purposes. Other types of sensors, such as other types of magnetic sensors, are contemplated. The surface area of the sensor (or group of sensors that act in combination) may be much larger than the size of the target cell subject to detection. In on implementation, a sensor unit (e.g., a "pixel") is approximately the same size as or even smaller than single bead. Further, the total area of the sensor array may be much larger than a single target cell.

In a specific implementation, the chip may have a total area that can detect more than hundreds (e.g., 500) target cells simultaneously. For example, the chip may include the sample well designed to hold as many as 500 bead-bound Caco-2 cells. The particles may be placed onto the surface of the chip sensing area in the well, such as by gravity, and their magnetic signals may be detected by the underlying sensor units. Bead-bound target cells may be differentiated from contaminants by signal strength and number of pixels and then moved in certain path (see discussion below regarding FIG. 7A).

With regard to the chip design, the following are considerations. First, each of the long metal lines on the chip may be modelled as a metal resistor, so they are subject to voltage drop and will also generate heat when current flowing through. For instance, a 5 mm-long 2 μm-wide metal line in 0.18 μm CMOS process can have a resistance more than 120Ω. If 30 mA is injected into the wire, then there will be 3.6V voltage drop. This might cause issues if the chip is powered with a 3.3V supply. On the other hand, the heat generated by the metal wires will increase the sample temperature and might affect cell viability. Therefore, the metal lines are designed to balance these design parameters.

Second, the detection errors of the sensor array may be negligible compared to assay result variation. The detection errors of a sensor array may be strongly dependent on the total number of unit sensors and signal-to-noise ratio (SNR) of individual sensors. For instance, the probability of detection error may be less than 0.1% with a sensor SNR of 15.9 dB. The sensor outputs on the chip may be read out in parallel to achieve high throughput.

As discussed above, the system and method may identify various target cells. In one example, the target cells subject to identification may range in size from 20 microns to 50 microns. Other sizes are contemplated. In this example, the surface area of the sensor (or group of sensors) may be at least an order of magnitude greater than the size of the target cells (such as in one implementation, at least two orders of magnitude greater; such as in another implementation, at least three orders of magnitude greater; such as in still another implementation, at least four orders of magnitude greater, etc.).

The structure of the well(s) may be designed to work in combination with a sensor (or group of sensors), which has a surface area that is much greater than the size of the target cell. Typically, a focusing device, such as focusing device 44 disclosed in US Published Application No. 2015/0219544 (incorporated by reference herein in its entirety), is used to focus each target cell one-by-one on a central area of the sensor for detection of the target cells. Because the surface area of the sensor (or group of sensors) is much greater than the size of the target cell, a focusing device that uses a series of wires to magnetically manipulate the target cells to the middle of the sensor is unnecessary. In this regard, the system need not include wiring or other structure to magnetically manipulate the target cells through an inlet to the geometric center of the sensor (thereby channeling the target cells one-by-one to the geometric center of the sensor). Rather, the well(s) may include an inlet and/or outlet that generally guides the target cells onto the surface area of the sensor(s), without channeling the target cells individually or to a specific section of the sensor(s). Thus, a variety of means may be employed by which to guide the target cells onto the surface of the sensor(s), such as by gravity, by forced air, by magnetic manipulation (without the need to channel the target cells one-by-one or to the center of the sensor(s)). As one example, a blood sample, a water sample, or the like may be dropped into the well so that gravity may be used to guide the sample into the well.

As discussed above, the system and method may use the magnetic beads (bonded to the target cells) as part of the detection process. In one implementation, the system may use magnetic sensor(s) (such as a group of Hall effect sensors) without magnetic manipulation to detect the bead-labeled target cells. For example, the Hall effect sensor(s), whose area is much larger than the size of the target cell, may detect multiple bead-labeled target cells simultaneously, such as all of the bead-labeled target cells in the well simultaneously (as opposed to one-by-one), resulting in faster detection of the bead-labeled target cells.

In an alternate implementation, the system may use magnetic manipulation in order to detect the bead-labeled target cells. More specifically, the system may detect the bead-labeled target cells by applying a magnetic field and then analyzing whether there is movement of cells. Detection of movement may be based on one or both of the following: (1) magnetic analysis (e.g., Hall effect sensor output); or (2) visual analysis (e.g., analyzing pictures before and after the magnetic field is applied). For example, one or more sets of wires may generate a magnetic field on a part of the well. A sensor (such as a magnetic sensor, an optical sensor (e.g., a camera), or the like) may take one or more readings in order to detect the bead-labeled target cells.

In the example of a magnetic sensor (such as a Hall effect sensor), the system may read the output of the magnetic sensor without an applied magnetic field, read the output of the magnetic sensor with an applied magnetic field, and compare the two readings. Alternatively, the system may read the output of the magnetic sensor with a first applied magnetic field, read the output of the magnetic sensor with a second applied magnetic field, and compare the two readings. For example, the system may control the current (thereby modifying the applied magnetic field in order to manipulate which items (e.g., free beads or bead-labeled target cells) are detected). In particular, the system may use varying currents (e.g., first a lower current to detect the movement of the free beads and then a higher current to detect the bead labeled target cells). Thus, the system may vary the AC current magnitude and/or vary the AC current frequency in detecting the bead-labeled target cells.

In the example of an optical sensor, the system may obtain a first image from the optical sensor without an applied magnetic field, a second image from the optical sensor with an applied magnetic field, and compare the first and second images. Alternatively, the system may obtain a first image from the optical sensor with a first applied magnetic field, a second image from the optical sensor with a second applied magnetic field, and compare the first and second images. Thus, using the optical sensor, the magnetic quality of the bead-labeled target cells may be used in a visual detection. Further, capitalizing on the magnetic quality of the bead-labeled target cells allows for a simpler visual detection, avoiding additional fluorescence tagging when performing visual detection.

In a system that applies a magnetic field, the electronics to generate a magnetic field may be positioned in one of several ways. In one way, the electronics may be positioned on a level that is different from the magnetic sensor electronics. For example, the Hall effect sensor may be positioned on one level, such as on the substrate/active layer of the electronics, and the electronics to generate the magnetic field may be positioned on a different level (e.g., the wiring to generate the magnetic field may be on another level of the CMOS electronics.

Further, the system may include the magnetic sensor, the wells, and the readout electronics. For example, the sample well may be created by sandwiching a microchip between an insulating support (such as a plastic layer) and an insulating cover (with the cover including a hole for the opening of the well). The microchip may be electronically connected to a flex board, which may provide the readout electronics (e.g., a micro USB connector or other output). As discussed in more detail below, this type of sandwiching creates a well with various dimensions, such as a 1 cm×1 cm area well, with a height of ½ cm.

In one implementation, the system may reduce the number of free beads in the fluid. As discussed above, beads, such as magnetic beads, may be applied to the fluid (such as to a blood sample). Some of the beads may bind to the target cells (e.g., the CTCs), thereby becoming bound to the target cells. Other beads (such as the large majority of the beads applied to the fluid) may not bind to any other cell, and become free beads (e.g., unbound beads that are in the fluid). In one optional implementation, after applying the unbound beads to the fluid, the system may perform one or more steps in order to reduce the number of free beads in the fluid. As discussed in more detail below, one or more procedures, such as filtering the fluid (e.g., collecting the free beads in a filter), applying a centrifugal force (e.g., by using a centrifuge to separate the free beads from other particles in the fluid), and/or applying a magnetic force to separate the free beads from other particles in the fluid. In one implementation, reduction in the number of free beads may be performed after the cell isolation step and before the cell identification step. In an alternate implementation, reduction in the number of free beads may be performed after the cell isolation step and the cell identification step, but before the cell sorting step.

In yet another implementation, after performing the cell isolation step, the system may perform a cell sorting step. Cell sorting, such as single cell sorting, may be focused on any one, any combination, or all of: yield; purity; cell viability; and throughput. However, conventional technologies may require abundant target cell populations or high-purity starting samples and thus have limited capabilities to isolate and analyze rare cells. For instance, a single CTC can be surrounded by millions of leukocytes and billions of erythrocytes in peripheral blood. However, fluorescent-activated cell sorting (FACS) usually requires more than 10,000 target cells in the starting sample due to significant cell loss; micromanipulation, limiting dilution and laser microdissection are effective only on high-purity cell populations, and are time consuming and low-throughput.

With regard to cell viability, ideally, the isolated cells should be viable for downstream molecular analysis of genomics, transcriptomics and proteomics. Cell viability is also essential in cell-base assays and cell line development. One of the most well-known examples is the production of monoclonal antibody where target cell populations grow from a single live cell. However, typically, single cell sorting technologies use fixation and/or staining (e.g., in fluorescent activated cell sorting or FACS) which usually leads to loss of cell viability.

Therefore, an easy-to-use and/or high-throughput tool to isolate and sort single intact and viable rare cells (e.g., from a heterogeneous cell population), discussed below, has wide applications in bioscience research and clinical benefit. Specifically, the tool may include a cell sorting step that uses magnetic manipulation in order to sort one or more cells of interest. As one example, the tool may be used to identify and precisely collect the CTCs bound to the beads.

As another example, the tool may comprise an integrated and automated high-throughput cytometer to rapidly identify and precisely collect individual functional and viable antigen-specific B cells from COVID-19 patients. Single-cell analysis may then be conducted on individual antigen specific B cell and identify potential high-affinity SARS-CoV-2 antibodies. The workflow for single cell sorting from rare cell populations in suspension typically includes three functional blocks: enrichment, identification, and single-cell sorting. Further, one, some, or each of enrichment, identification, and single-cell sorting may automated, such as within a platform (e.g., a single unit within the platform or separate units within the platform).

For example, with regard to enrichment, the magnetic cell isolation process may be automated with magnetic particle processors. Enrichment may increase the purity of a sample with a high throughput isolation technique, either based on the physical properties of the sample (e.g. size, density) or on immunoaffinity. As discussed in more detail below, various ways of enrichment are contemplated, such as those ways in which to maintain (or not substantially reduce) cell viability. This is in contrast to current choices in single-cell identification (e.g. fluorescent imaging) and single-cell sorting methodologies (e.g. micromanipulator), which generally have a high impact on cell viability.

Alternatively, or in addition, identification and single-cell sorting may be automated. For example, identification of bead-bound target cells may be performed based on controlling the magnetic fields within one or more sections in a well. As another example, sorting of identified bead-bound target cells may likewise be performed based on controlling the magnetic fields within one or more sections in a well. In this regard, identification and sorting may both be based on control of the magnetic fields within the well. Various factors are involved in controlling the magnetic fields within the well including any one, any combination, or all of: (i) the strength of the magnetic field generated (e.g., the amount of current sent through wires underneath the well); (ii) the algorithm to control the magnetic field through different sections of the well (e.g., controlling the current through the wires to create a motion toward an outlet (including whether to avoid obstacles or not); controlling the current to create a localized defined movement); or (iii) the frequency of the current applied (e.g., controlling the frequency of the wire activation in order to differentiate between the free beads and the bead-conjugated target cells due to the difference in inertia). In this regard, magnetic fields are generated in both the identification step and the sorting step; however, what may vary amongst the different steps are any one or both of:

which wires have current sent through them to generate the magnetic field near that wire; or the current which is sent through the wires and vary in magnitude for the different steps (e.g., currents used to differentiate free beads from bead-conjugated target cells). As discussed in more detail below, for the identification step, the wire(s), such as the set of wires, activated may be localized around the object (e.g., particle) of interest, such as the one wire, the two wires, or the three wires around the object of interest. In one particular example, one wire may be activated followed by the wire which would move the object of interest back in the opposite direction. In this way, such activation of the wires may be used to test whether the object of interest responds to magnetic fields as part of the identification step. For the sorting step, typically, the wires may be activated in sequence from one location (such as from the geometric center of the well) to another location (such as to a corner or outlet of the well), thereby moving the bead-conjugated target cells toward the outlets.

As discussed in more detail below, the magnetic manipulation may guide the cells of interest within the well to one or more chambers for sorting.

In still another implementation, the system may detect multiple types of bead-labeled target cells. As discussed above, a bead may be bound to a target cell. In a more specific implementation, a first bead may be bound to a first target cell, and a second bead may be bound to a second target cell. The system may detect the first bead bound to the first target cell along with (e.g., simultaneously) detecting the second bead bound to the second target cell. In this regard, the first and second beads may be used for cell isolation (e.g., enrichment) and for detection of multiple targets (e.g., with the different bead labels). As discussed in more detail below, one method of detection comprises varying frequency in order to detect the different bead labeled target cells, such as based on different response times for the different bead labeled target cells.

As discussed above, due to the scarcity of CTCs (as few as one CTC per billion blood cells in the circulation of patients with advanced cancer), detection and enumeration of CTCs may be preceded by a cell isolation (e.g., enrichment) step. Immunomagnetic cell isolation is one technique to enrich rare cells of interest from a heterogeneous cell population. For example, the cell isolation (e.g., enrichment) step may increase the purity of sample based on immunoaffinity. In this technique, cell suspension is first mixed with magnetic beads conjugated with antibodies that bind specifically to target cell surface antigens, followed by exposure of the suspension to a magnet to isolate the target cells. This is illustrated by 100 in FIG. 1A, which at 110 shows the target and non-target cells. As discussed above, the numbers of non-target cells may be many orders of magnitude greater than the numbers of target cells. 120 illustrates magnetic beads conjugated with antibodies that bind specifically to target cell surface antigens, are mixed with the cell suspension. 130 illustrates the followed step of exposure of the suspension to a magnet to isolate the target cells.

Figure 1B:
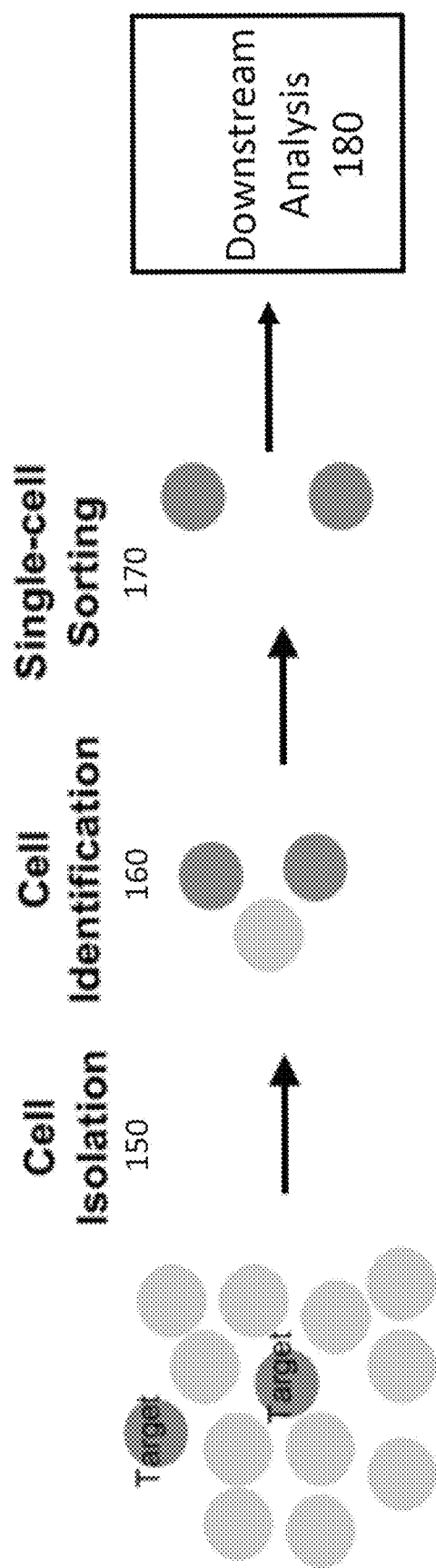
FIG. 1B illustrates various steps in the processing including cell isolation, cell identification, cell sorting (such as single cell sorting), and downstream analysis.

Thus, the fluid (such as the blood sample) may be subject to one or more steps. FIG. 1B illustrates various example steps including cell isolation, cell identification, cell sorting (such as single cell sorting), and downstream analysis. In particular, target cells may first be enriched with automated magnetic cell isolation technique. The sample after elusion may then be transferred to a sample well where an embedded magnetic sensor chip, discussed below, may detect the bead-bound target cells by their magnetic signal. Further, the magnetic sensor chip may then sort individual target cells with spatially-patterned microscopic magnetic field generated by on-chip metal wires. Optionally, a free bead reduction step may be included, such as after cell isolation and before cell identification. The cell isolation step (e.g., the cell enrichment step) may comprise the step of binding the beads (e.g., the magnetic beads) to the target cells. In a specific implementation, the cell isolation step comprises the tagging of the beads to the CTCs. In a blood sample, the large majority of cells are not CTCs, instead being other cells, such as white blood cells. Likewise, the blood sample may include contaminants. The cell isolation step may result in binding of the magnetic beads to some of the CTCs within the blood sample, such as approximately 90% of CTCs. The cell identification step may comprise identifying the target cells that have been tagged or had beads bound to them. The cell sorting step may comprise sorting the target cells that have been tagged or had beads bound to them, such as single cell sorting that sorts one tagged CTC at a time.

Further, the magnetic cell processing/isolation may be used in a high-throughput cell isolation technique. Because no cell fixation or labeling is necessary for the following steps, the sample processing time in cell identification is reduced. Further, the magnetic tag allows the target cells to move rapidly with precisely controlled microscopic magnetic field on chip. The assay time to isolate, identify and sort 100 single spiked cancer cells from blood sample may be approximately 3 hours (versus 12-25 hours for other techniques). Moreover, all three steps (cell isolation, cell identification, single-cell sorting) may be scalable and automated. For instance, a magnetic cell isolation protocol may be implemented with an automated magnetic particle processor. In one implementation, up to 12 samples may be processed on these automated magnetic particle processor systems simultaneously.

In one implementation, all the steps, including the cell isolation step, the cell identification step, and the cell sorting step are performed in a discrete and separate manner. In such an implementation, after the cell isolation step, each of the cell identification step and cell sorting step at least party use the magnetic property of the beads bound to the target cells for processing. In particular, the cell isolation step may use the magnetic property of the beads (either in combination with an optical sensor or in combination with a magnetic sensor) and the cell sorting step may use the magnetic property of the beads. Alternatively, only one of the cell identification step and cell sorting step at least party uses the magnetic property of the beads bound to the target cells for processing. For example, only the cell identification step uses the magnetic property of the beads bound to the target cells for processing, whereas the cell sorting step does not use the magnetic property of the beads bound to the target cells for processing (e.g., the cell sorting step uses a gripper to manually grip the identified bound CTCs). As another example, the cell identification step does not use the magnetic property of the beads bound to the target cells for processing, whereas the cell sorting step uses the magnetic property of the beads bound to the target cells for processing.

In an alternate implementation, some of the steps, such as the cell identification step and the cell sorting step are performed in combination. For example, the cell identification step and the cell sorting step may be performed in the same step.

Referring back to FIG. 1B, the steps may comprise: cell isolation 150; cell identification 160; single cell sorting 170; and downstream analysis 180. Examples of downstream analysis include, but are not limited to cell culture, protein analysis (e.g., proteomics), and DNA/RNA analysis (e.g., genomics and transcriptomics). Other types of downstream analysis are contemplated.

In one implementation, magnetic cell isolation may comprise cell enrichment technique for BULK isolation of pure, viable and functional cells. In magnetic cell isolation, magnetic particles (microbeads or nanoparticles) conjugated with biomarkers that bind specifically to target cell surface may be mixed with the cell suspension, followed by exposure of the suspension to a magnet to isolate the target cells, such as illustrated in FIG. 1A. For instance, anti-epithelial cell adhesion molecule (EpCAM) may be used in many CTC isolation platforms since EpCAM expression is virtually universal in cells with epithelial origin but absent in blood cells. Unlike other high-throughput techniques such as Fluorescence-activated cell sorting (or FACS), magnetic cell isolation does not require highly engineered fluidic, optic and electronic system for operation. Furthermore, magnetic cell isolation is more efficient with rare cells and yields a higher cell viability than FACS.

After the cell isolation (e.g., enrichment) step, the system may detect and/or enumerate the CTCs using the magnetic beads. In particular, the system comprises a microelectronic-chip based magnetic cytometer that may directly detect the immunomagnetically labeled target cells. Due to minimal sample processing and inherently negligible magnetic background of biological samples, the disclosed cytometer enables rapid isolation and detection of rare cells with high sensitivity and specificity while keeping the cells viable to facilitate downstream analysis and cell culture. In addition, since the magnetic sensing technique does not require an optical instrument and special imaging methods, both system and assay cost may be lower than systems that rely on optical instruments.

Figure 1C:
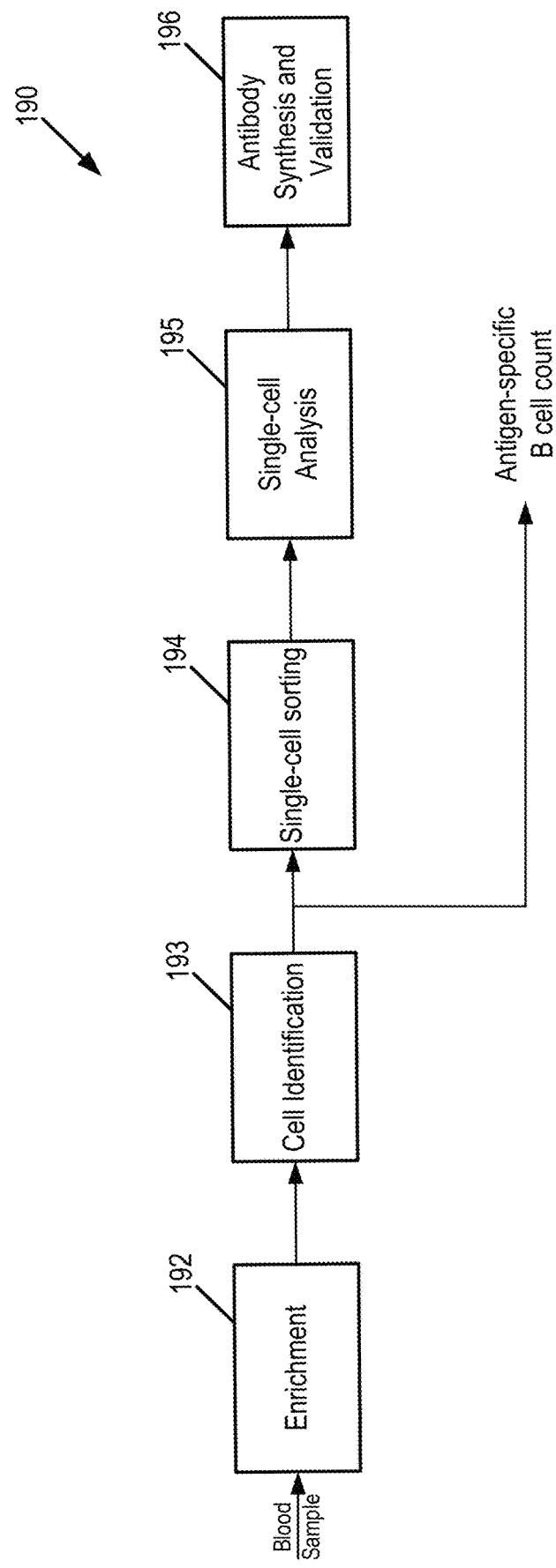
FIG. 1C illustrates another block diagram of the workflow for SARS-CoV-2 antibody discovery and immune response marker, including enrichment, cell identification, single-cell sorting, single cell analysis, and antibody synthesis and validation 196.

FIG. 1C illustrates another block diagram 190 of the workflow for SARS-CoV-2 antibody discovery and immune response marker, including enrichment 192, cell identification 193, single-cell sorting 194, single cell analysis 195 (e.g., genomics, transcriptomics, proteomics, cell culture), and antibody synthesis and validation 196 (e.g., in vitro test, animal test, clinical trial). Thus, the single-cell sorting platform may be based on the magnetic property of bead-bound target cells and the semiconductor technology described below. The three functions of the platform may be based on the principles of magnetic manipulation and magnetic sensing. One component, discussed below, is the semiconductor chip which is used for cell identification and single cell sorting. In particular, after the sample is enriched with immunomagnetic cell separation, it may be transferred to a sample well with an embedded semiconductor chip that generates a precisely controlled local magnetic field by injecting electric current through on-chip metal wires. In this way, it is straightforward to discriminate between target cells and contaminants (e.g., WBC, dust, debris) since the bead-bound target cell may move in response to local magnetic field changes, whereas the non-magnetic contaminants do not. The semiconductor chip may be programmed to generate a spatially patterned microscopic magnetic field and manipulate individual target cells to outlets at the chip corners. As discussed further below, each single cell in the outlet may be collected and transferred by means for extracting the bead-bound target cell from the outlet to a PCR tube or well plate for downstream analysis. Various means are contemplated, such as a magnetic tip on a robot, a pipetting extractor, or the like. In one or some embodiments, the platform may be fully automated and comprise a magnetic particle processor for enrichment and an automated single-cell processing system that collect target cells at the single-cell resolution.

Figure 2A:
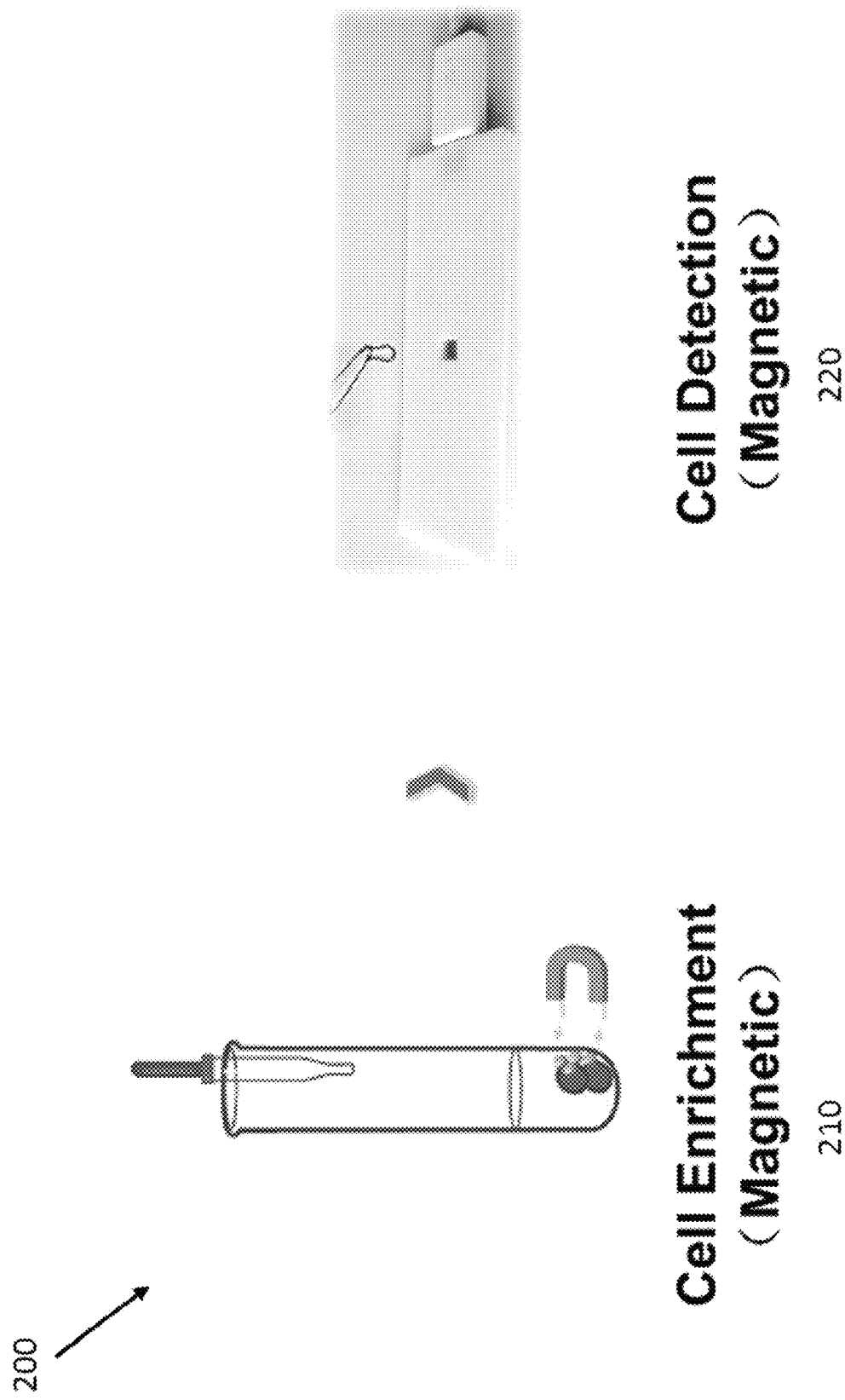
FIG. 2A is one illustration of the stages of cell isolation (e.g., enrichment) and detection using the magnetic beads.
Figure 2B:
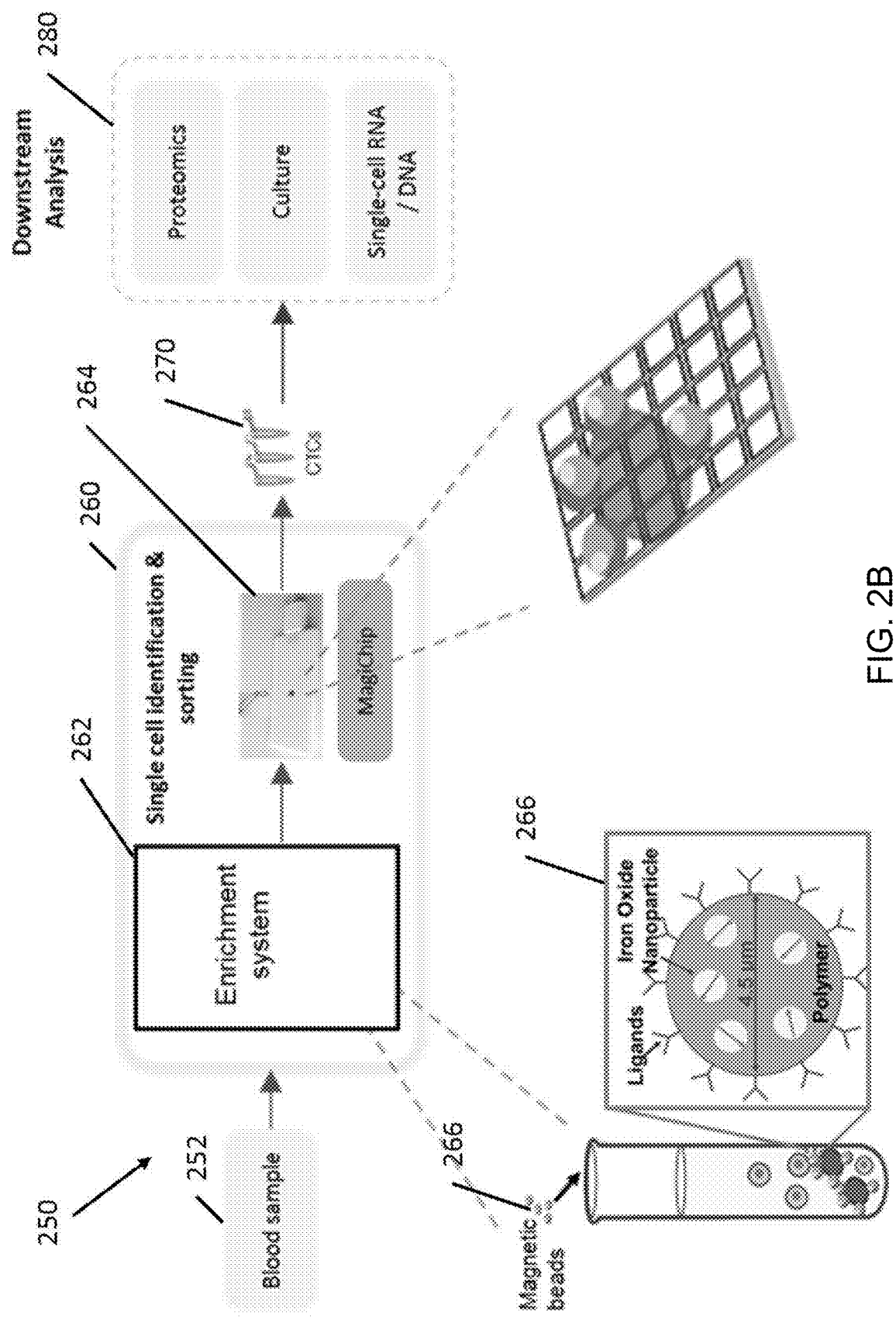
FIG. 2B is another illustration of the stages of cell isolation (e.g., enrichment) and detection using the magnetic beads.

In this regards, a system 200, such as illustrated in FIG. 2A, may be used whereby after enrichment (210), cell detection (220) may be performed using the magnetic beads. FIG. 2B is another illustration of a system 250 that performs the stages of enrichment and detection using the magnetic beads. Specifically, whole blood 252 may be input to device 260 that includes enrichment system 262 and single cell identification and sorting 264. With regard to enrichment system 262, beads 266 are added to the whole blood 252. An exploded view of the beads 266 is illustrated in FIG. 2B. Specifically, the bead 266 is approximately 4.5 µm, with ligands that may be configured to bind to CTCs. Further, bead 266 may include a magnetic nanoparticle (such as an iron oxide nanoparticle) in order to provide the bead 266 its magnetic property.

In one implementation, enrichment system 262 automates the magnetic cell isolation process, including but not limited to any one, any combination, or all of: washing beads in buffer; conjugating antibodies to beads; mixing beads with sample; washing sample with buffer; and re-suspending sample. For optimized assay performance, the temperature of the magnetic particle processor may be set at low temperature (e.g., 4° C.) or the magnetic particle processor may be placed in a cold room (e.g., 4° C.).

In one implementation, bead preparation (at for example 4° C.) may comprise: (1) taking out 10 µL of stock beads, use 500 µL of buffer 1 to wash beads; (2) adding 1 µL antibody to the beads, then add 300 µL buffer 1; (3) rotating mixing for 1 hour; (4) using magnet to enrich sample and wash with buffer 1; (5) re-suspend sample in 20 µL buffer 1.

In one implementation, isolation of target cell from blood (at for example 4° C.) may comprise: (6) adding 10 µL beads from step (5) to 300 µL blood sample, mixing for 30 minutes; (7) using magnet to enrich sample and wash; and (8) re-suspend sample into 50 µL buffer 2.

After enrichment system 262, single cell identification and sorting 264 may apply a magnetic field (H), such as via one or more wires, and may detect the movement of the magnetic particles, such as via one or more sensors. The output of single cell identification and sorting 264 may comprise the CTCs 270 that have beads 266 bound thereto. The CTCs 270 may be input to downstream analysis 280, which may comprise proteomics, culture, and/or single cell RNA/DNA, as discussed above.

Figure 3A:
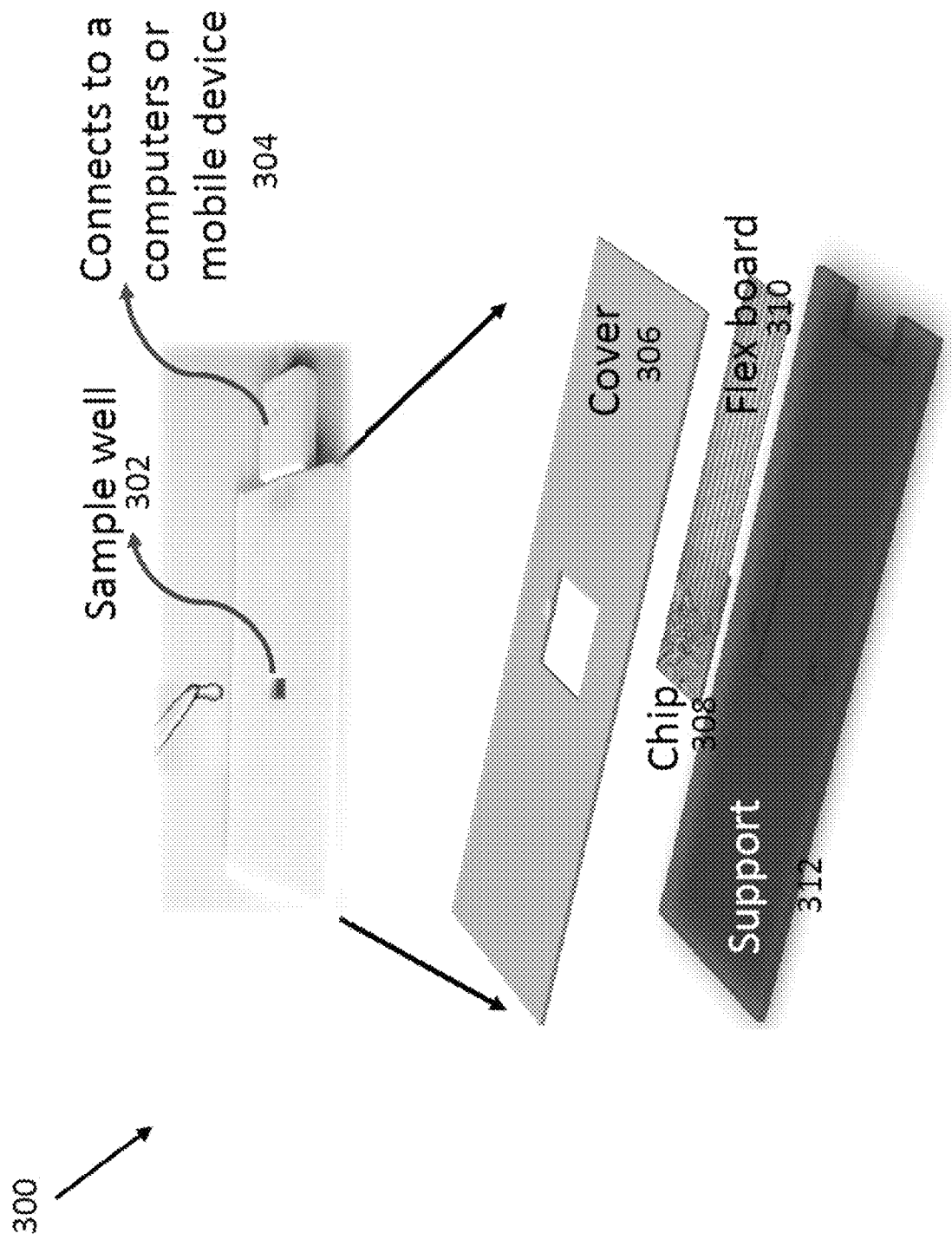
FIG. 3A is an exploded view of an example sensing system in which a microelectronic chip is packaged onto a flex circuit board through flip-chip technology.

FIG. 3A is an exploded view of an example sensing system 300 in which a microelectronic chip 308 is packaged onto a flex circuit board 310 through flip-chip technology. The other side of the flex board may be connected to computer or mobile device 304 through microUSB or other type of interface. An example of computer or mobile device 304 comprises analytics/sorting system 360, illustrated in FIGS. 3B-C. As shown, the chip and flex circuit board 310 are sandwiched by a cover panel 306 and a support plastic 312. The chip sensing area is exposed through the opening in the cover panel 306 and forms a sample well 302, such as illustrated in FIG. 2A. In one implementation, sensing system 300 may be the same size as that of a microscope slide so that sensing system 300 fits into a typical microscope stage in order to obtain the optical image Thus, the sensing system 300 may include a magnetic bead detector chip for magnetic immunoassays. The chip may be fabricated in a CMOS (complementary metal-oxide-semiconductor) process. As discussed in further detail below, the magnetic bead detector chip may be used in combination with one or more magnetic detection methods in order to detect single magnetic beads on the chip surface. As shown in FIG. 3A, there are three components, including a magnet, a magnetic sensor and a control/readout electronic circuit, to detect a superparamagnetic bead.

In this regard, magnetic detection may be highly sensitive even with minimum sample processing because most biological samples or contaminants (e.g., dusts and debris) have negligible magnetic properties and thus background noise may be very low. The Hall-effect sensor chip illustrated in FIG. 3A may be fabricated in standard semiconductor process that can detect single microbead label in magnetic immunoassays with sensitivity comparable to that of micro-Hall detector (even though the surface area of the Hall-effect sensor chip illustrated in FIG. 3A is more than an order of magnitude (such as more than two orders of magnitude greater).

Figure 3B:
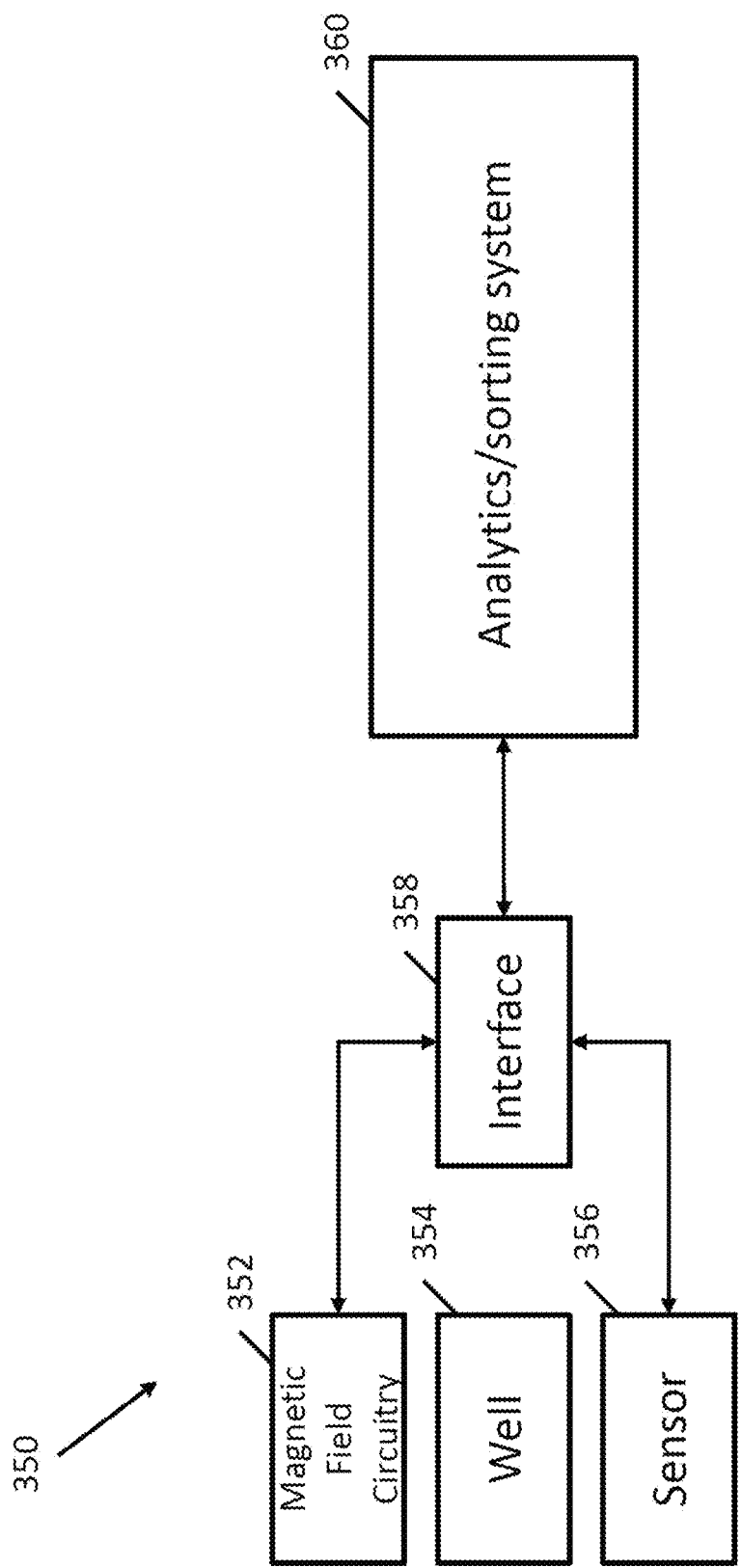
FIG. 3B illustrates a block diagram of the system, including magnetic field circuitry, a well, a magnetic sensor, an electronic interface and an analytics system.

FIG. 3B illustrates a block diagram of the system 350, including magnetic field circuitry 352 (such as wires), a well 354, sensor 356 (e.g., a magnetic sensor (such as a Hall effect sensor); an optical sensor; etc.), an electronic interface 358 (such as a USB interface) and an analytics/sorting system 360. The analytics system may include a processor and a memory (further illustrated in FIG. 3C), which may be used to perform any one, any combination, or all of the following functions: control the magnetic field circuitry; analyze the sensor output generated by the magnetic sensor; or sort cells of interest. Magnetic field circuitry is one example of a magnetic field generator that may be controlled by an analytics/sorting system 360. In particular, responsive to control signals from the analytics/sorting system 360, the magnetic field circuitry 352 may generate magnetic fields (e.g., by controlling the frequency and/or amplitude of an AC current) to generate the magnetic fields. In the instance that the sensor 356 is a magnetic sensor, the magnetic sensor may generate sensor output (e.g., magnetic sensor data) that is transmitted to the analytics system. Magnetic sensor is one example of a type of sensor 356 that is configured to generate sensor data. Another example of a type of sensor 356 that is configured to generate sensor data is an optical sensor (e.g., a camera or other imaging device) that is configured to generate optical sensor data.

Analytics/sorting system 360 may obtain sensor data in one of several ways. In a first way, analytics/sorting system 360 may command sensor 356 to generate sensor data. In particular, analytics/sorting system 360 may command sensor 356 to generate sensor data timed based on when analytics/sorting system 360 controls the magnetic field circuitry 352 (e.g., timed such that a predetermined time after controlling the magnetic field circuitry 352, the analytics/sorting system 360 commands the sensor 356 to generate sensor data). As one example, analytics/sorting system 360 may command sensor 356 to generate sensor data prior to analytics/sorting system 360 commanding magnetic field circuitry 352 generating a magnetic field. After analytics/sorting system 360 commands magnetic field circuitry 352 to generate the magnetic field, analytics/sorting system 360 may command sensor 356 to generate sensor data. Analytics/sorting system 360 may, upon receipt of the sensor data from sensor 356, store the sensor data in a memory. In this way, analytics/sorting system 360 may obtain sensor data prior to and after application of the magnetic field. As another example, analytics/sorting system 360 may command sensor 356 to generate sensor data after a first command to magnetic field circuitry 352, thereby generating a first magnetic field, and then after a second command to magnetic field circuitry 352, thereby generating a second magnetic field, with the first magnetic field being different from the second magnetic field.

In the first way and in the instance that sensor 356 is an optical sensor, analytics/sorting system 360 may control the optical sensor in order for the optical sensor to generate the optical sensor data indicative of the movement of the magnetic bead labeled to the target cell based on the control of the magnetic field generator (e.g., prior to generating the magnetic field, after generating the first magnetic field but before generating the second magnetic field, or after generating the second magnetic field).

In the first way and in the instance that sensor 356 is a magnetic sensor, analytics/sorting system 360 may control the magnetic sensor in order for the optical sensor to generate the optical sensor data indicative of the movement of the magnetic bead labeled to the target cell based on the control of the magnetic field generator (e.g., prior to generating the magnetic field, after generating the first magnetic field but before generating the second magnetic field, or after generating the second magnetic field).

In a second way, sensor 356 may periodically send sensor data to analytics/sorting system 360 (without previously being prompted by a command from analytics/sorting system 360). In this implementation, analytics/sorting system 360 may save the sensor data based on the timing of generating the magnetic field (e.g., prior to generating the magnetic field, after generating the first magnetic field but before generating the second magnetic field, or after generating the second magnetic field).

In the second way and in the instance that sensor 356 is an optical sensor, analytics/sorting system 360 may control saving the optical sensor data, indicative of the movement of the magnetic bead labeled to the target cell based on the control of the magnetic field generator, depending on generating the magnetic field (e.g., prior to generating the magnetic field, after generating the first magnetic field but before generating the second magnetic field, or after generating the second magnetic field).

In the second way and in the instance that sensor 356 is a magnetic sensor, analytics/sorting system 360 may control saving the magnetic sensor data, indicative of the movement of the magnetic bead labeled to the target cell based on the control of the magnetic field generator, depending on generating the magnetic field (e.g., prior to generating the magnetic field, after generating the first magnetic field but before generating the second magnetic field, or after generating the second magnetic field).

Regardless of the way in which the sensor data is stored, analytics/sorting system 360 may analyze the stored sensor data in order to determine whether the sensor data is indicative of movement, responsive to the generated magnetic field, of the magnetic bead labeled to the target cell. In the instance that the sensor data is optical data, analytics/sorting system 360 may analyze the optical data (e.g., a series of images) to determine whether there was movement in the magnetic bead labeled to the target cell. Specifically, analytics/sorting system 360 may perform image analysis on a first image to identify a first plurality of objects in the first image. Specifically, the image analysis may identify in the first image the magnetic bead labeled to the target cell (e.g., based on size of the magnetic bead labeled to the target cell). Analytics/sorting system 360 may perform image analysis on a second image to identify a second plurality of objects in the second image. Again, the image analysis may identify the magnetic bead labeled to the target cell in the second image. Analytics/sorting system 360 may then correlate the objects in the first plurality of objects with the objects the second plurality of objects to determine whether one, some, or all of the first plurality of objects have moved (e.g., identify coordinates of the identified magnetic bead labeled to the target cell(s) in the first plurality of objects with the coordinates of the of the identified magnetic bead labeled to the target cell(s) in the second plurality of objects to determine whether the coordinates for a respective object in the first plurality of objects are the same as the coordinates for the respective object in the second plurality of objects).

In the instance that the sensor data is magnetic data, analytics/sorting system 360 may analyze the magnetic data to determine whether there was movement in the magnetic bead labeled to the target cell. Specifically, the magnetic data may comprise a map of the magnetic objects in the well. Analytics/sorting system 360 may compare a first map of the magnetic objects (from first magnetic data) with a second map of the magnetic objects (from second magnetic data, which is obtained after a magnetic field is applied). The comparison of the first map with the second map may then be used to determine whether there was movement in the magnetic bead labeled to the target cell. For example, analytics/sorting system 360 may specifically identify coordinates, based on size, the magnetic bead labeled to the target cell in the first map, identify coordinates, based on size, the magnetic bead labeled to the target cell in the second map, and compare the different identified coordinates to determine whether the magnetic bead labeled to the target cell has moved. As another example, analytics/sorting system 360 may identify all of the particles that have moved based on a comparison of the first map and the second map, and for particles that are identified as moved, determine (e.g., based on size) whether the moved particle is a magnetic bead labeled to the target cell.

Figure 3C:
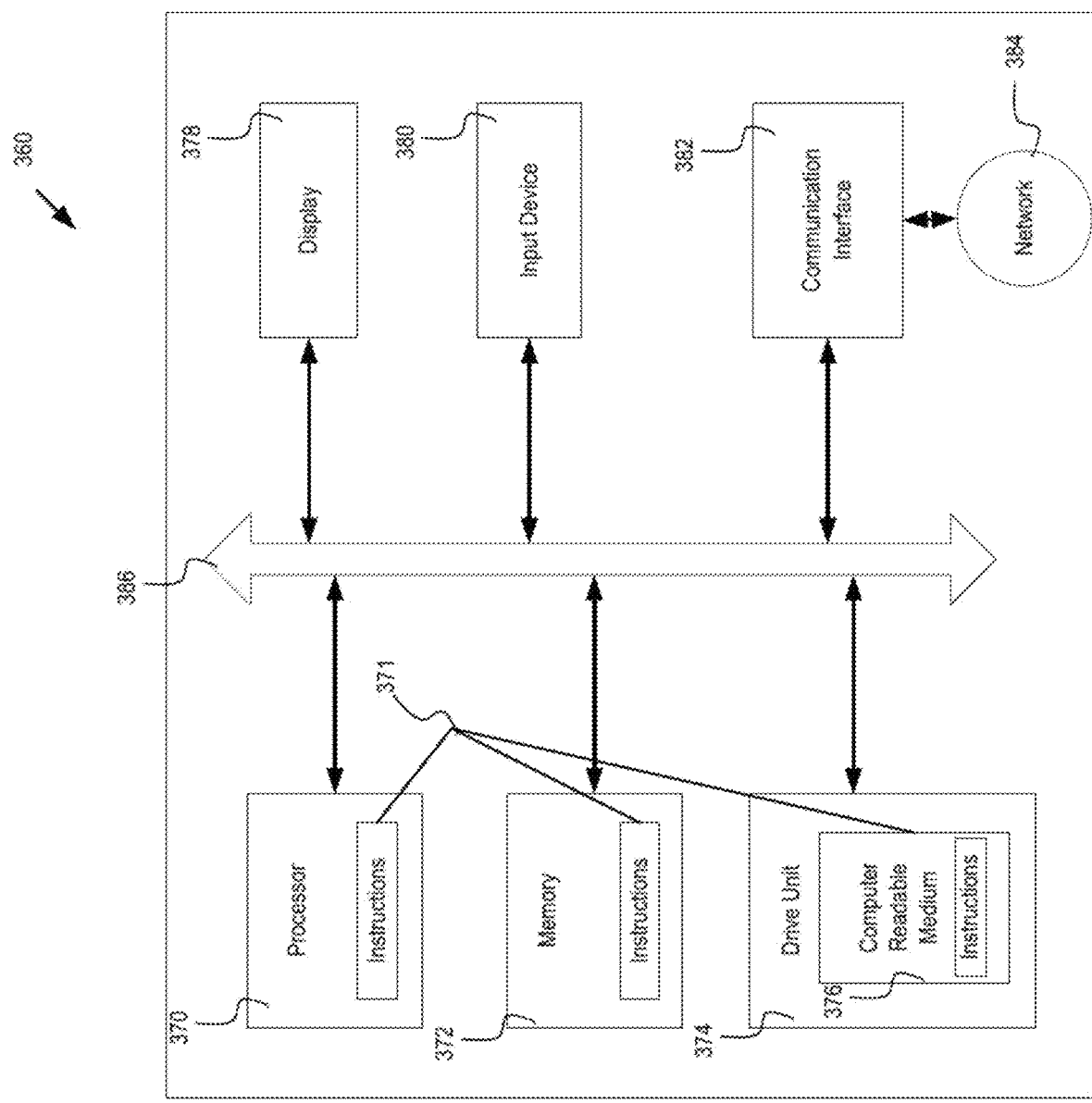
FIG. 3C illustrates a block diagram of a computing system.

FIG. 3C illustrates one example of analytics/sorting system 360. In one implementation, analytics/sorting system 360 may comprises a computer system. For example, analytics/sorting system 360 may include an ordered listing of a set of instructions 371 that may be executed to cause the analytics/sorting system 360 to perform any one or more of the methods or computer-based functions disclosed herein, such as to analyze and/or sort the cells. Further, the analytics/sorting system 360 may comprise a single computer or multiple computers. Analytics/sorting system 360 may operate as a stand-alone device or may be connected, e.g., using the network 384, to other computer systems or peripheral devices, such as to enrichment system 262 and single cell identification and sorting 264. Further, the block diagram in FIG. 3C may similarly be used for enrichment system 262 and single cell identification and sorting 264. In this regard, any discussion below regarding analytics/sorting system 360 may be applied to enrichment system 262 and single cell identification and sorting 264.

In a networked deployment, analytics/sorting system 360 may operate in the capacity of a server or as a client-user computer in a server-client user network environment, or as a peer computer system in a peer-to-peer (or distributed) network environment. Analytics/sorting system 360 may also be implemented as or incorporated into various devices, such as a personal computer or a mobile computing device capable of executing a set of instructions 371 that specify actions to be taken by that machine. Further, each of the systems described may include any collection of sub-systems that individually or jointly execute a set, or multiple sets, of instructions to perform one or more computer functions. As discussed herein, the instructions may be manifested in logic.

Analytics/sorting system 360 may include a memory 372 on a bus 386 for communicating information. Code operable to cause the computer system to perform any of the acts or operations described herein may be stored in the memory 372. The memory 372 may be a random-access memory, read-only memory, programmable memory, hard disk drive or any other type of volatile or non-volatile memory or storage device.

Analytics/sorting system 360 may include a processor 370, such as a central processing unit (CPU) and/or a graphics processing unit (GPU). The processor 370 is one example of a controller (such as a digital controller) and may include one or more general processors, digital signal processors, application specific integrated circuits, field programmable gate arrays, digital circuits, optical circuits, analog circuits, combinations thereof, or other now known or later-developed devices for analyzing and processing data. The processor 370 may implement the set of instructions 371 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

Analytics/sorting system 360 may also include a disk or optical drive unit 374. The disk drive unit 374 may include a computer-readable medium 376 in which one or more sets of instructions 371, e.g., software, can be embedded. Further, the instructions 371 may perform one or more of the operations as described herein. The instructions 371 may reside completely, or at least partially, within the memory 372 and/or within the processor 370 during execution by analytics/sorting system 360. Accordingly, the databases may be stored in the memory 372 and/or the disk unit 374.

The memory 372 and the processor 370 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, analytics/sorting system 360 may include an input device 380, such as a keyboard or mouse, configured for a user to interact with any of the components of analytics/sorting system 360. In this way, an operator may control the processing of the blood sample. It may further include a display 378, such as a liquid crystal display (LCD), a cathode ray tube (CRT), or any other display suitable for conveying information. The display may act as an interface for the user to see the functioning of the processor 370, or specifically as an interface with the software stored in the memory 372 or the drive unit 374. As discussed above, the customer-controlled device may include a display and an input device, such as input device 380.

Analytics/sorting system 360 may include a communication interface 382 that enables communications via the communications network 384. The network 384 may include wired networks, wireless networks, or combinations thereof. The communication interface 382 network may enable communications via any number of communication standards, such as 802.11, 802.17, 802.20, WiMAX, 802.15.4, cellular telephone standards, or other communication standards, as discussed above. Merely because one of these standards is listed does not mean any one is preferred as any number of these standards may never actually be adopted in a commercial product.

Block diagrams of different aspects of the system may be implemented using the computer functionality disclosed in flow diagrams disclosed herein. Further, the flow diagrams may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 4A:
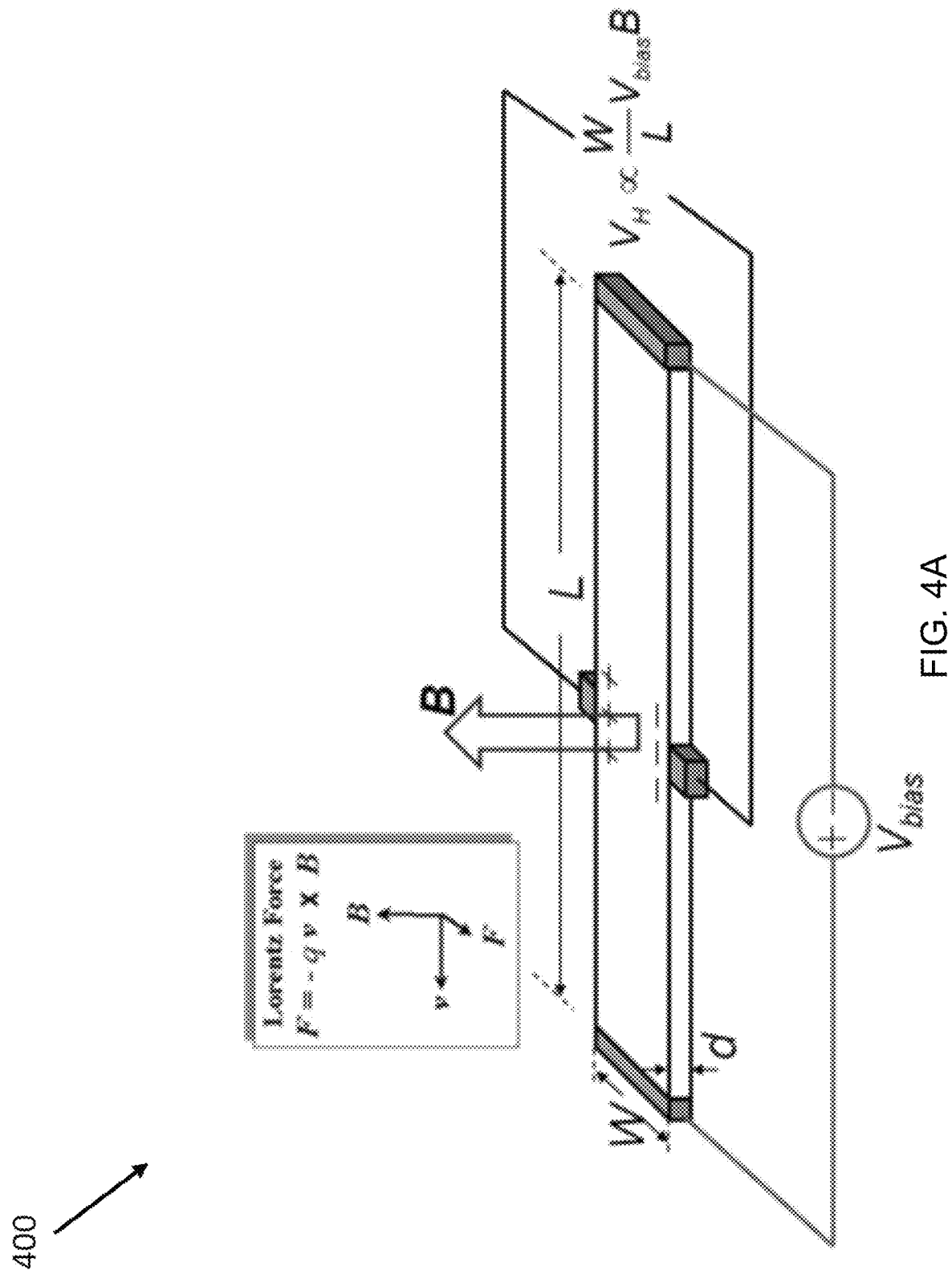
FIG. 4A is illustrates a Hall-effect sensor principle and implementation in CMOS process.
Figure 4B:
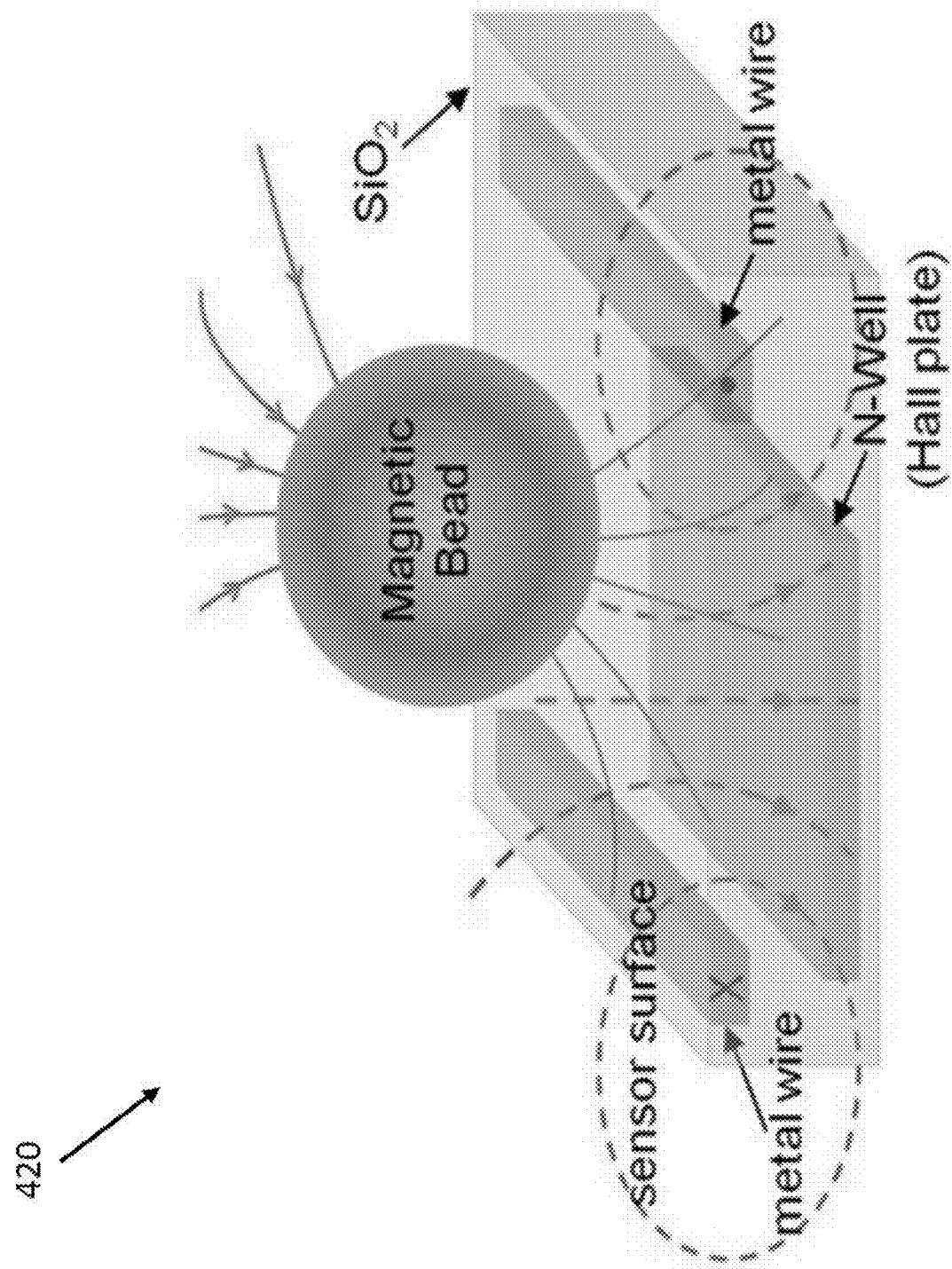
FIG. 4B includes a diagram illustrating the principle of detecting a bead on a CMOS Hall sensor surface.

The magnetic sensor may be based on Hall-effect in current-carrying conductors implemented in the active layer of standard CMOS process. This is illustrated in FIGS. 4A-B. In particular, FIG. 4A illustrates in 400 a Hall-effect sensor principle and implementation in CMOS process. For a current-carrying conductor plate in a magnetic field transverse to the current direction, Lorentz force causes the charges to move along a curve path and therefore a Hall voltage that is proportional to the external magnetic field to develop across the plate. FIG. 4B includes a diagram 420 illustrating the principle of detecting a bead on a CMOS Hall sensor surface. The current-carrying metal wires, which may be covered with silicon oxide and may only be 1 μm from sensor surface, generate the magnetizing field (dashed lines) to magnetize the bead (solid lines). The magnetic fields are detected by the embedded Hall plate, which is implemented in the N-well layer of standard CMOS process. The current contacts and sensing contacts of the Hall plate are not shown.

In the depictions, each unit sensor occupies 5 μm×5 μm, which is close to the size of the bead labels. However, as discussed above, the area of the magnetic sensor may be more than one order of magnitude greater than the size of the bead labels (such as at least two orders of magnitude greater).

The plurality of magnetic sensing elements may be arranged in arrays of rows and columns. Each magnetic sensing element may have a size about same as a size of a magnetic bead labeled to a cell. For example, each magnetic sensing element may have a size about 5×5 micrometers. By way of example, each magnetic sensing element may include a N-well plate and a pair of metal wires each being disposed adjacent along a side of the N-well plate configured to generate a magnetic field for magnetizing a magnetic bead labeled to a cell.

Figure 4C:
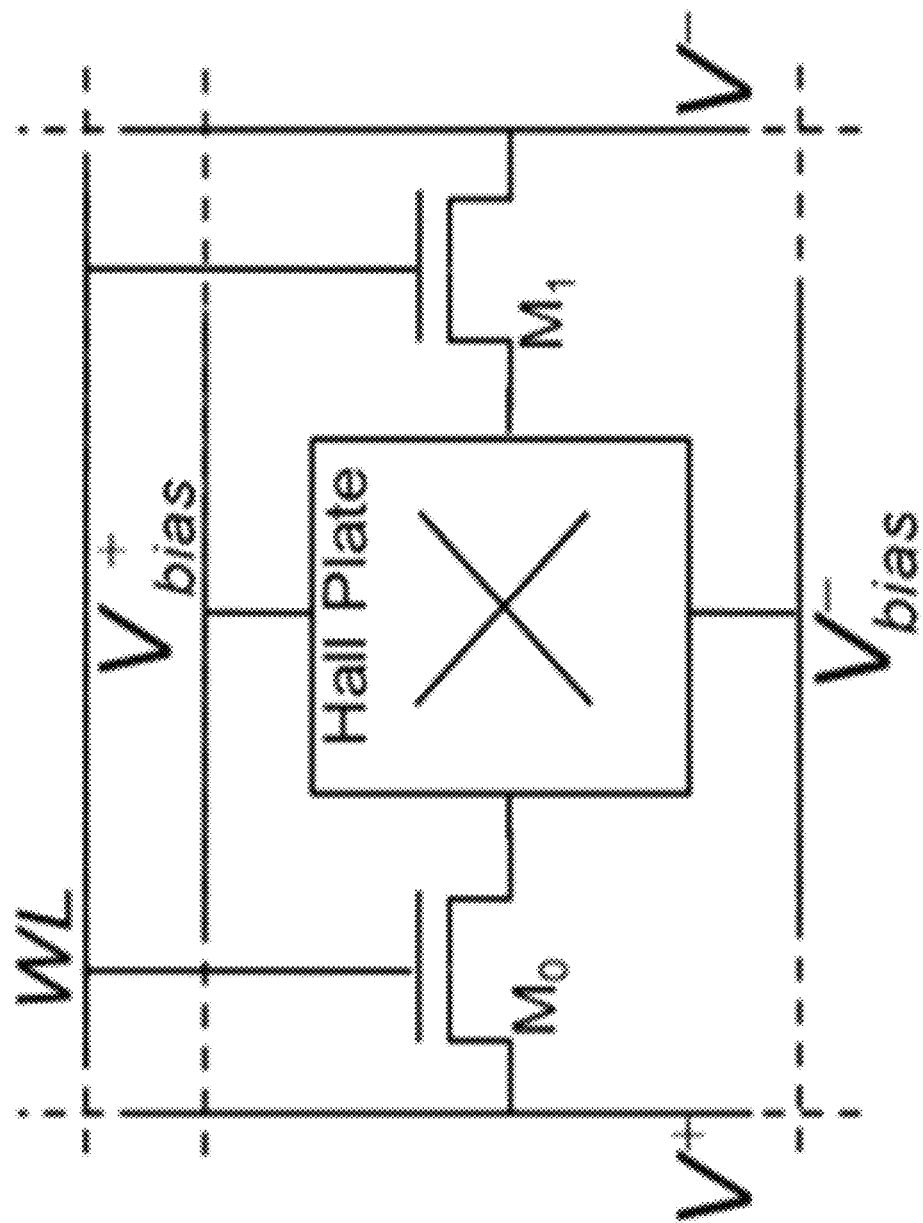
FIGS. 4C-D illustrate individual unit sensors, with FIG. 4C illustrating a schematic and FIG. 4D illustrating the layout, with both arranged in an 8×6 array.
Figure 4D:
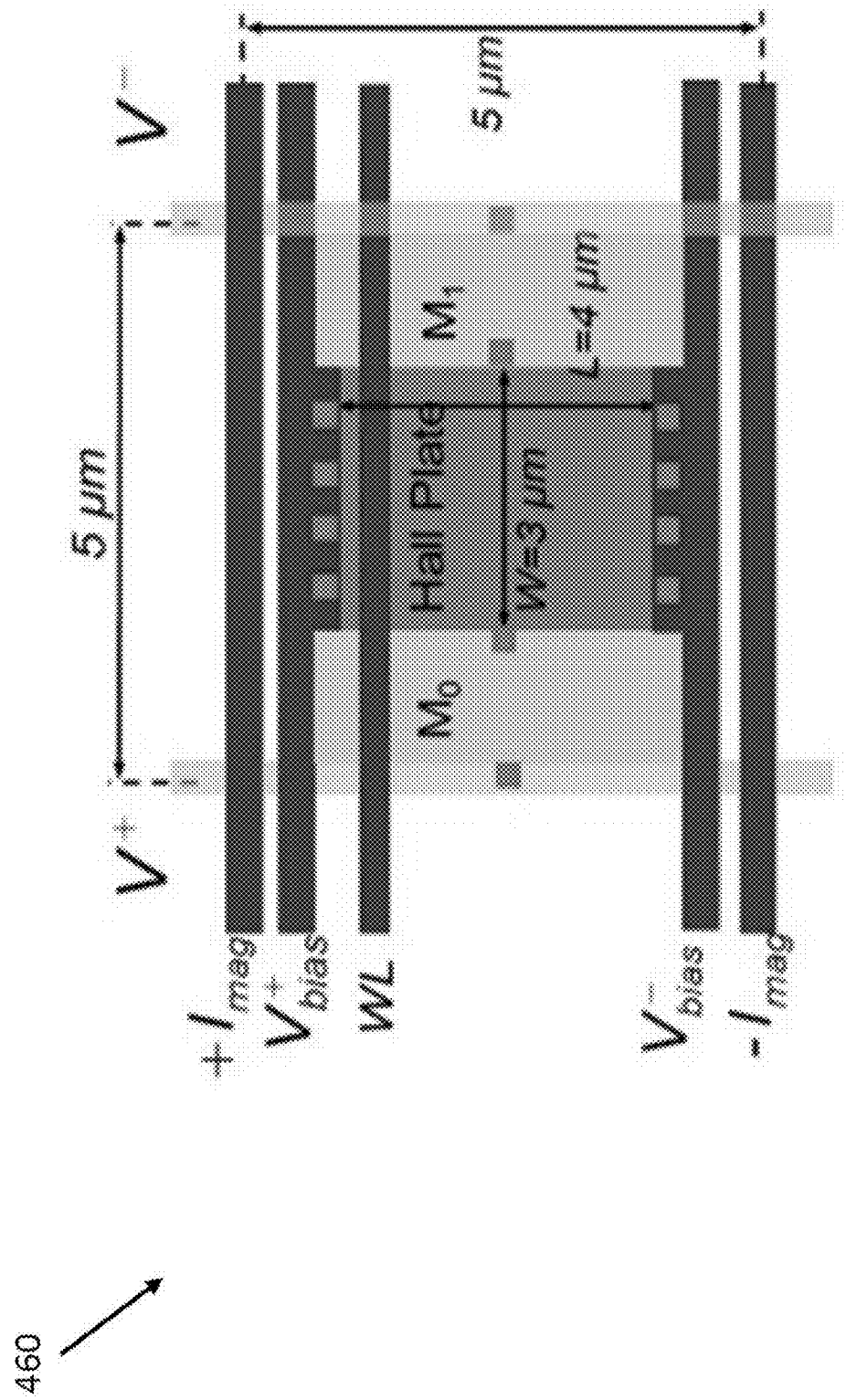

A Hall sensor array may then be implemented to detect the presence of any magnetic bead on its surface (FIGS. 4C-D). In particular, FIGS. 4C-D illustrate individual unit sensors, with FIG. 4C illustrating a schematic 440 (including transistors $M_0$ and $M_1$ activated by wordline WL, and Hall Plate biased by $V_{bias}$) and FIG. 4D illustrating the layout 460, with both arranged in an 8×6 array. By taking advantage of the high functionality of modern microelectronics, all three components for bead detection (sensors, magnets and readout circuits) may be integrated on a single 2.5 mm×2.5 mm CMOS chip, reducing system cost and ensuring device performance consistency.

Figure 4E:
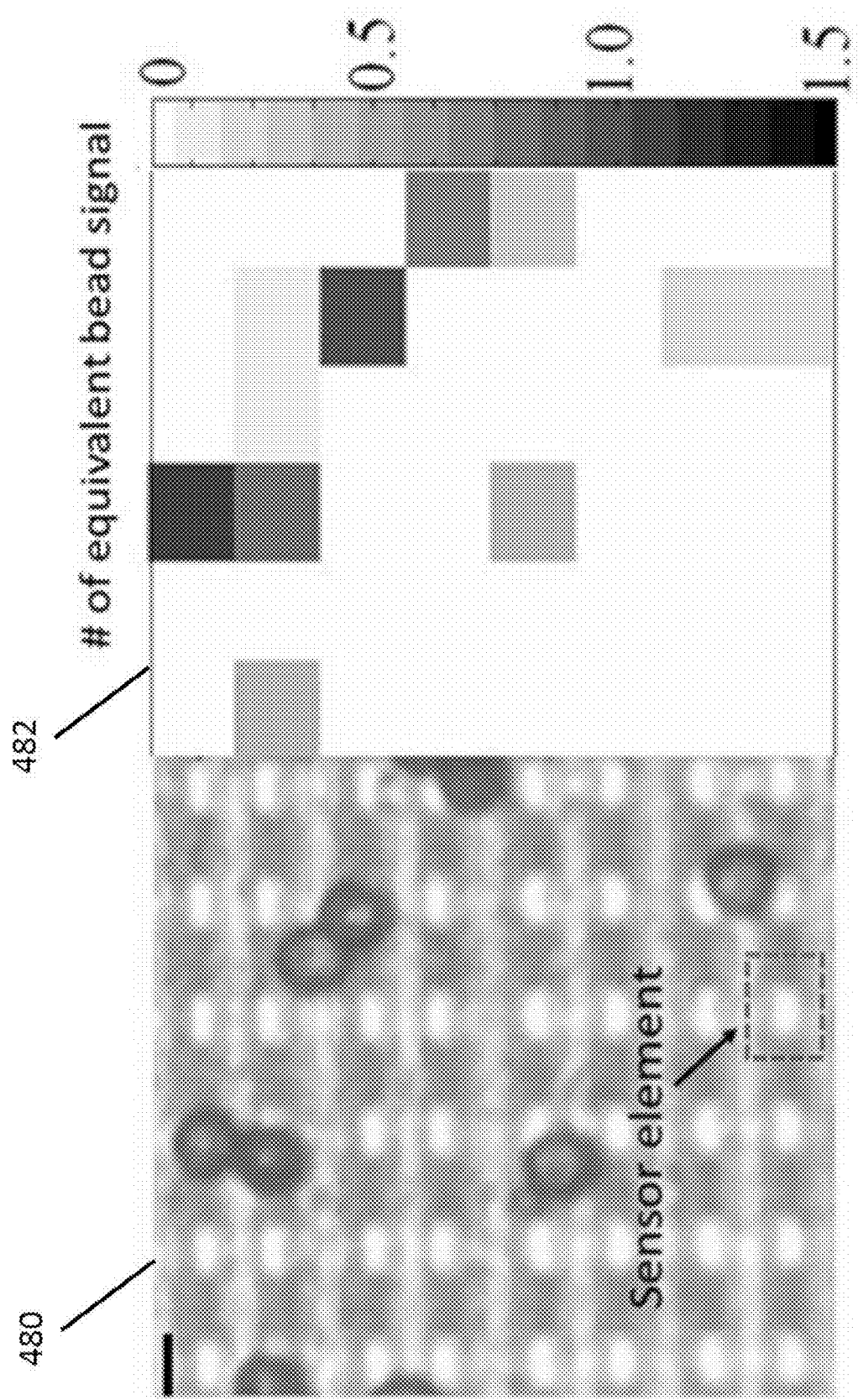
FIG. 4E illustrates on the left side a top view with detected beads and on the right side the output of the sensor array.

Single 4.5-μm microbeads may be detected anywhere on sensor array surface, with the sensor outputs correlating well with the image taken under optical microscope (see the left side 480 of FIG. 4E). Each unit sensor may comprise a Hall plate and two access transistors controlled by wordline (WL). Each wordline may be shared by sensors in the same row. Therefore, Hall sensor outputs (V+ & V−) in each row may be read out in parallel. FIG. 4E on the right side 482 is the output of the sensor array, demonstrating the bead signal detected by an 8×6 sensor array on the CMOS chip. A 2-μl droplet of diluted Dynabeads M450 (4.5 μm diameter) bead sample was placed on the sensor surface and left to air dry (illustrated on the left). This optical image illustrated on the left side of FIG. 4E matches the output of the 48-sensor array (with a scale bar of 5 µm) shown on the right. As shown, the sensor signal is strongest when the bead is located at the middle of a sensor; when the bead is located on the border of sensors, it is detected by multiple adjacent sensors with weaker signal.

Figure 4F:
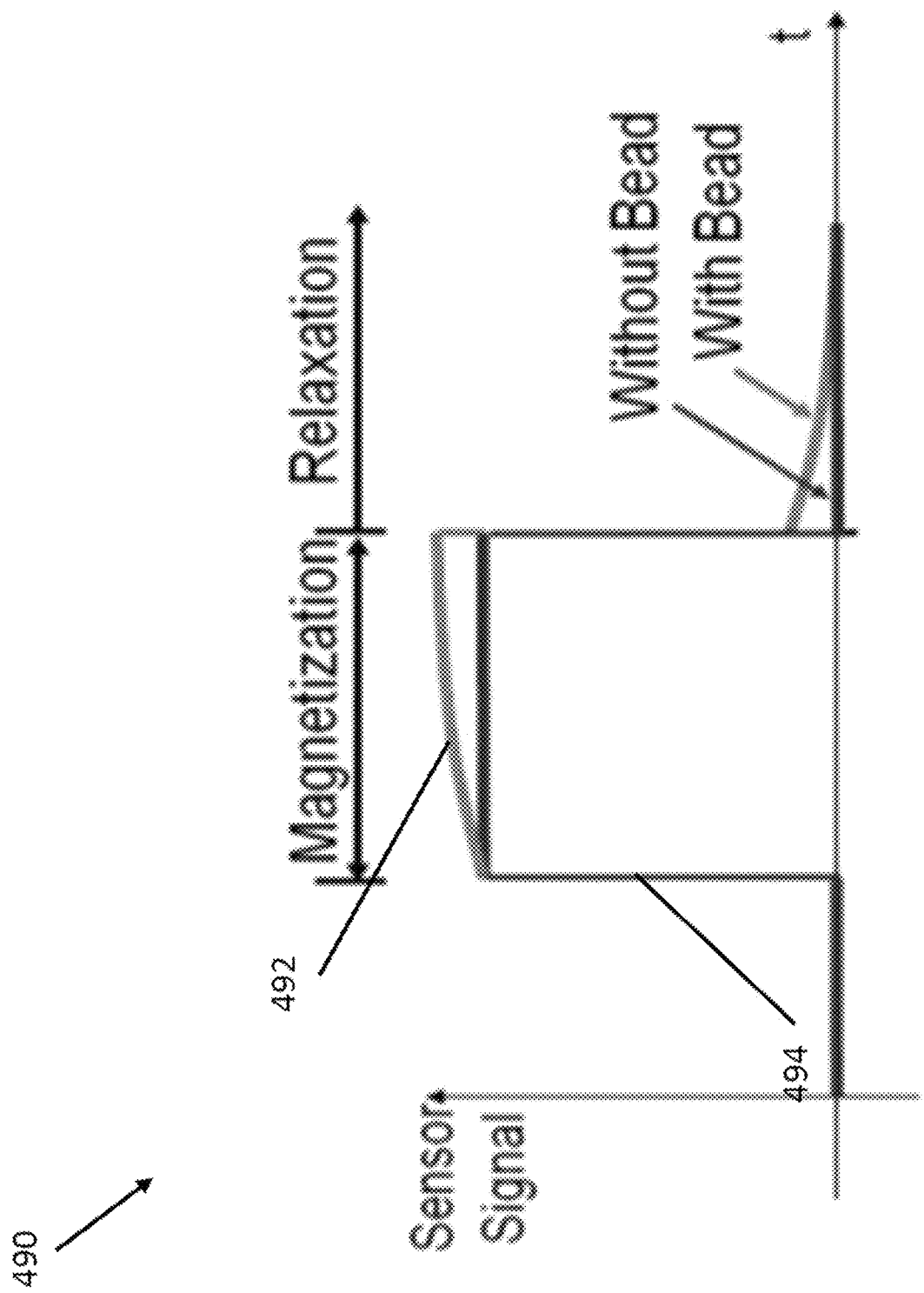
FIG. 4F illustrates principles of bead detection by relaxation.
Figure 4G:
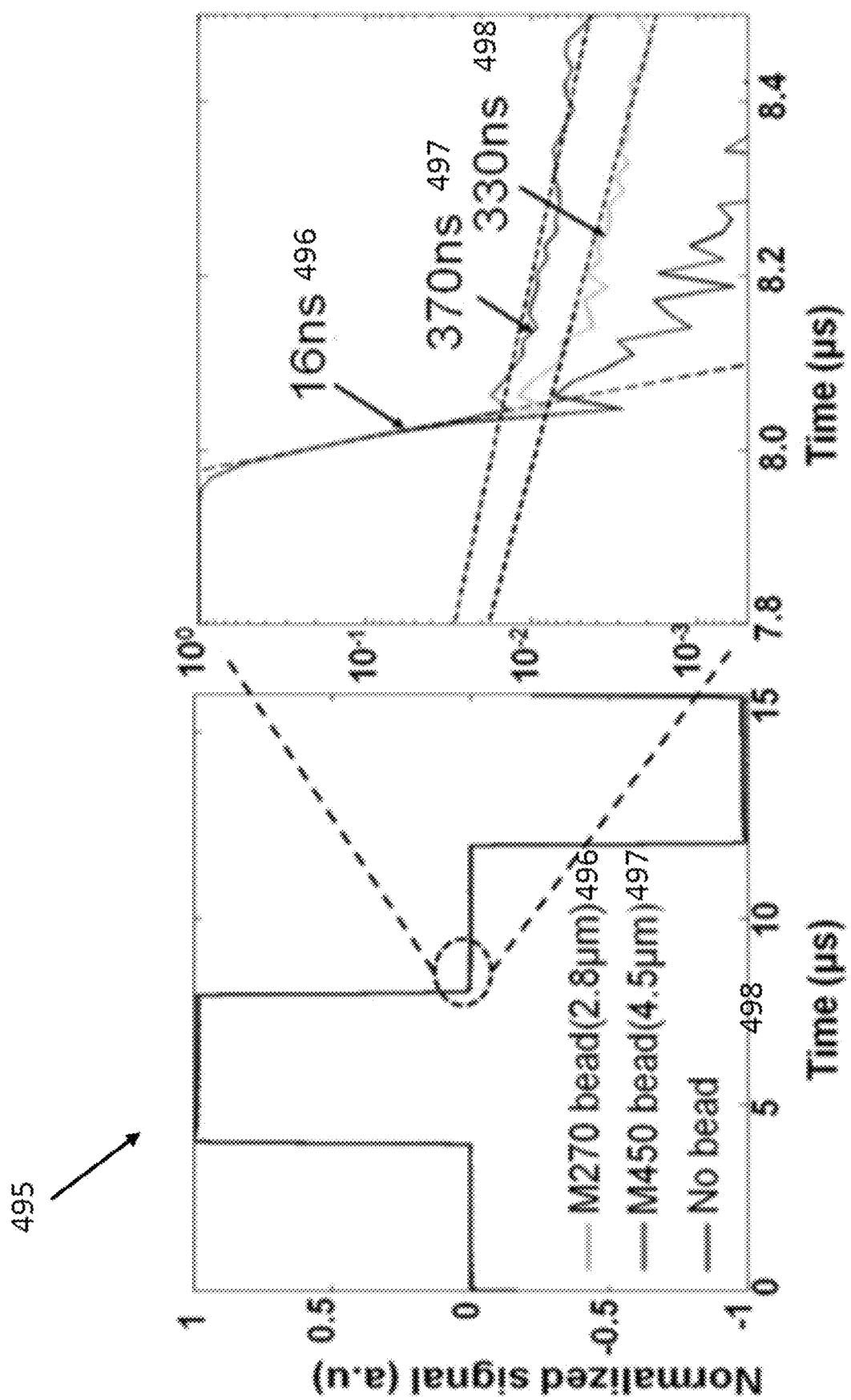
FIG. 4G illustrates detection of single bead using the magnetic relaxation method.

Robust detection of single bead may be achieved by adopting a method based on the magnetic relaxation of the magnetic bead (illustrated in FIGS. 4F-G). In particular, FIG. 4F illustrates a FIG. 490 of principles of bead detection by relaxation. The sensor may respond when a bead is present (curved line 492) or absent (straight line 494) are shown. In the present disclosed relaxation method, the bead signal is measured during relaxation when the large magnetizing field is off for robustness and to reduce detection errors. FIG. 4G is an illustration 495 detection of single bead using the magnetic relaxation method. Single 4.5-µm (Dynabeads M450 (497)), 2.8-µm (M270 (496)) beads and no bead (498) are tested with same sensor. The bead is magnetized by an external field with a 4-phase modulation repeated by many cycles. The averaged signal is recorded and then normalized (shown on the left of FIG. 4G). An expanded view on the right of FIG. 4G illustrates the bead relaxation traces in semilog-scale where the beads' exponential decay with a time constant ~300 ns may be easily recognized.

Detecting a superparamagnetic bead includes magnetizing the bead first. However, during the magnetization, the bead's field is eclipsed by the magnetizing field which is usually several orders of magnitude larger. Therefore, conventional methods suffer from detection errors that could lead to false positives and negatives. In one implementation, single bead detection is based on measuring the Néel relaxation of the bead (see FIG. 4F). When the magnetizing field is turned off abruptly, the beads signal will decay to zero following its Néel relaxation time constant, described by the Néel-Brown model. Since the bead signal is measured during relaxation where the interfering magnetizing field goes to zero, detection errors are significantly reduced. The implemented bead detection sequences comprises 4 phases of magnetizing field modulation by controlling the current through the metal wires (electromagnets). With this modulation sequence, net DC magnetizing field during a cycle remains at zero. The modulation sequence repeats for several cycles and the recorded sensor signal may be averaged to reduce white noise. A correlated double sampling algorithm is then applied to reject sensor offset and other non-idealities to achieve high signal-to-noise ratio.

Figure 5A:
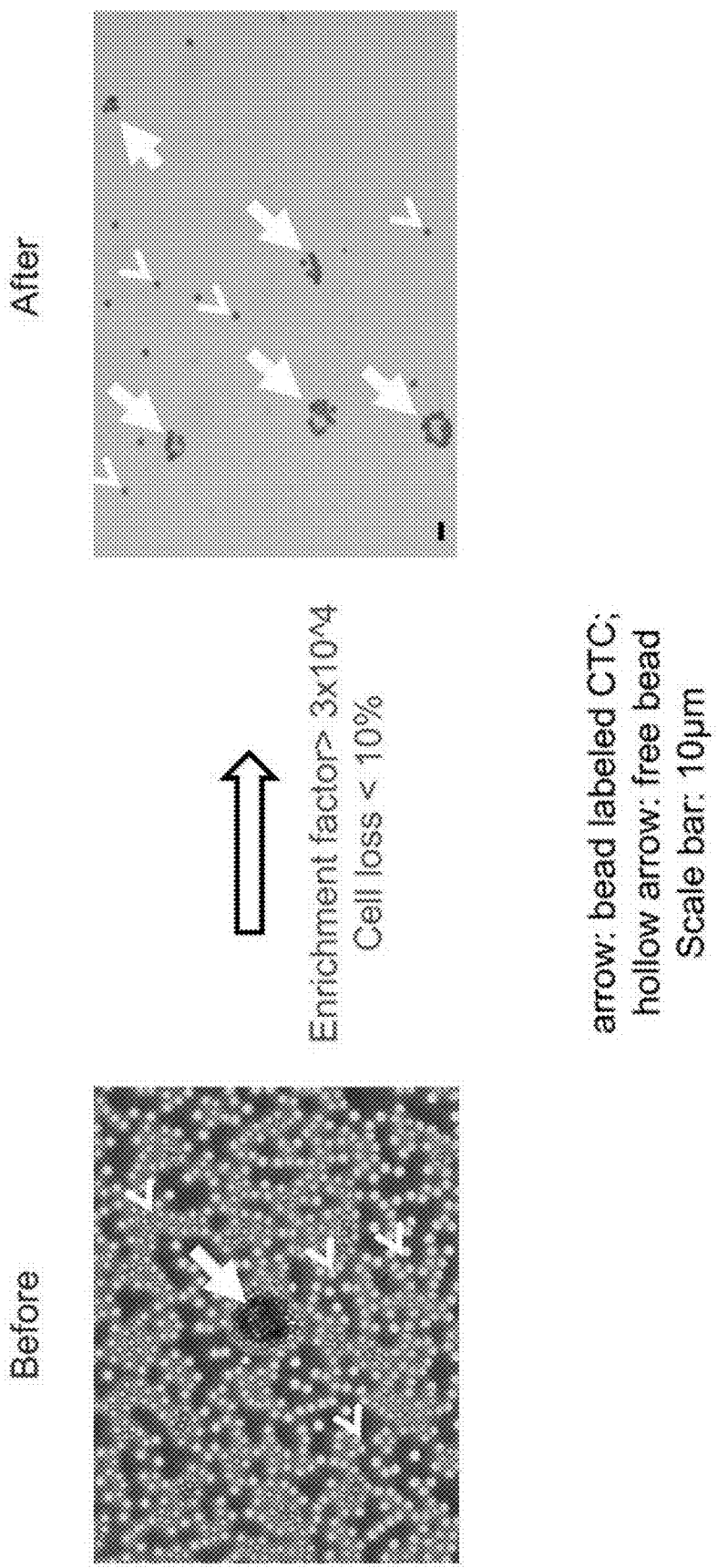
FIG. 5A illustrates one example of free bead removal.

FIG. 5A illustrates one example of free bead removal, illustrating the free beads in the solution before removal of at least some of the free beads, and after applying a free bead removal/reduction step. As discussed above, one of multiple methods of removal or reduction of free beads may be used, including membrane filtration and density gradient centrifugation. As discussed above, free beads and bead-bound cells are very different in size (4.5 µm vs. 20 µm) and density (1.6 g/cm3 vs. 1.3 g/cm3 for a 20-µm target cell fully conjugated with beads). In this regard, membrane filtration or density gradient centrifugation may be used in order to achieve an enrichment factor over $3\times10^4$ and with target cell loss less than 10% (see FIG. 5A). Thus, as shown, many free beads are removed (such as reducing by an order of magnitude, or reducing by multiple orders of magnitude), while reducing the cells by less than 10% (e.g., reducing the cells by much less than an order of magnitude).

As discussed above, in one implementation, the system may reduce the number of free beads in the fluid, such as in the blood sample. Magnetic beads may be applied to the fluid (such as to a blood sample) in the cell isolation step. A large majority of the magnetic beads may not bind, leaving many of the beads to be unattached (e.g., free beads). Optionally, after applying the unbound beads to the fluid, the system may perform one or more steps in order to reduce the number of free beads in the fluid.

The number of free beads may be reduced in one of several ways. In one way, a filter may be used to remove some of the free beads from the fluid. As discussed above, the free beads may be smaller than the CTCs that have a magnetic bead bound thereto. For example, the free beads may be less than 5 m, such as 4.5 µm, whereas the CTCs may be on the order of 20 µm. Further, other cells, such as white blood cells, may be approximately 10 µm. Thus, in one implementation, a filter, such as a filter membrane, which may pass particles less than 7 µm, may be used. Specifically, the fluid may be passed through the filter membrane, which has a mesh such that particles less than 7 µm, are passed through. In this way, cells larger than 7 µm, such as CTCs or white blood cells, may be caught in the filter membrane, whereas free beads may pass through the filter membrane. Alternatively, a filter membrane with a mesh that catches particles greater than 12 µm may be used.

For example, for membrane filtering, the following filter may be used: 13 mm, 7-µm pores, Precision Membrane, Provo, Utah. For density gradient centrifugation, the following parameters may be used: Ludox TM-50, 1.4 g/cm³, W.R. Grace Inc, Columbia, Md. In both examples, free beads may be reduced to several hundreds.

In this case, CTCs may be caught in the filter membrane, whereas free beads and white blood cells may pass through. In this way, the number of free beads in the fluid may be reduced.

In another way, a centrifuge may be used to reduce the number of free beads in the fluid. For example, the density of the free beads may be more than the density of the CTCs that have a magnetic bead bound thereto. Thus, a centrifuge may be used to spin the fluid, thereby separating particles at different densities, such as separating the free beads from the CTCs that have a magnetic bead bound thereto.

In still another way, one or more electric currents may be used to separate the free beads from other particles (such as CTCs that have a magnetic bead bound thereto) in the fluid. For example, the weight of the free beads is less than the weight of the CTCs that have a magnetic bead bound thereto. Thus, a current may be applied that is sufficient to move a free bead, but insufficient to move CTCs that have a magnetic bead bound thereto. In this way, the current may be used to move the free beads within the fluid. After which, the free beads may be removed from the fluid.

Figure 5B:
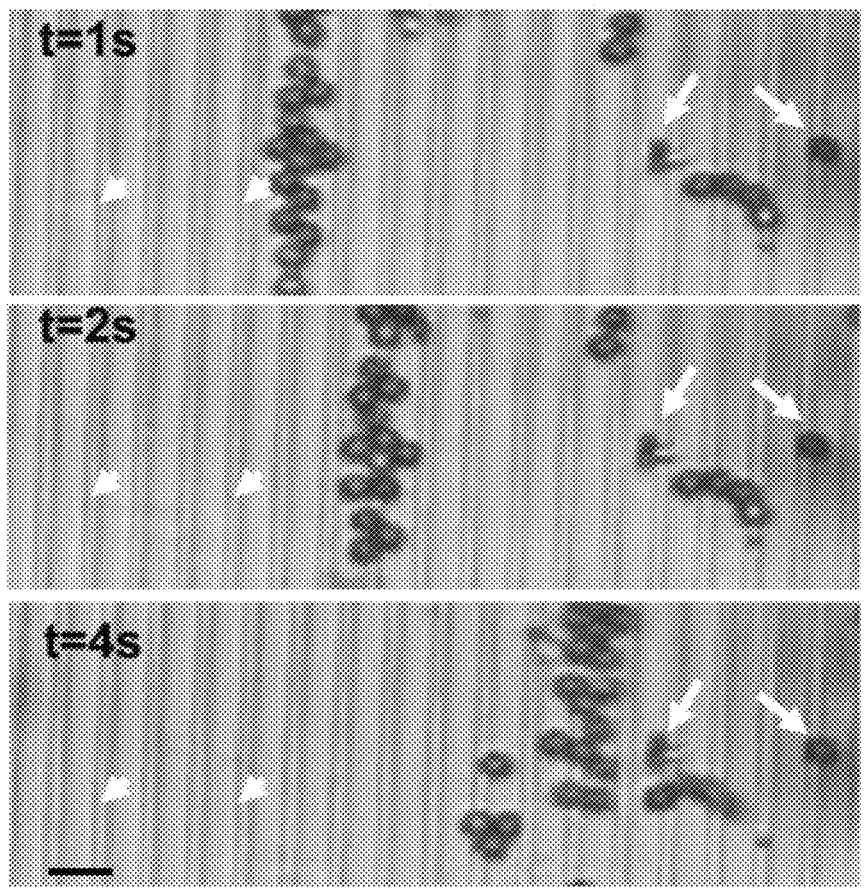
FIG. 5B illustrates one example of on-chip bead manipulation.

FIG. 5B illustrates one example of on-chip bead manipulation (with a scale bar of 10 µm). By programming the currents flowing through each metal wire, the chip may generate spatially-patterned microscopic magnetic field on the chip surface and transport individual bead-bound cells to desired locations. For instance, bovine capillary endothelial (BCE) cells engulfed with magnetic particles may be manipulated with on-chip microcoils.

The chip may contain an array of microcoils which produces spatially-patterned microscopic magnetic fields on the surface of the chip. In a given magnetic field pattern, the bead-bound cells are attracted toward local field magnitude peak positions and become trapped there. Therefore, by reconfiguring the spatial field pattern and hence by moving the field magnitude peak positions, the individual bead-bound cells can be transported to their desired locations. The modification of the field pattern can be done by changing the current distribution in the microcoil array using integrated control electronics. For example, each microcoil may be connected to its own current source for independent magnetic field control. Using microscopic magnetic field patterns generated by a microcoil array circuit allows manipulation of individual cells, moving each cell along a different path.

Thus, in one implementation, the chip may include 256 metal wires and controlling circuits to manipulate movement of the magnetic beads (FIG. 4B). In this regard, the generated magnetic field may be used to attract the beads towards local peak field position. For example, beads may move at a speed of 16 μm/s with 20 mA switching. The metal wires of the chip may be designed using modeling of bead movement with multi-physics software COMSOL (COMSOL Inc., Burlington, Mass.) by calculating magnetic force, Stoke's drag force and chip surface friction force. Each wire in FIG. 5B is 2 μm in width and 2 mm in length. Metal wire pitch is 8 μm. In the implementation of FIG. 5B, a droplet of 4.5-μm beads (CELLection® biotin binder, Invitrogen, Carlsbad, Calif.) was added to chip surface. A 20 mA current is then switched into the metal wires from left to right. The beads move at a speed of 16 μm/s. Specifically, FIG. 5B illustrates at different times (t=1 second; t=2 seconds; t=4 seconds) the effect on the beads with applying a magnetic field via metal wires. Arrowheads in FIG. 5B illustrates metal wires, whereas arrows represent reference points.

Thus, in one implementation, prior to the cell sorting step, the number of non-CTC cells may be reduced. For example, the number of white blood cells may be reduced by an order of magnitude or by several orders of magnitude, such as via the cell isolation step. After which, the number of white blood cells may be comparable with the number of CTCs (e.g., on the same order of magnitude). As another example, the number of free beads may be reduced by an order of magnitude or by several orders of magnitude, such as via the free bead reduction step.

After the number of non-CTC cells may be reduced, the fluid may be inserted into the well. The system may insert the fluid into the well in one of several ways. In one way, the system may pipet the fluid into the well, such as via a syringe pump. In another way, the system may use microfluidics to introduce the fluid into the well. As one example, microfluidics may include one or more channels to guide fluid to and/or from the well.

In one implementation, the microfluidic channel, with inlet and outlet ports, may connect to the sample well so that after the target cells are sorted, the non-target cells and contaminants may be washed off from the well surface (e.g., the bottom surface and/or sides of the well) so the sensor device can be reused. In an alternate implementation, each corner (e.g., each reservoir) of the chip may be connected with a microfluidic channel, with inlet and outlet ports, so that the sorted single target cell (e.g., located at the reservoir of the sample well) may be transferred to a vial or tube or micro-well for further analysis. The number of inlet (or outlet) ports may be one or more than one (in order to mix fluids).

Figure 5C:
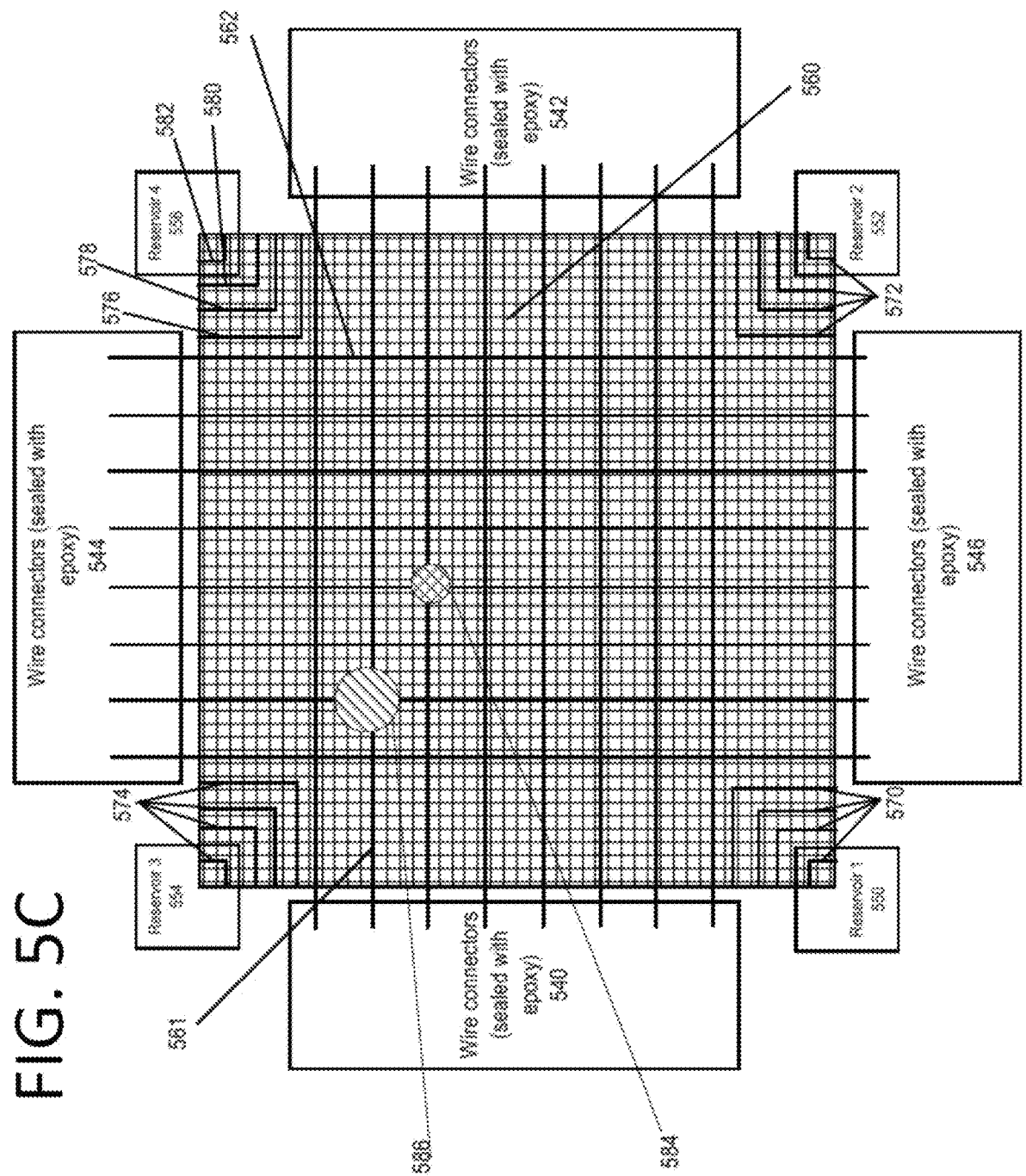
FIG. 5C illustrates a layout of a well and associated circuitry for cell identification and/or cell sorting.
Figure 5D:
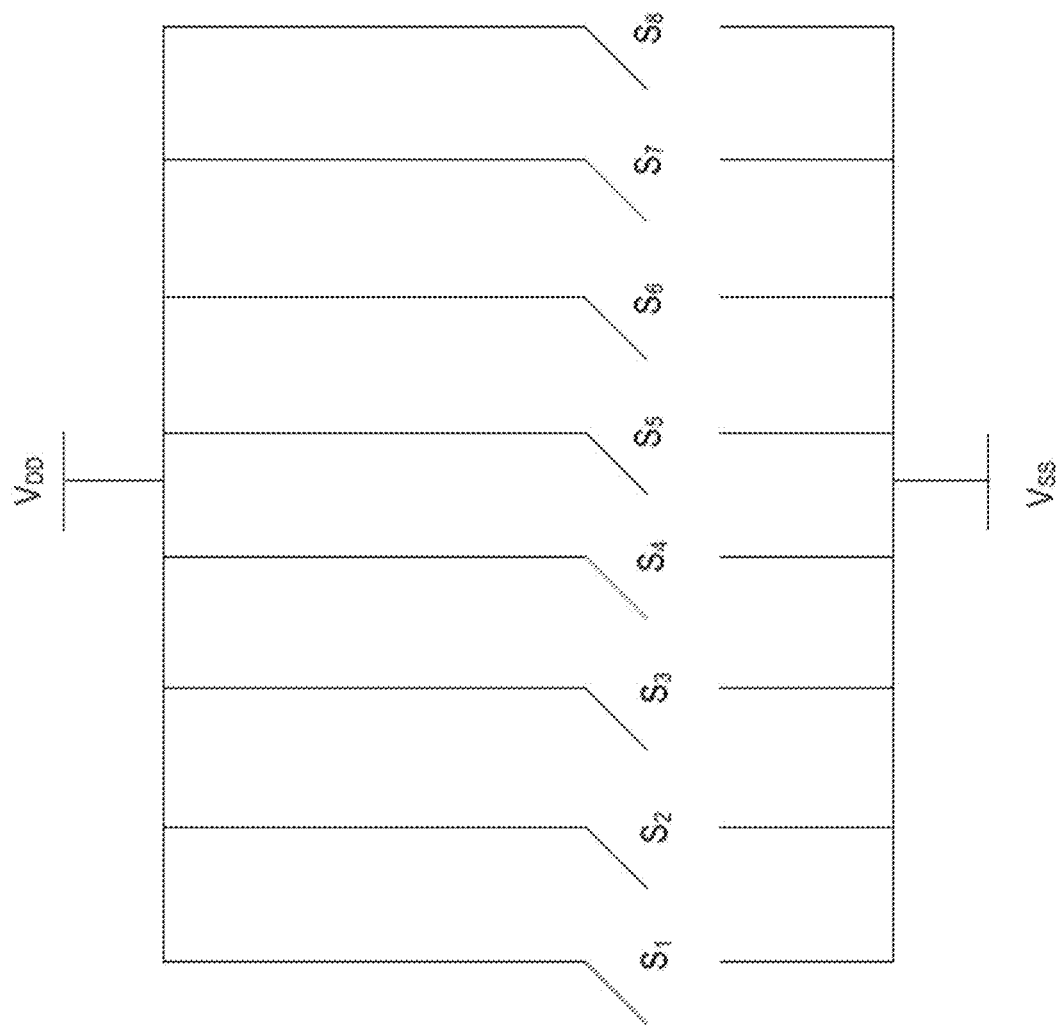
FIG. 5D illustrates control circuitry for the circuitry illustrated in FIG. 5C.
Figure 5D:
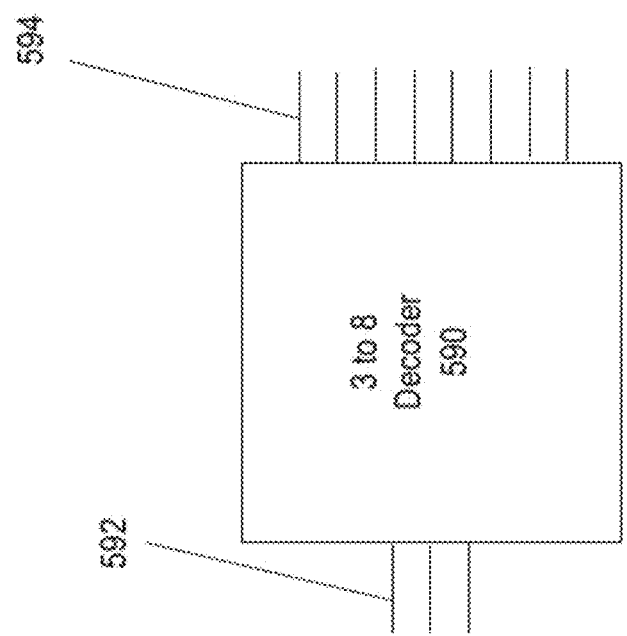

FIG. 5C illustrates a layout of a well and associated circuitry for cell identification and/or cell sorting. As discussed above, the fluid may be introduced into the well 560 (shown in a mesh background) in one of several ways. After introduction, the particles in the fluid may be subject to a magnetic field, such as generated by horizontal wires 561 (8 horizontal wires shown) and by vertical wires 562 (8 vertical wires shown). Horizontal wires 561 and vertical wires 562 may be positioned relative to a surface of the well (such as underneath a bottom of the well). The horizontal wires may be connected to wire connectors 540, 542, which may be sealed with epoxy. Likewise, the vertical wires may be connected to wire connectors 544, 546, which may be sealed with epoxy.

As shown in FIGS. 5D, 6A-C, and 7A-C, metal lines are used to generate the magnetic field. Metal lines, as opposed to a coil, may provide better control over the movement of the beaded target cells. For example, if a photograph of the well is taken before and after application of the magnetic field, the system (or an operator) may make a better determination after turning on one of the metal lines. Further, one or more algorithms may be used to turn on/off the different wires in sequence in order to move the beaded target cells to a respective reservoir (as opposed to a coil, which does not offer as precise a control of the magnetic field).

One example of control current through the horizontal wires 561 and the vertical wires 562 is illustrated in FIG. 5E. In particular, inputs 592 to a decoder or other type of multiplexer (such as 3-to-8 decoder 590) may generate an output 594. The output may be used to control one of the switches, such as $S_1$, $S_2$, $S_3$, $S_4$, $S_5$, $S_6$, $S_7$, and $S_8$ (connected between $V_{DD}$ (e.g., 5V) and $V_{SS}$ (e.g., circuit ground) As one example, an input of 001 may translate into the output of decoder to close switch $S_2$, so that current flows through the respective wire.

The control of current through the wires may be accomplished by analytics/sorting system 360. For example, particles 584 and 586 may be in well 560. Analytics/sorting system 360 may control the current through the horizontal wires 561 and the vertical wires 562 on a quadrant by quadrant basis so that the magnetic particles may be moved to the reservoir in the respective quadrant. Specifically, analytics/sorting system 360 may control the current through the horizontal wires 561 and the vertical wires 562 so that magnetic particles in the lower left quadrant may be moved toward Reservoir 1 (550), in the lower right quadrant may be moved toward Reservoir 2 (552), in the upper left quadrant may be moved toward Reservoir 3 (554), and in the upper right quadrant may be moved toward Reservoir 4 (556). In this way, the analytics/sorting system 360 (such as the processor of the analytics/sorting system 360) may control the magnetic field to different parts of the well (e.g., control the timing of current flowing through the horizontal wires 561 and the vertical wires 562 in order to generate magnetic fields in different parts of the well at different times).

More specifically, analytics/sorting system 360 may control a multiplexer, which in turn controls switches to turn on/off current to the various wires. In one implementation, analytics/sorting system 360 may control the switches in a predetermined sequence (without any feedback from a sensor). In an alternate implementation, analytics/sorting system 360 may control the switches (which in turn controls the wires) based on sensor input. In a first specific implementation, the sensor input may comprise optical sensor input, whereby the optical sensor provides data to the analytics/sorting system 360, with the analytics/sorting system 360 determining movement of the beads. In a second specific implementation, the sensor input may comprise magnetic sensor input, whereby the magnetic sensor provides data to the analytics/sorting system 360, with the analytics/sorting system 360 determining movement of the beads. Thus, the sensor input may be used as feedback for the analytics/sorting system 360 to determine when/whether turn on the different wires in well 560.

After the magnetic particles are moved toward a respective reservoir, wires may bracket the reservoir, such as illustrated in wires 570 bracketing Reservoir 1 (550), wires 572 bracketing Reservoir 2 (552), and wires 574 bracketing Reservoir 3 (554). Further wires 576, 578, 580, 582 bracket Reservoir 4 (556). 570, 572, 574, 576, 578, 580, 582 may be positioned relative to a surface of the well (such as underneath the bottom of the well). The distance between wires 576 and 578 may be 5 μm (or on the order of 5 μm). Analytics/sorting system 360 may control the current through the different wires, such as 570, 572, 574, 576, 578, 580, 582 to guide the magnetic particles to the respective reservoir. For example, with regard to Reservoir 4 (556), analytics/sorting system 360 may first turn on wire 576, then wire 578, then wire 580, and then wire 582. This sequence may similarly be performed for wires 570, 572, 574. Thus, in one implementation, the magnetic particles may be guided to a respective reservoir solely by controlling the current through various wires. In an alternate implementation, the magnetic particles may be guided to a respective reservoir by controlling the current through various wires (in order to place the magnetic particle proximate to the respective reservoir), and thereafter using a magnetic gripper in order to place the magnetic particle into the reservoir (e.g., magnetic tip that is used to move the bead bound cell to the reservoir).

Thus, FIG. 5C illustrates one or more wires that are shaped or arranged based on the reservoir (such as shaped based on an edge of the reservoir). As one example, Reservoir 4 (556) is rectangular in shape. One, some or all of wires 576, 578, 580, 582 may be shaped or arranged such that they follow an edge (such as a corner of Reservoir 4 (556)).

Further, FIG. 5C illustrates different layouts of wires. For example, horizontal wires 561 and vertical wires 562 are arranged in a grid pattern, whereas wires 570, 572, 574, 576, 578, 580, 582 are arranged in a different pattern (such as based on the shape of the respective reservoir). In this way, the analytics/sorting system 360 may control the current through the different wires, and generate different magnetic fields. Specifically, a first magnetic field may be generated using horizontal wires 561 and vertical wires 562 in order to move the bead labeled target cell close to a respective reservoir, and a second magnetic field may be generated using wires 570, 572, 574, 576, 578, 580, 582 in order to guide the bead labeled target cell closer to (or into) the respective reservoir.

In one implementation, the sorted single cell in the reservoir may be transferred to another container, such as a tube or vial or micro-well, for further analysis. The transferal of the sorted single cell may be performed in one of several ways. In one way, the transfer may occur using a microfluidic channel. Alternatively, the transfer may occur using a magnetic fine tip. As one example, the magnetic fine tip may be manually controlled in order to transfer the single sorted single cell (with magnetic bead attached thereto) to the other container. Alternatively, the system may detect the single sorted single cell (with magnetic bead attached thereto). Responsive to the detection of the single sorted single cell (with magnetic bead attached thereto), the system may automatically control the magnetic fine tip in order to move the single sorted single cell (with magnetic bead attached thereto) to the other container.

For single cell sorting, the wires, such as horizontal wires 561 and vertical wires 562, may be designed to move bead bound cells, such as Caco-2 cells, at a certain rate (e.g., X μm/s). For example, the wires may be designed such that a 20-μm Caco-2 cell with 50% surface area conjugated with beads can move at 12 μm/s with 30 mA. In one implementation, the chip may be designed with a current magnitude that can be programmed from 10 mA to 60 mA. Since the magnetic force on a superparamagnetic particle (e.g., Dynabead) in a magnetic field is given by $F=V\Delta\chi(B\cdot\nabla)B/\mu_0$ where V is the particle's volume, $\Delta\chi$ is the difference in magnetic susceptibilities between the particle and the surrounding medium, $\mu_0$ is the vacuum permeability and B is the applied magnetic field generated by the metal wires which is proportional to the injected current as described in Ampere's Law. Therefore, the magnetic force is roughly proportional to the square of the injected current magnitude. In this regard, the isolated target cells may be manipulated with a speed more than 10 μm/s. One point of interest in the design of the layout of the wires may include an amount of time to move from one point of interest in the well to another, such as from the center of the chip to a corner (which may be on the order of ~3.5 mm), which may be the longest path a cell travels in the well. As discussed above, at the 4 corners of the chip, magnetic tips, such as 4 fine magnetic tips, may be used to pick a single bead-bound cell and place it in a respective reservoir.

In one implementation, the magnetic fields may be generated serially (e.g., the first magnetic field is generated first and the second magnetic field is generated thereafter without any overlap when the two magnetic fields are generated simultaneously). In an alternate implementation, the magnetic fields may be generated such that they overlap at least partly in time (e.g., the first magnetic field and the second magnetic field are generated at least partly simultaneously).

After guiding the magnetic particles into the respective reservoir, the well 560 may be flushed, and another sample of fluid may be inserted into the well 560 (such as via pipetting or microfluidics). In this way, the system may act as a production line, inserting a small volume of fluid (e.g., 1 microliter), process the fluid (e.g., cell isolation and single cell sorting), clean the well (e.g., introduce buffer into the well and then flush the buffer out), then introduce the next sample volume.

Alternatively, instead of performing a free bead removal step (such as discussed above), the fluid sample may be diluted (such as diluted by 1000 times). The diluted fluid may then be introduced into the well as part of a production line, with the beads bound to the CTCs being guided into the respective reservoir.

Figure 6A:
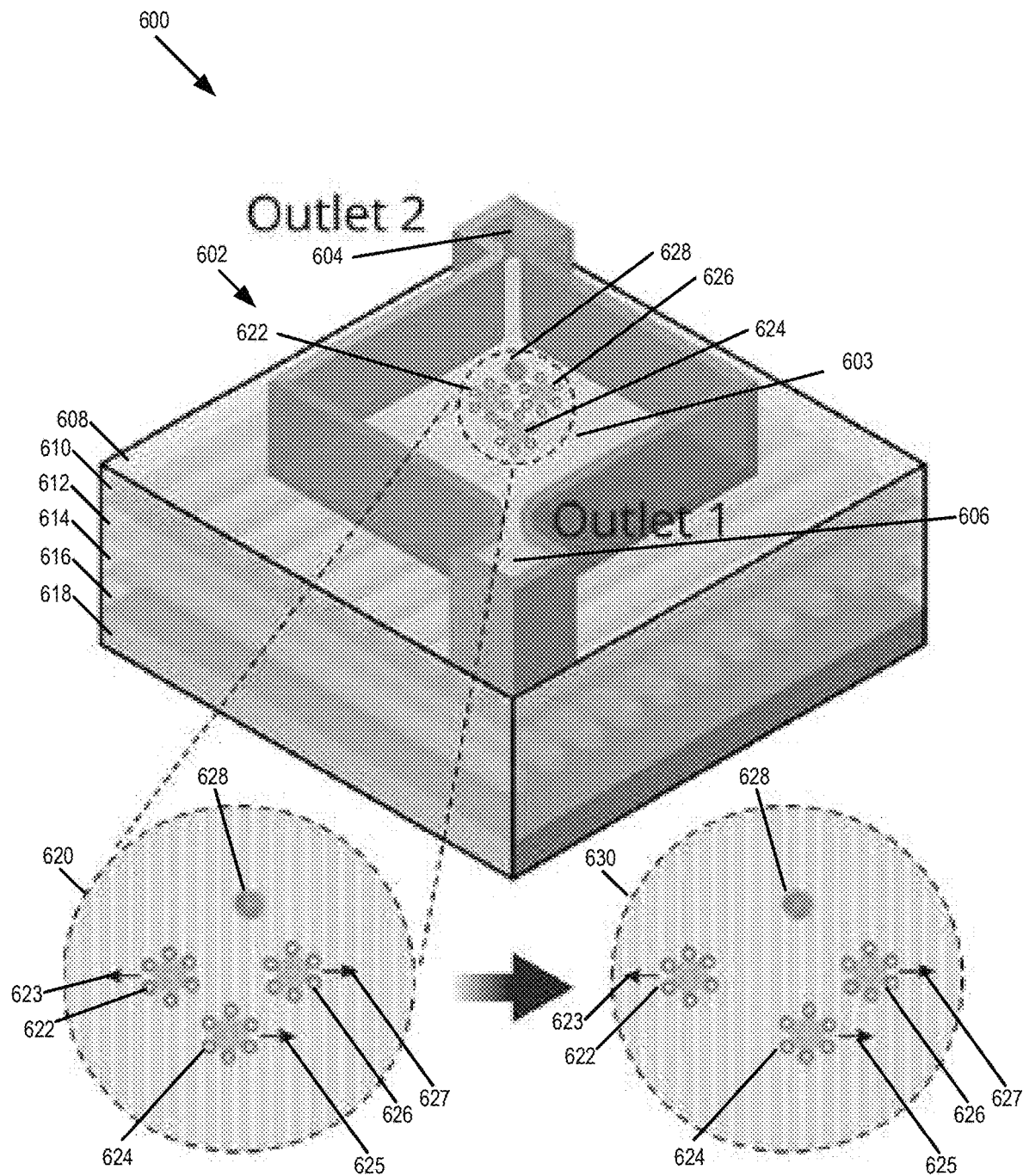
FIG. 6A shows a perspective view of the semiconductor chip including the well in partial cross-section illustrating identification of particles' movement subject to an applied magnetic field.

FIG. 6A shows a perspective view 600 of the semiconductor chip including the well 602 in partial cross-section illustrating identification of particles' movement subject to an applied magnetic field. In particular, the well 602 includes a central area 603 in which one or more particles, such as particles 622, 624, 626, 628 are housed in a fluid. The well 602 further includes one or more outlets, such as outlet 1 (606) and outlet 2 (604). Fewer or greater outlets may be included in well 602. The outlets may be positioned in one or more places along a periphery of central area 603.

As discussed in more detail below, analysis, such as image analysis, may identify one or more particles in central area 603. For example, the image analysis may identify particles 622, 624, 626, 628 that are greater than or equal to a predetermined size, and may further identify the coordinates of the respective identified particles within central area 603 (e.g., X and Y coordinates for each of particles 622, 624, 626, 628). Responsive to identifying the particles, the system may control the magnetic generator in order to apply a magnetic field in one or more parts of the central area 603 of the well in order to determine whether one, some, or each of the identified particles moves responsive to the applied magnetic field. This is illustrated in insets 620, 630, which are images of a section of the central area 603 of well 602 at different times when applying the magnetic field (with the image for inset 620 being taken before the image for inset 630). As merely one example, magnetic fields may be applied individually to each of the identified particles to determine whether each of the identified particles move (e.g., first apply a magnetic field in the vicinity or proximate to particle 622 to determine whether particle 622 moves; thereafter apply a magnetic field in the vicinity or proximate to particle 624 to determine whether particle 624 moves; etc.). Alternatively, a magnetic field may be applied to determine whether more than one particle moves simultaneously (e.g., apply a magnetic field to determine whether one, some, or all of particles 622, 624, 626, 628 move simultaneous; apply a magnetic field to determine whether one or both of particles 622, 624 move, and thereafter apply a magnetic field to determine whether one or both of particles 626, 628 move). Further, different types of magnetic fields may be applied on the particles (either serially or simultaneously) to determine movement. As discussed above, particles in the well 602 may include magnetic bead-labeled target cell(s), free beads (such as in a clump) and contaminants. The free beads (including in a clump) may move responsive to a weaker field than a magnetic bead-labeled target cell due to the smaller mass of the free beads. In this regard, the magnetic fields applied to one, some or all of the identified particles may be performed in stages, such as in a first stage (with a weaker applied field that is still strong enough to move free beads in a clump but not strong enough to move the magnetic bead-labeled target cell) and in a second stage (with a stronger applied field that is strong enough to move the magnetic bead-labeled target cell). In this way, if a specific identified particle moves responsive to applying the weaker field, the system may determine that the specific identified particle is a free bead or a clump of free beads. Further, if another identified particle does not move responsive to applying the weaker field but does move responsive to applying the stronger field, the system may determine that the another identified particle is the magnetic bead-labeled target cell (and is identified to be moved to one of the outlets 604, 606 in the well 602). Still further, if yet another identified particle does not move responsive to applying the weaker field and does not move responsive to applying the stronger field, the system may determine that the yet another identified particle is a contaminant (whose coordinates may be identified as a potential obstacle when routing the magnetic bead-labeled target cell to one of the outlets 604, 606 in the well 602, discussed further below). Referring back to FIG. 6A, the magnetic fields may be applied in order to identify movement in one or more of the identified particles, such as movement 623 in particle 622, movement 625 in particle 624, and movement 627 in particle 626. Further, the system may identify that particle 628 does not move at all.

Figure 6B:
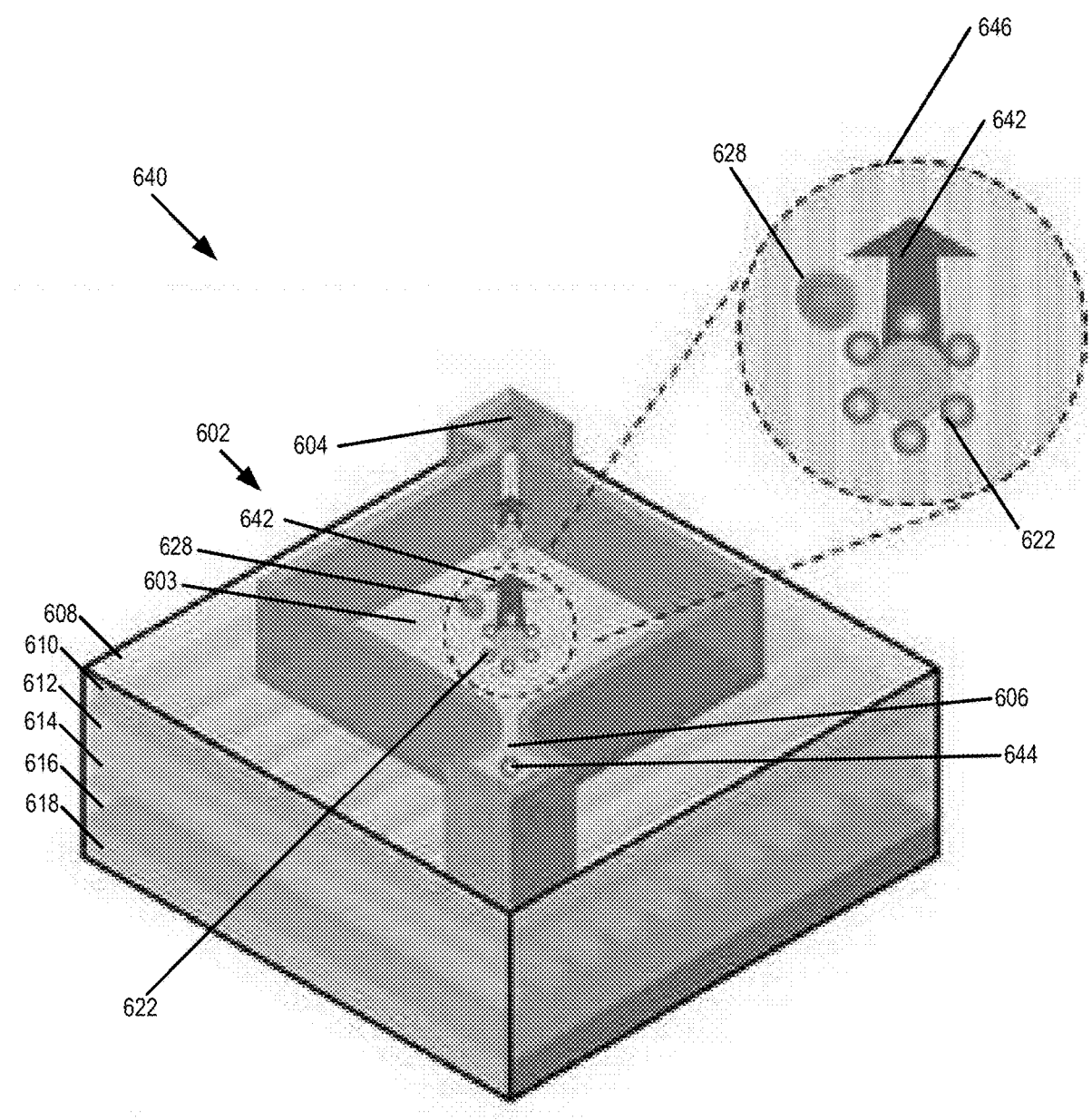
FIG. 6B shows the perspective view of the semiconductor chip in FIG. 6A with one of the particles, identified in FIG. 6A as moving subject to an applied magnetic field, being directed to an outlet of the well.

FIG. 6B shows the perspective view 640 of the semiconductor chip in FIG. 6A with one of the particles 622, identified in FIG. 6A as moving subject to an applied magnetic field, being directed to an outlet 604 of the well. As discussed above, after identifying a particle that moves responsive to a magnetic field (such as moving responsive to the stronger magnetic field but not moving responsive to the weaker magnetic field), the system may then identify its current position in the well (such as after moving responsive to the stronger magnetic field) in order to route the identified particle to one of the outlets. As discussed further below, the routing of the particles may be performed serially (e.g., routing one particle at a time to an outlet), or may be performed simultaneously (e.g., routing multiple particles simultaneously so that the applied magnetic fields in the well result in at least two particles at least partly moving simultaneously towards the designated outlet). As shown in inset 646 in FIG. 6B, particle 622 is moving in a direction 642 toward outlet 604. Further, particle 644 has already been routed to outlet 606.

Figure 6C:
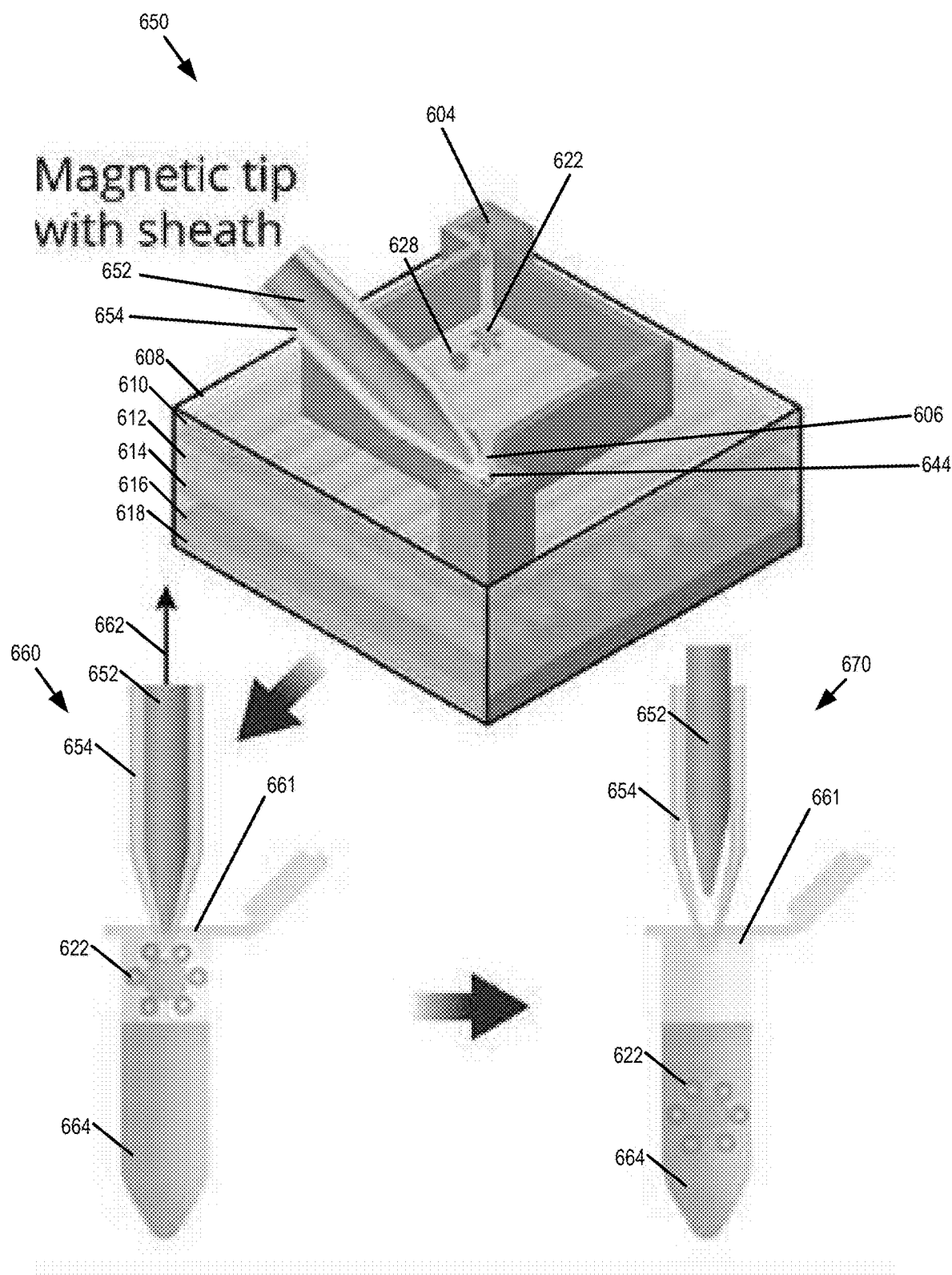
FIG. 6C shows the perspective view of the semiconductor chip in FIG. 6A with a magnetic tip with sheath being used to extract the particle(s) from the outlet(s) and placing the extracted particle(s) into another container (such as another well).

FIG. 6C shows the perspective view 650 of the semiconductor chip in FIG. 6A with a magnetic tip 652 with sheath 654 being used to extract the particle(s) from the outlet(s) and placing the extracted particle(s) into another container (such as another well). In particular, magnetic tip 652 with sheath 654 may first be placed proximate to or within a respective outlet, such as outlet 606 as show in FIG. 6C. In response to the magnetic tip 652 with sheath 654 being near or in actual physical contact with the magnetic bead-labeled target cell, the magnetic bead-labeled target cell (whereby the target cell has magnetic beads attached to it) is attracted to the magnetic tip 652 with sheath 654. In this way, when the magnetic tip 652 with sheath 654 is moved away from the respective outlet to another container, such as another well, the magnetic bead-labeled target cell moves along with magnetic tip 652 with sheath 654. Thus, 660 shows the magnetic tip 652 with sheath 654 (with particle 622 magnetically attracted thereto) at or near an opening of well 661. Magnetic tip 652 may be moved upward 662, resulting in the configuration shown in 670, in turn reducing the magnetic attraction between the magnetic tip 652 and particle 622, so that particle 622 drops into fluid 664 in well 661.

Figure 6D:
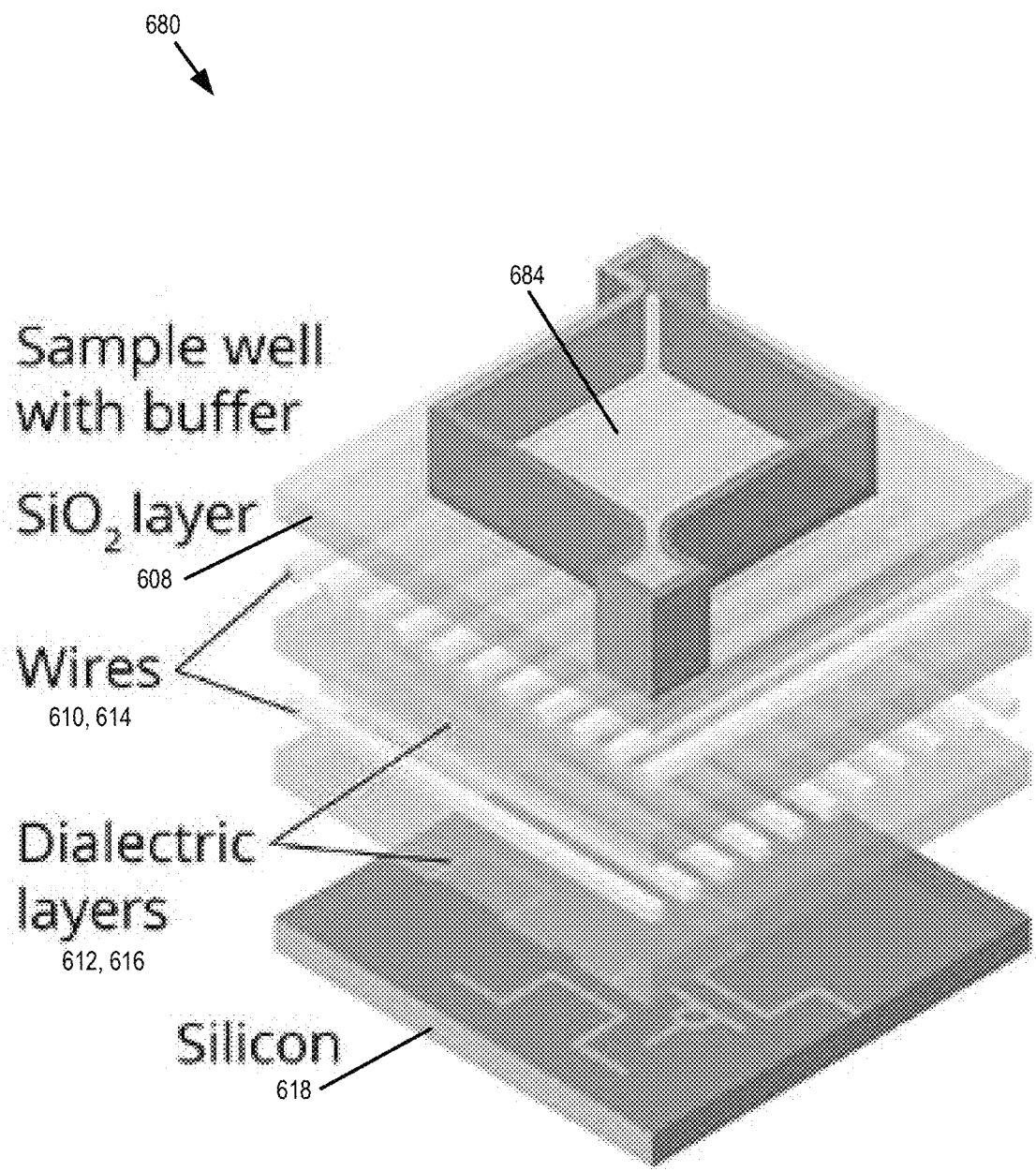
FIG. 6D is an exploded view of a bottom section of the semiconductor chip in FIG. 6A.

FIG. 6D is an exploded view 680 of a bottom section of the semiconductor chip in FIG. 6A. Specifically, the well includes buffer 684, and the bottom section includes a $SiO_2$ layer 608, a first wire layer 610, a first dielectric layer 612, a second wire layer 614 below both of the first wire layer 610 and the first dielectric layer 612, and a second dielectric layer 616 below each of the first wire layer 610, the first dielectric layer 612, and the second wire layer 614. Finally, a silicon layer 618, which includes control circuitry to route current to the first wire layer 610 and the second wire layer 614, is positioned below the second dielectric layer 616. As shown, first wire layer 610 and second wire layer 614 have complementary wire patterns (e.g., horizontal versus vertical; complementary chevron patterns). As discussed further below, the complementary patterns may allow for more precise routing of the particles in the central area 602 of well 602 to a respective outlet 604, 606.

Figure 6E:
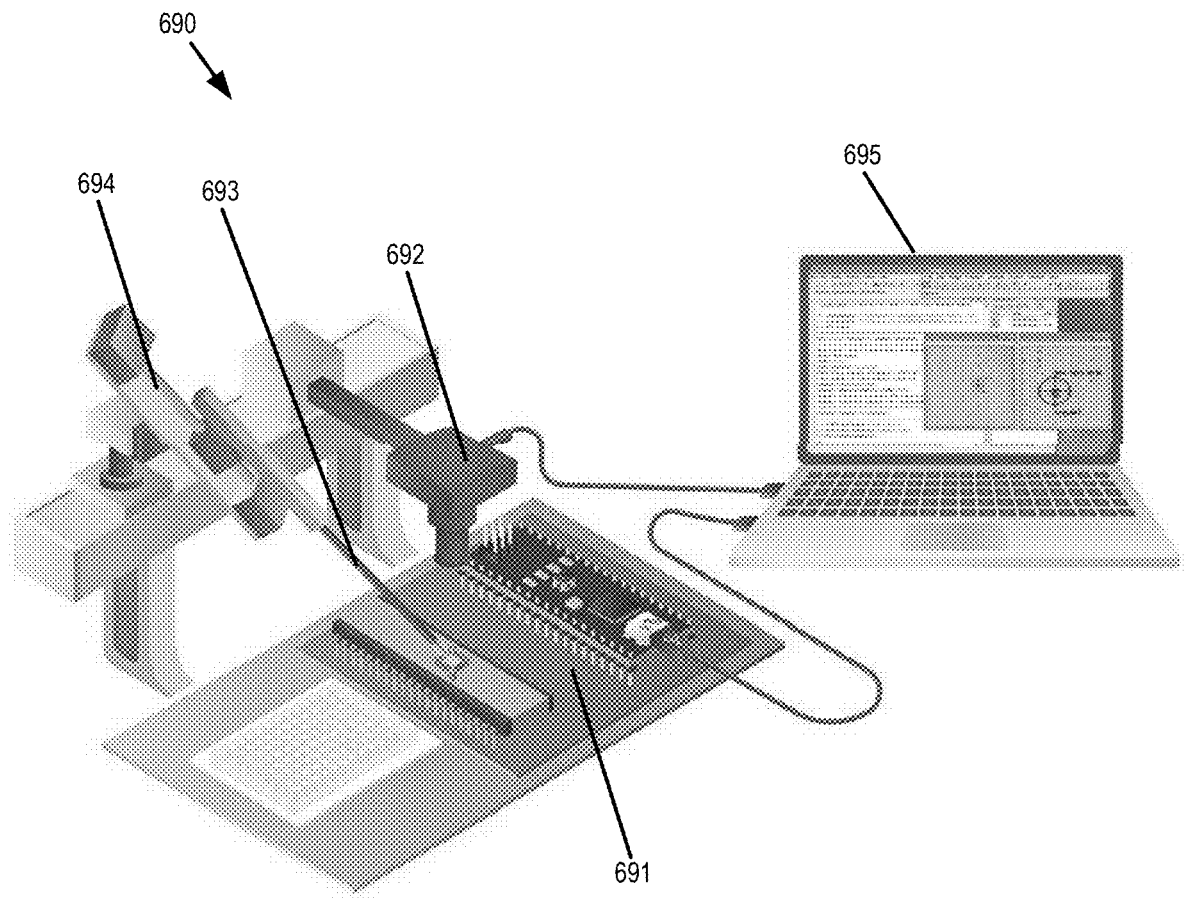
FIG. 6E is a perspective view of an example platform for single-cell identification, sorting and harvesting.

FIG. 6E is a perspective view 690 of an example platform for single-cell identification, sorting and harvesting. As shown, the platform includes a printed circuit board 691, an optical imaging system 692 and a magnetic tip 693 on a robot 694 (which may control movement, such as 3D movement of magnetic tip 693). The optical imaging model may include any one, any combination, or all of: camera(s); objectives; illumination (e.g., one or more lights); etc. In one or some embodiments, the camera may have a field of view that covers part or all of the semiconductor chip area, such as approximately 5 mm. The camera position may be adjusted in the direction perpendicular to the chip's surface in order to focus on the chip's surface. Further, various magnetic devices are contemplated, including the magnetic tip 693 illustrated, a permanent magnet/sheath, an electromagnet (e.g., a coil/wire may be used to inject current in order to magnetize the needle to attract the bead-bound target cell and to demagnetize the needle to release the bead-bound target cell). The platform may be fully automated and work in combination with a computing device 695.

As shown in FIG. 6E, there is a single camera and a single semiconductor chip for processing. Alternatively, the platform may process multiple semiconductor chips at least partly simultaneously. In one embodiment, the optical imaging system may include a camera (or other imaging device) for each of the multiple semiconductor chips. In this way, the respective camera may be used for both the cell identification and the cell sorting. Alternatively, the optical imaging system may include a single camera (or other imaging device) for all of the multiple semiconductor chips. A robotic arm may move the single camera to proximate to each of the wells in the multiple semiconductor chips in order to image the respective well. In this way, the single camera may be used for both the cell identification and the cell sorting in each of the multiple semiconductor chips. Alternatively, or in addition, a single magnetic tip (or the like) in combination with the robotic arm may be used across the multiple semiconductor chips. Or, multiple magnetic tips may be used, with each magnetic tip assigned to a respective semiconductor chip.

In this regard, the platform may be used for a variety of uses, and for isolating different types of cells. In one example (for purposes of illustration), the platform may allow for fast identification and efficient isolation of single high-affinity SARS-CoV-2 antibody producing B cells from blood samples. In this way, the platform may assist in identifying high-affinity SARS-CoV-2 neutralizing antibodies, which in turn may be used to determine if the count of isolated antigen-specific B cells may be used as an immune response marker.

The disclosed platform may perform any one, any combination, or all of: (1) automatically isolate certain cells (e.g., CTCs, B cells, etc.) from multiple human blood samples, such as at least 6 blood samples, at least 10 blood samples, at least 100 blood samples, at least 1,000 blood samples, simultaneously (e.g., ~100 CTCs and 1 million PBMCs in each sample) in 30 minutes with yield, purity and viability all over 80%; (2) may reliably discriminate a single certain cell (e.g., CTC, B cells, etc.) from contaminants; and (3) may sort a single certain cell (e.g., a single live CTC, a single live B cell, etc.) in a matter of minutes (e.g., in less than 5 minutes, in less than 10 minutes, etc.).

Thus, in one or some embodiments, the platform may integrate optical, mechanical and electrical systems into a single device (such as in within a single housing). The control electronics for the platform may automate on-chip single cell identification and sorting such that sorting of multiple (e.g., 100) single antigen-specific B cells from PBMCs in a certain amount of time (e.g., less than 5 hours) with recovery rate and viability both above 80%, and purity above 90%.

In one or some embodiments, the semiconductor chip, such as that illustrated in FIGS. 6A-C, may be a 5 mm×5 mm in size. The semiconductor chip may first be adhered (e.g., glued) to a custom printed circuit board with electrical leads; thereafter, a 3D microfluidic structure may be attached to the substrate and the semiconductor chip, which may have a base thickness comparable to that of semiconductor chip (e.g., 250 µm) to provide a leveled surface. In addition to the sample well, the microfluidics structure may also include a plurality of outlet reservoirs (e.g., four outlet reservoirs positioned at the corners of the semiconductor chip) where sorted single cell may be easily transferred with a magnetic tip covered with disposable sheath (such as illustrated in FIG. 6C). Thus, the magnetic tip covered with the disposable sheath is one example for structure used to extract particles from the outlet. Alternatively, an electromagnet may be used. Still other means for extracting the particles from the outlet are contemplated.

In one or some embodiments, metal wire activation (in order to generate magnetic fields) may be controlled based on manual observation. Alternatively, the software may enable system automation, including any one, any combination, or all of image analysis, cell identification, and cell sorting, as discussed further below. As merely one example, the semiconductor chip may generate spatially patterned microscopic magnetic field pattern(s) to precisely control the movement of magnetic particles. Thus, the software may utilize this unique property to reliably discriminate the bead-labelled cells from contaminants (e.g. dust, non-target cells, debris) and background noise. As discussed above and further below, the software may first establish the absolute position of the chip through a calibration process, where the camera is focused on the chip surface and the high-contrast alignment marks (e.g. the corner squares on semiconductor chip) on the semiconductor chip are detected through image analysis. Images taken with the field of view that covers the whole sample well may be used to analyze the particles (e.g., 4× objectives with a FOV ~5 mm). After which, image analysis may be performed for target cell identification. Example images used for the image analysis are shown in FIGS. 17A-J. In one or some embodiments, the algorithm may compare an image captured before wire activation and an image captured after a wire activation to identify the target cell, as discussed above.

Further, the platform may be configured for high-throughput isolation of single SARS-CoV-2 spike protein binding B-cells. In particular, single B cells from COVID-19 patient blood samples may be enriched and isolated by their ability to bind to magnetic bead-conjugated recombinant SARS-CoV-2 spike protein peptides by using the disclosed platform. Matching immunoglobulin light and heavy chain coding sequences from the same B cell may then be determined by single-cell (sc) B cell receptor (BCR) RNA sequencing.

Thus, the platform may be used for: optimization of SARS-CoV-2 spike protein sequence containing peptides as antigens; isolation of SARS-CoV-2 spike protein binding B cells from blood samples of convalescent COVID-19 patients using the platform; and determining the viability of isolated B cells and their ability to expand and produce reactive antibodies.

Further, the platform may be used for antibody discovery and immune monitoring. In particular, the platform may be used for high affinity SARS-CoV-2 neutralizing antibody identification, and for monitoring humoral immunity in COVID-19 patients. In this regard, the platform may be used for any one, any combination, or all of: determining the B cell receptor sequence by using single cell sequencing; determining the binding affinity and specificity of recombinant human IgG antibodies produced based on single cell sequencing data; determining the functional effect of high affinity antibodies; or determining the ability of the platform to facilitate humoral immunity monitoring. In this regard, the platform may enable identification of high affinity, high specificity antibodies that neutralize SARS-CoV2. The platform may be adapted to identify antibodies against other emerging pathogens, allowing for rapid development of therapeutic and patient specific antibodies for treatment of emerging infectious diseases, including SARS-CoV2.

Figure 7A:
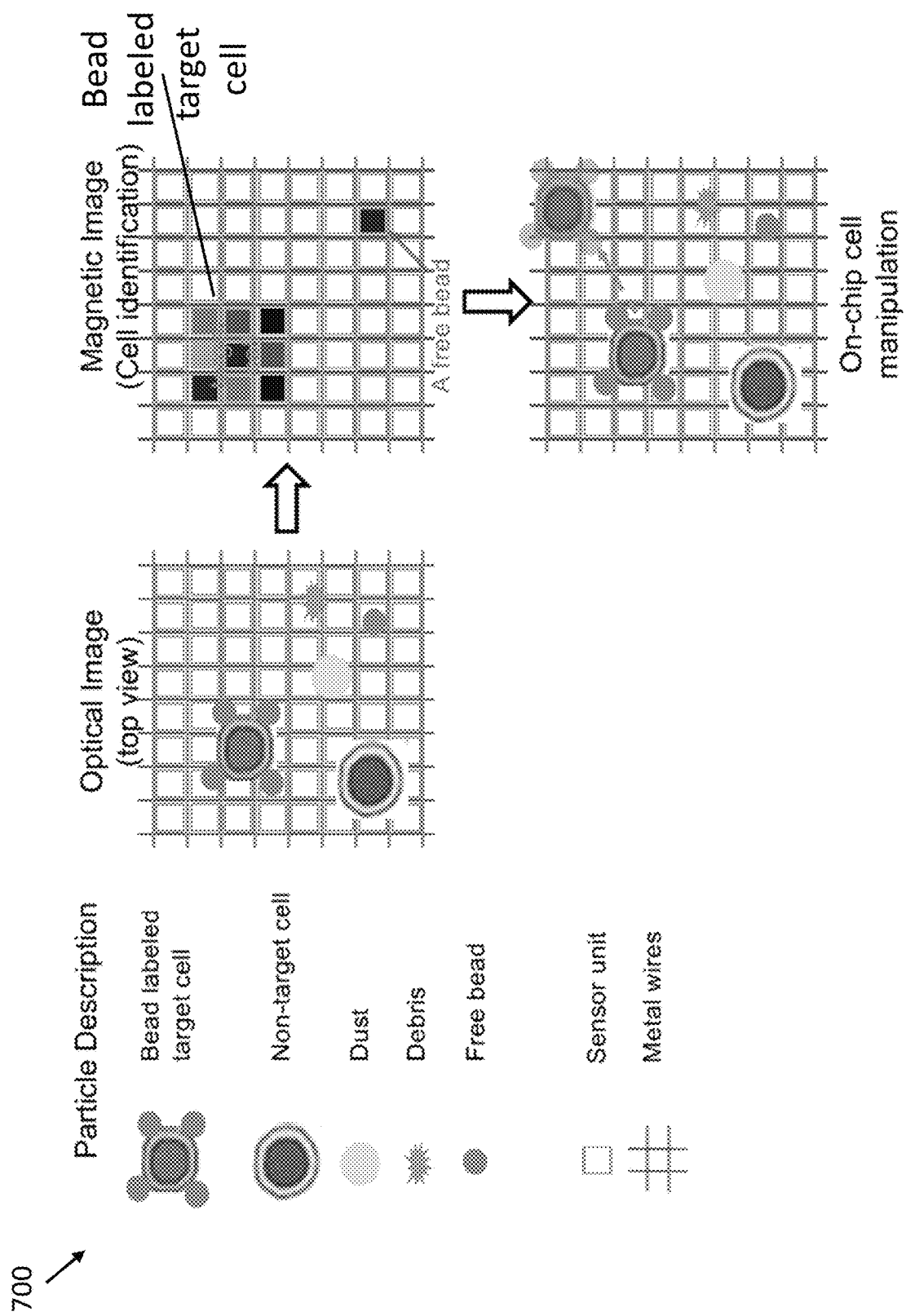
FIG. 7A illustrates a first method of detection of magnetic bead signals from target cells, with various particle types, particle descriptions, particles on the magnetic sensor, and sensor output shown.

FIG. 7A is an illustration 700 of a first method of detection of magnetic bead signals from target cells, with various particle types, particle descriptions, particles on the magnetic sensor, and sensor output shown. Immunomagnetically isolated cell suspension may be dropped into the sample well (such as illustrated in FIG. 3A), which may hold up to 50 μL of liquid sample. In one implementation, the active chip sensing area is designed to be 1×1 cm comprising 40,000 sensor units (the 8×8 sensor array shown here is merely for illustration purposes). In this regard, the active chip sensing area is several orders of magnitude greater than the size of the bead-labeled target cell. The sample contains bead-labelled target cells and contaminants such as non-target cells, dust, debris and free beads. These particles fall to the surface of the sensing area by gravity and their magnetic signals are detected by the underlying sensor units. Contaminants such as dust, debris and non-target cells are non-magnetic and therefore are not detected. In this regard, single bead Magnetic detection may be highly sensitive even with minimum sample processing because most biological samples or contaminants (e.g., dusts and debris) have negligible magnetic properties and thus background noise is very low. Target cells (labelled with magnetic beads) cast a large "shadow" area on multiple sensors, whereas possible free beads (4.5 μm in diameter, are much smaller than target cells) are detected only by its nearby sensors. Thus, the system may process samples that are heterogeneous (as opposed to homogeneous) as the system does not need to have purified cells upon introduction.

Most free beads may be pre-filtered by a membrane with 7-μm pores, such as discussed above. As discussed in more detail below, the sensor output may be analyzed in order to identify the bead-labeled target cells. In particular, the bead-labeled target cell may have a certain sensor output signature. The system may analyze the sensor output in order to determine whether the sensor output includes the certain sensor output signature. Further, the system may analyze the sensor output to filter out any sensor output that indicates a free bead is present.

Figure 7B:
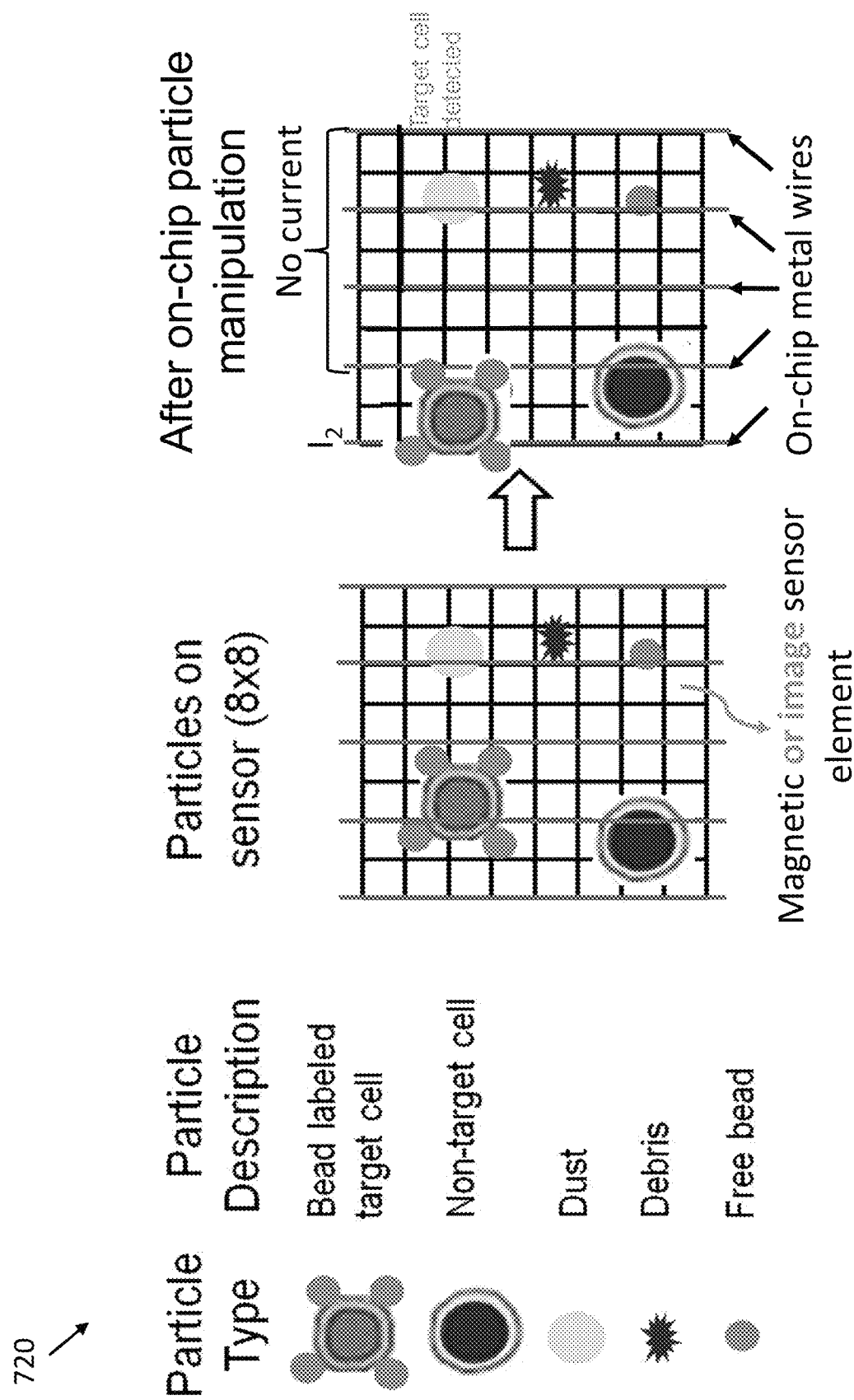
FIGS. 7B-C illustrate a second method of detection of target cells based on on-chip magnetic manipulation.
Figure 7C:
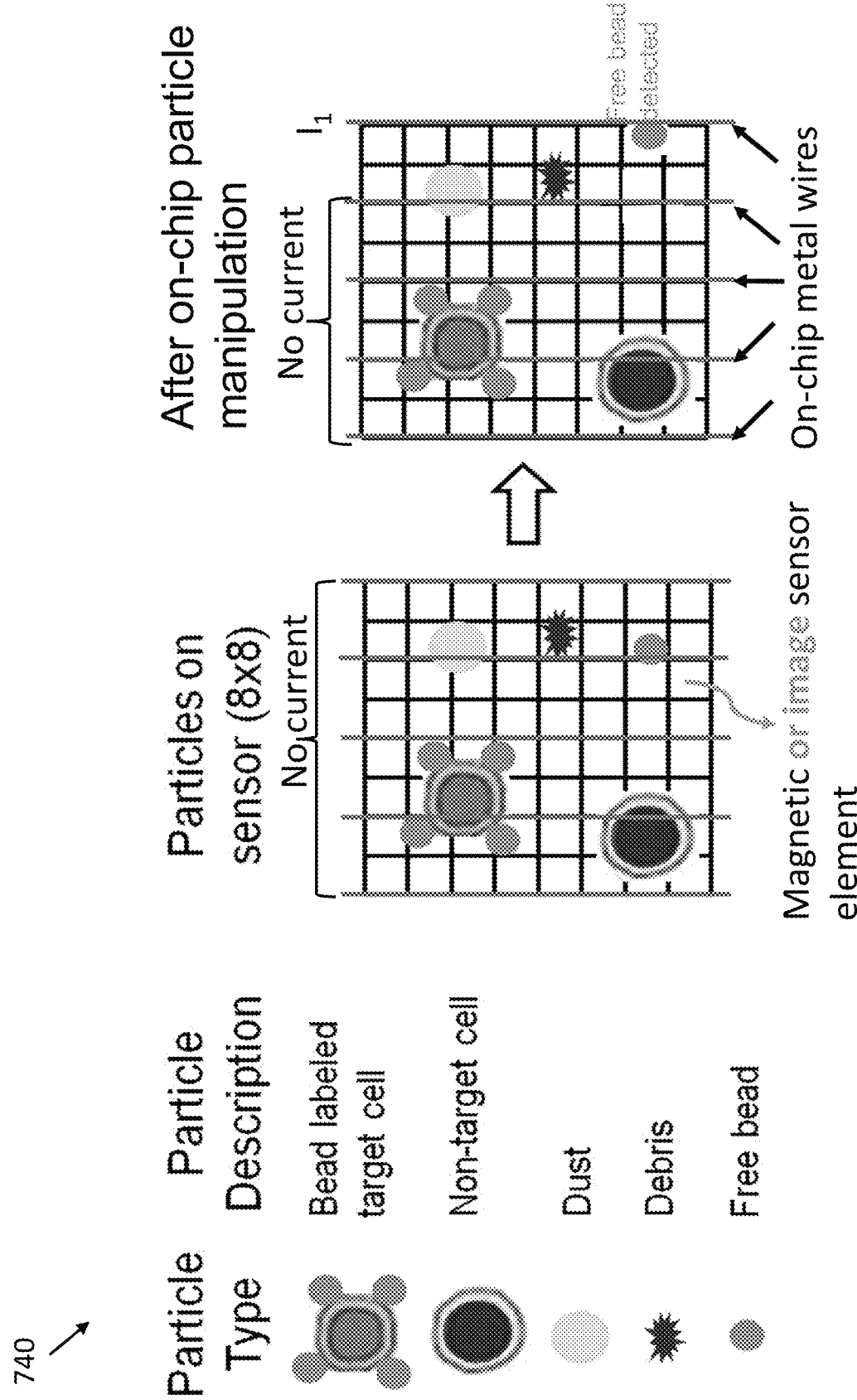

FIGS. 7B-C are illustrations 720, 740 of a second method of detection of target cells based on on-chip magnetic manipulation. More specifically, FIG. 7B illustrates bead-labeled target cell detection (as shown by movement of the bead-labeled target cell). FIG. 7C illustrates free bead detection (as shown by movement of the free bead). In particular, magnetic manipulation may result in movement of the bead-labeled target cell and/or free beads. As discussed above, the movement of the bead-labeled target cell may be determined using a magnetic sensor element (such as a Hall effect sensor) or using an image sensor element.

The system may generate a magnetic field tailored to move certain particles in the well. For example, the system may control the current (thereby modifying the applied magnetic field in order to manipulate which items (e.g., free beads or bead-labeled target cells) are detected), as discussed above. In particular, the system may use varying currents (e.g., first a lower current to detect the movement of the free beads and then a higher current to detect the bead labeled target cells). Thus, the system may vary the AC current magnitude and/or vary the AC current frequency in detecting the bead-labeled target cells.

FIG. 7B illustrates bead-labeled target cell detection by determining movement of the bead-labeled target cell. In particular, on the left side of FIG. 7B, the particles are on the sensor without being subject to magnetic manipulation. On the right side of FIG. 7B, a section of the sensor area is subject to on-chip magnetic manipulation. This is illustrated by the current $I_2$ flowing through only a part of the sensor area. As a result of the current flow (and the magnetic field generated thereby), the bead-labeled target cell moves. This movement may be detected by the Hall effect sensor or an image sensor, which may compare the respective sensor readings both before and after the magnetic field is applied. FIG. 7C illustrates free bead detection (as shown by movement of the free bead). Similar to FIG. 7B, FIG. 7C uses a current $I_1$ to move a free bead. Further, non-target cells (such as white blood cells which do not have a magnetic bead bound thereto), will not move (or will move less than the CTCs bound to the beads).

Figure 8:
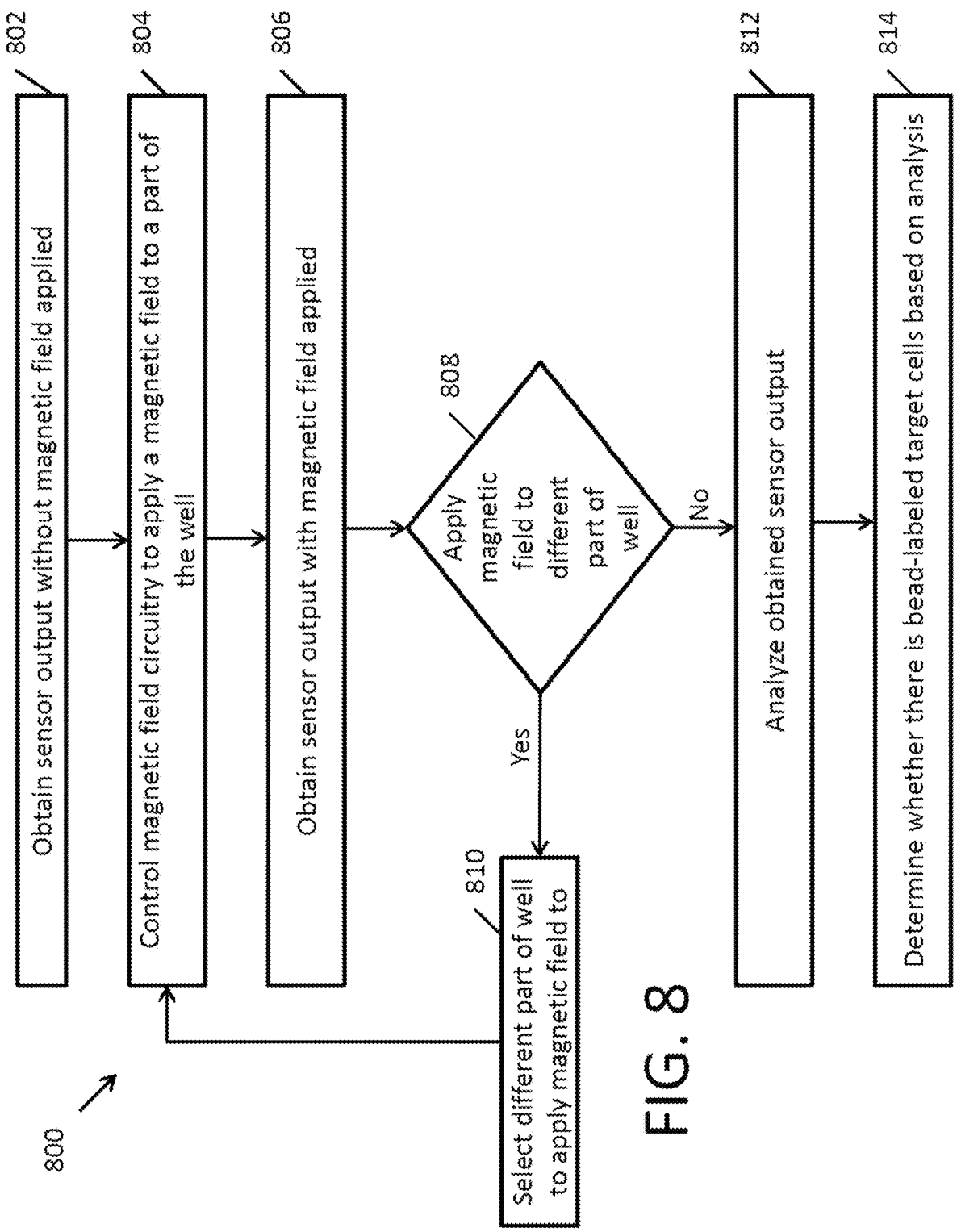
FIG. 8 is a flow chart of an example method of detecting bead-labeled target cells via on-chip magnetic manipulation.

FIG. 8 is a flow chart 800 of an example method of detecting bead-labeled target cells via on-chip magnetic manipulation. At 802, the sensor output is obtained without a magnetic field being applied. At 804, the magnetic field circuitry are controlled (such as sending current through one or more wires) in order to apply a magnetic field to a part of the well. This is illustrated, for example, in FIGS. 7B-C. At 806, the sensor output is obtained with the magnetic field applied. At 808, it is determined whether the magnetic field is applied to a different part of the well. If so, at 810, the different part of the well to apply the magnetic field is selected, and the flow chart 800 loops to 804. If not, at 812, the obtained sensor output is analyzed. At 814, it is determined, based on the analysis, whether there are bead-labeled target cells.

As discussed above, in one implementation, the system may identify target cells that have different bead labels bound to them. For example, a first target cell may have a first bead label bound to it, and a second target cell may have a second bead label bound to it. The bead labels may have different response characteristics. For example, the first bead label may have a quicker response time to an applied magnetic field than the second bead label. As another example, the fluid may have different sized magnetic particles. In particular, the fluid may include a first type of magnetic particle (such as free beads) and a second type of magnetic particle (such as beads bound to CTCs). The first type of magnetic particle may have a different size than the second type of magnetic particle (e.g., the first type of magnetic particle may be smaller than the second type of magnetic particle, as discussed above). In that regard, the system may apply one or more magnetic fields (e.g., one or more AC currents may be used to generate the one or more magnetic fields) in order to identify the different target cells or different types of magnetic particles. Based on the applied magnetic field(s), the system may determine the response. For example, the system may analyze the magnetic sensor output waveform over time to determine the response of the different magnetic bead labels. In the example above of the first bead label having a quicker response time, the system may analyze the response time of the various particles, and determine whether the response time indicates a first bead label or a second bead label. As another example, the system may analyze the magnetic sensor output waveform over time to determine the response of the different types of magnetic particles. In the example above of the free beads having a quicker response time, the system may analyze the response time of the various particles, and determine whether the response time indicates movement of free beads or movement of beads bound to CTCs.

Figure 9A:
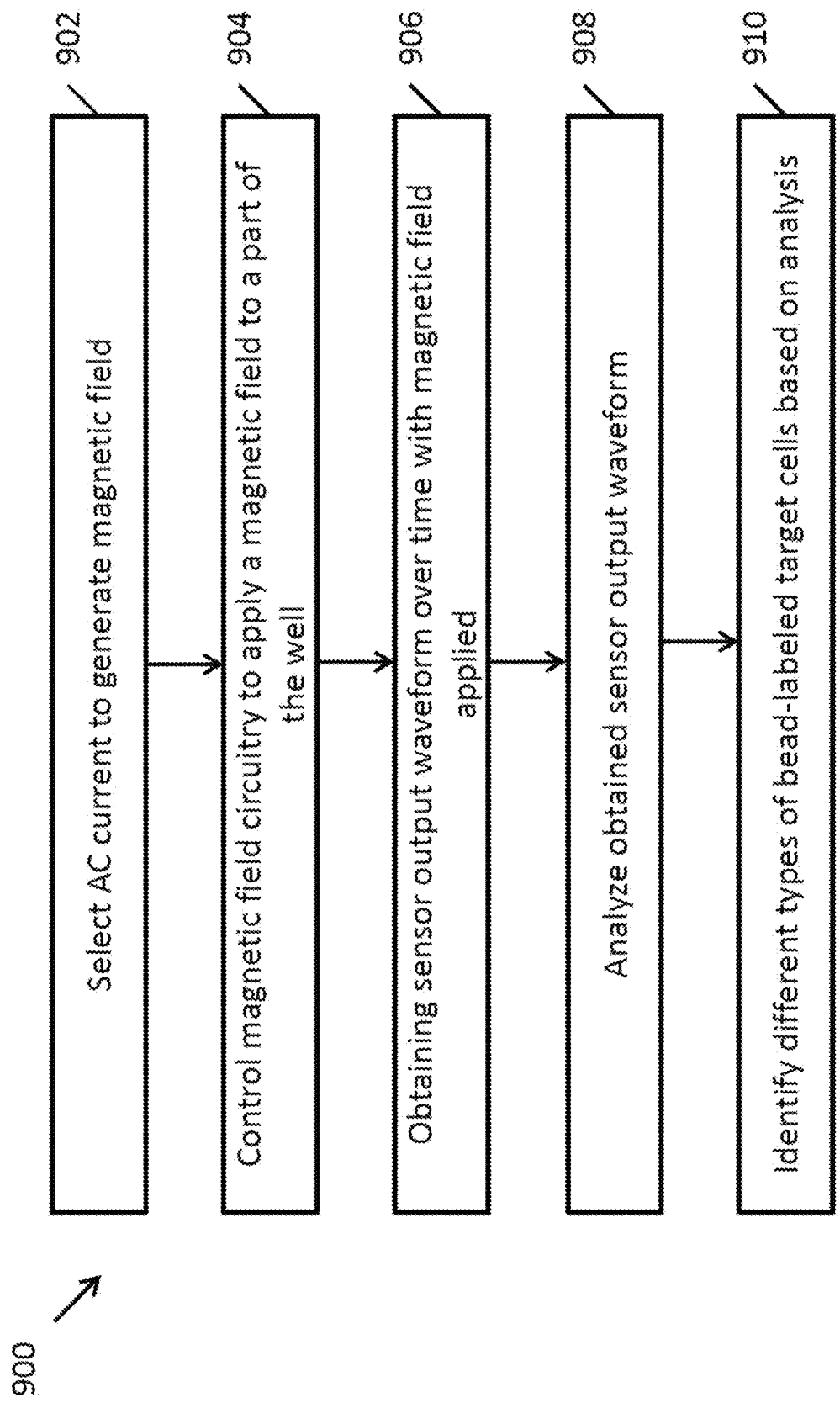
FIG. 9A is a flow chart of an example method of detecting multiple bead-labeled target cells.

FIG. 9A is a flow chart 900 of an example method of detecting multiple bead-labeled target cells using a magnetic field sensor (such as a Hall effect sensor). At 902, the AC current is selected to generate the magnetic field. At 904, the magnetic field circuitry is controlled, using the selected AC current, to apply a magnetic field to a part of the well. At 906, the sensor output waveform over time with the magnetic field applied is obtained. At 908, the obtained sensor output waveform is analyzed. At 910, the different types of bead-labeled target cells are identified based on the analysis.

Figure 9B:
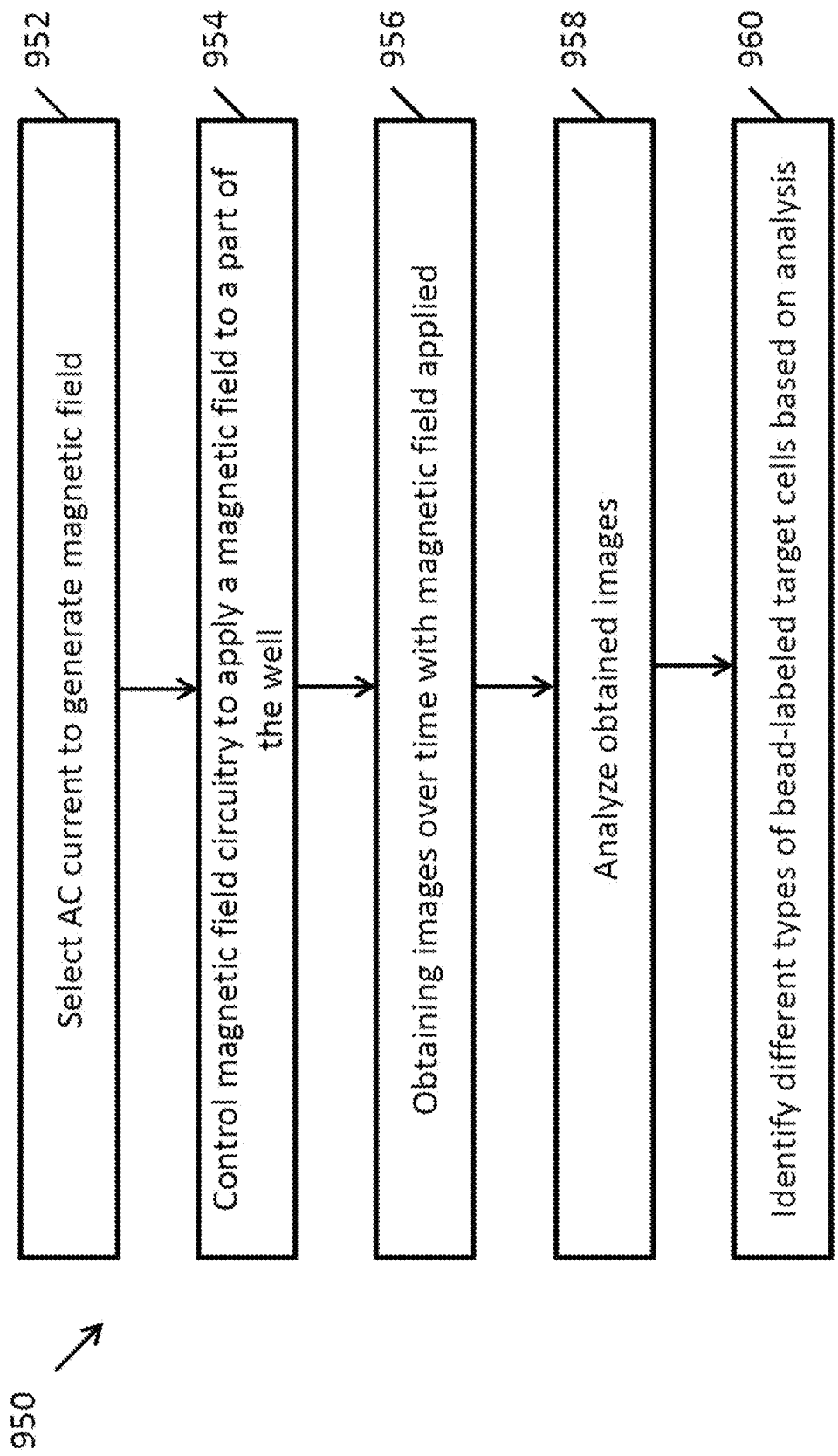
FIG. 9B is a flow chart of another example method of detecting multiple bead-labeled target cells.

FIG. 9B is a flow chart 950 of another example method of detecting multiple bead-labeled target cells using imaging analysis. At 952, the AC current is selected to generate the magnetic field. At 954, the magnetic field circuitry is controlled, using the selected AC current, to apply a magnetic field to a part of the well. At 956, images are obtained over time with the magnetic field applied is obtained. At 958, the obtained images are analyzed. At 960, the different types of bead-labeled target cells are identified based on the analysis.

For example, a sample may be prepared by spiking different amount of Caco-2 colon cancer cells (e.g., 20-500 Caco-2 colon cancer cells) into $5 \times 10^6$ peripheral blood mononuclear cells (PBMCs). Then, 4.5-µm-diameter beads conjugated with biotinylated anti-EpCAM antibodies were added for cell isolation (see FIG. 10A). Alternatively, the protocol may be validated on patient-derived CTCs (see FIG. 10B), isolated from the peripheral blood of metastatic breast cancer patients via ex vivo culture Further, the performance of cell isolation technology may be characterized by three parameters: purity, and recovery, purity and throughput. The results of the manual protocol show a high recovery rate (87-92%) and purity (>99%) with a total assay time of less than 1 hour (e.g., only 30 minutes) on both Caco-2 and CTCs. (see FIG. 10C). Throughput and automation may also be relevant performance parameters to evaluate a cell isolation technology, particularly for pharmaceutical and clinical applications. In testing the feasibility of isolating CTCs from 6 CTC-spiked samples, it was found that over 91% CTCs were recovered, no PBMCs in any of the 6 samples after cell isolation and CTC viability over 83% (see FIG. 10D). Thus, successfully processed all 6 CTC-spiked blood samples in a total of 30 minutes was shown with yield, purity and cell viability all over 80%.

Figure 10A:
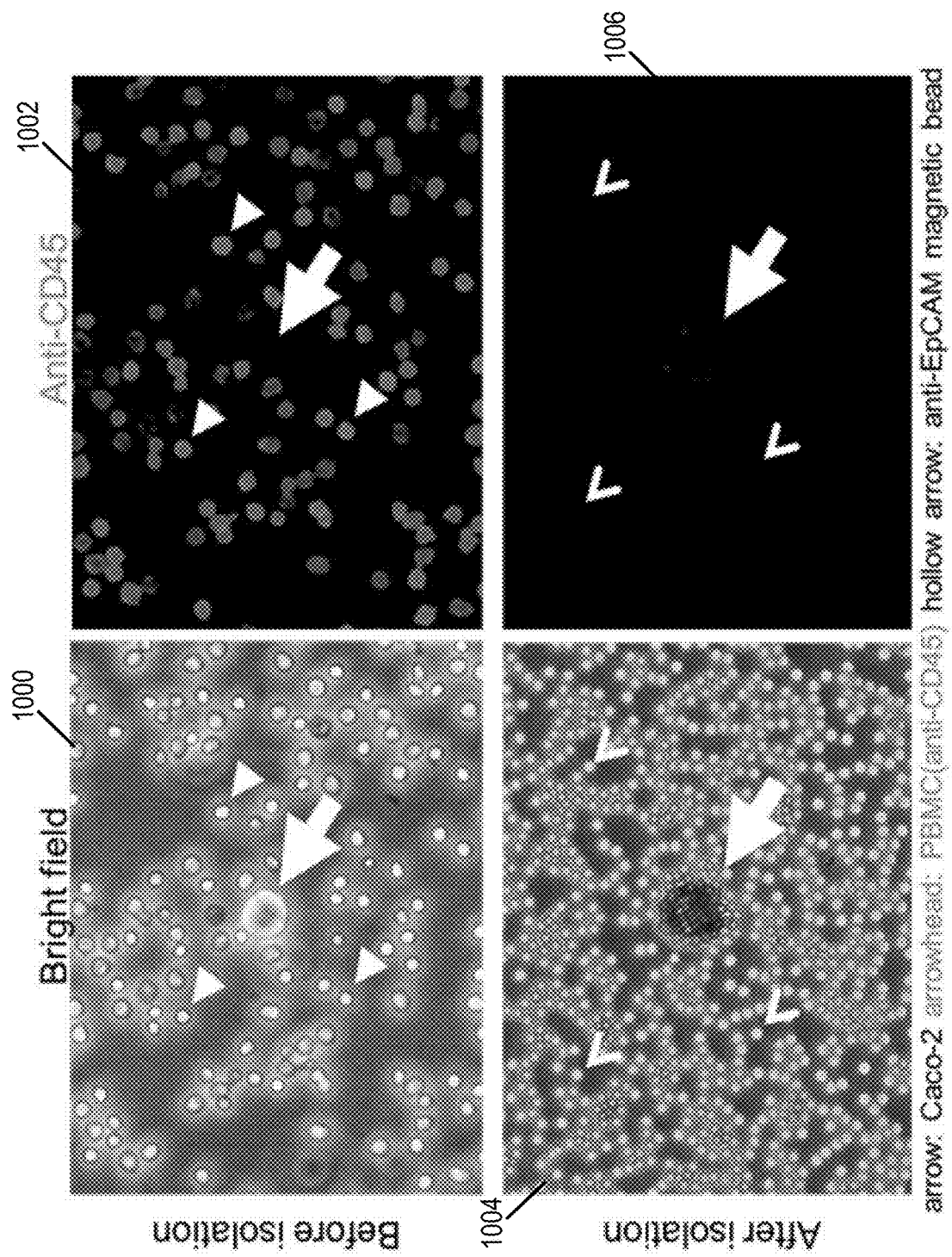
FIG. 10A illustrates isolation of Caco-2 colon cancer cells.

In particular, FIGS. 10A-D illustrate evaluation of the feasibility and performance of magnetic cell isolation using tumor cells mixed with PBMCs in vitro. To test the ability of the disclosed system to isolate rare epithelial cells (e.g., spiked-in epithelial cells) from an excess of PBMCs (modeling the in vivo situation), different amounts (from 20 to 720) of Caco-2 colon cancer cells or EGFP-expressing breast cancer patient derived CTCs were mixed with $5 \times 10^6$ human PBMCs (Biolegend, San Diego, Calif.). Cell suspensions were mixed with CELLection® biotin binder magnetic beads (Invitrogen, Carlsbad, Calif.) coated with an anti-EpCAM antibody (Biolegend) to isolate epithelial cells from the mixture. Cells coated with magnetic beads were isolated with a magnet (Invitrogen) by using an optimized magnetic cell isolation protocol. With regard to FIG. 10A illustrating isolation of Caco-2 colon cancer cells, numbers of Caco-2 cells in epithelial-PBMC mixture input (1000, 1002, before isolation) and anti-EpCAM antibody enriched fraction (1004, 1006, after isolation) were counted visually at transmitted light channel based on cell size and morphology (1000, 1004). Numbers of PBMCs in the epithelial-PBMC mixture and in the anti-EpCAM enriched cell fraction were determined by cell size and morphology (1000, 1004) and anti-CD45 staining (labeling only PBMCs but not epithelial cells, 1002, 1006, red fluorescence).

Figure 10B:
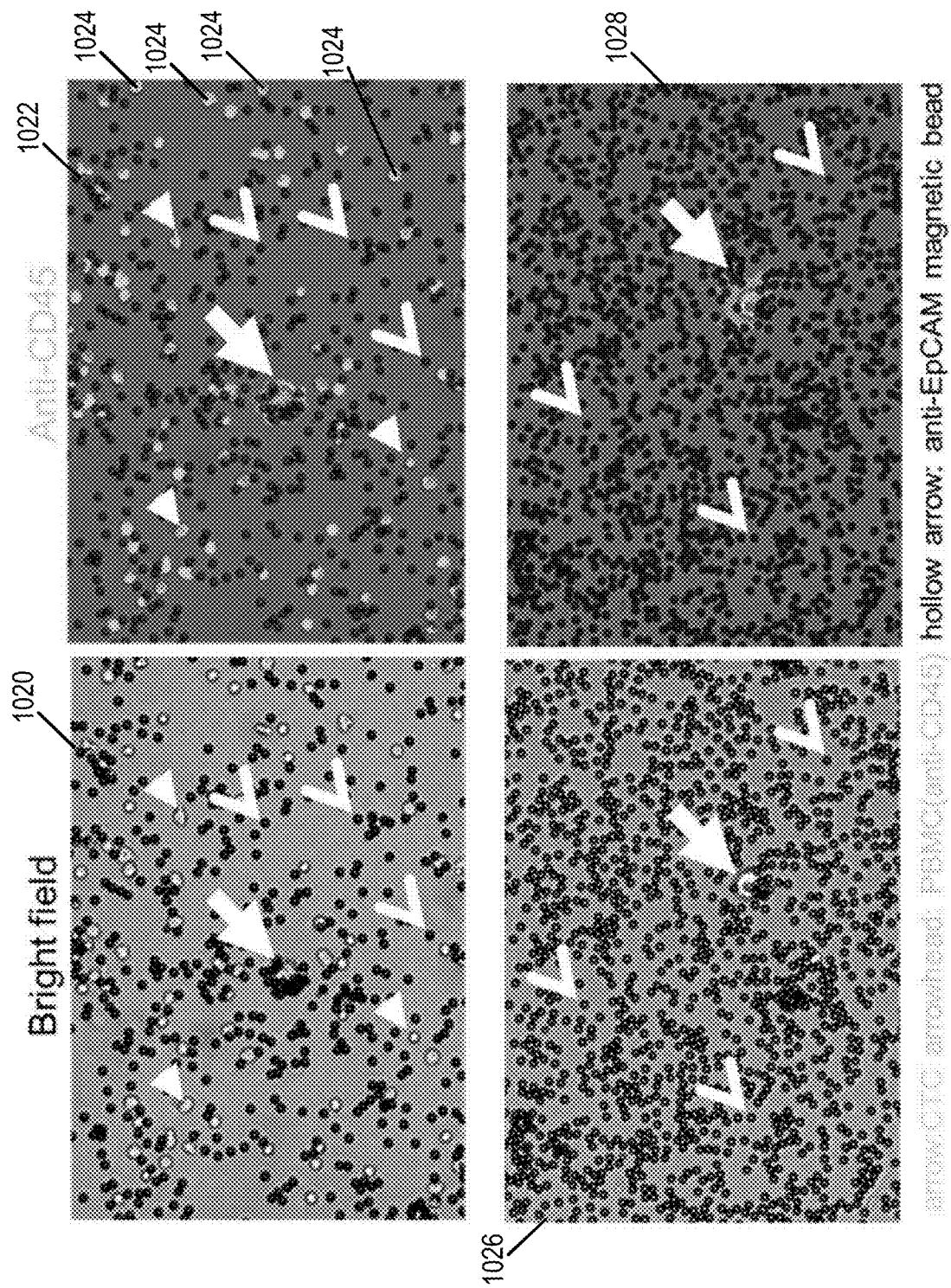
FIG. 10B illustrates isolation of enhanced green fluorescent protein (EGFP) expressing CTCs.

With regard to FIG. 10B regarding isolation of EGFP expressing CTCs, CTCs were labeled with Cell tracker red (Thermo Fisher) and PBMCs were labeled by AlexaFluor 488-anti-CD45 antibody (1024). Numbers of CTCs in the CTC-PBMC mixture (1020, 1022, before isolation) and the anti-EpCAM antibody enriched fraction (1026, 1028, after isolation) were determined by cell size and morphology (1020, 1026) and yellow fluorescence (EGFP and Cell tracker red, 1022, 1028), while PMBCs in CTC-PBMC mixture (1020, 1022, before isolation) and anti-EpCAM antibody enriched fraction (1026, 1028, after isolation) were determined by cell size and morphology (1020, 1026) and green fluorescence (anti-CD45, 1022, 1028). In anti-EpCAM antibody enriched cell fraction, no PBMCs may be identified in both cases (as shown in FIGS. 10A and B, 1004, 1006, 1026, 1028).

Figure 10C:
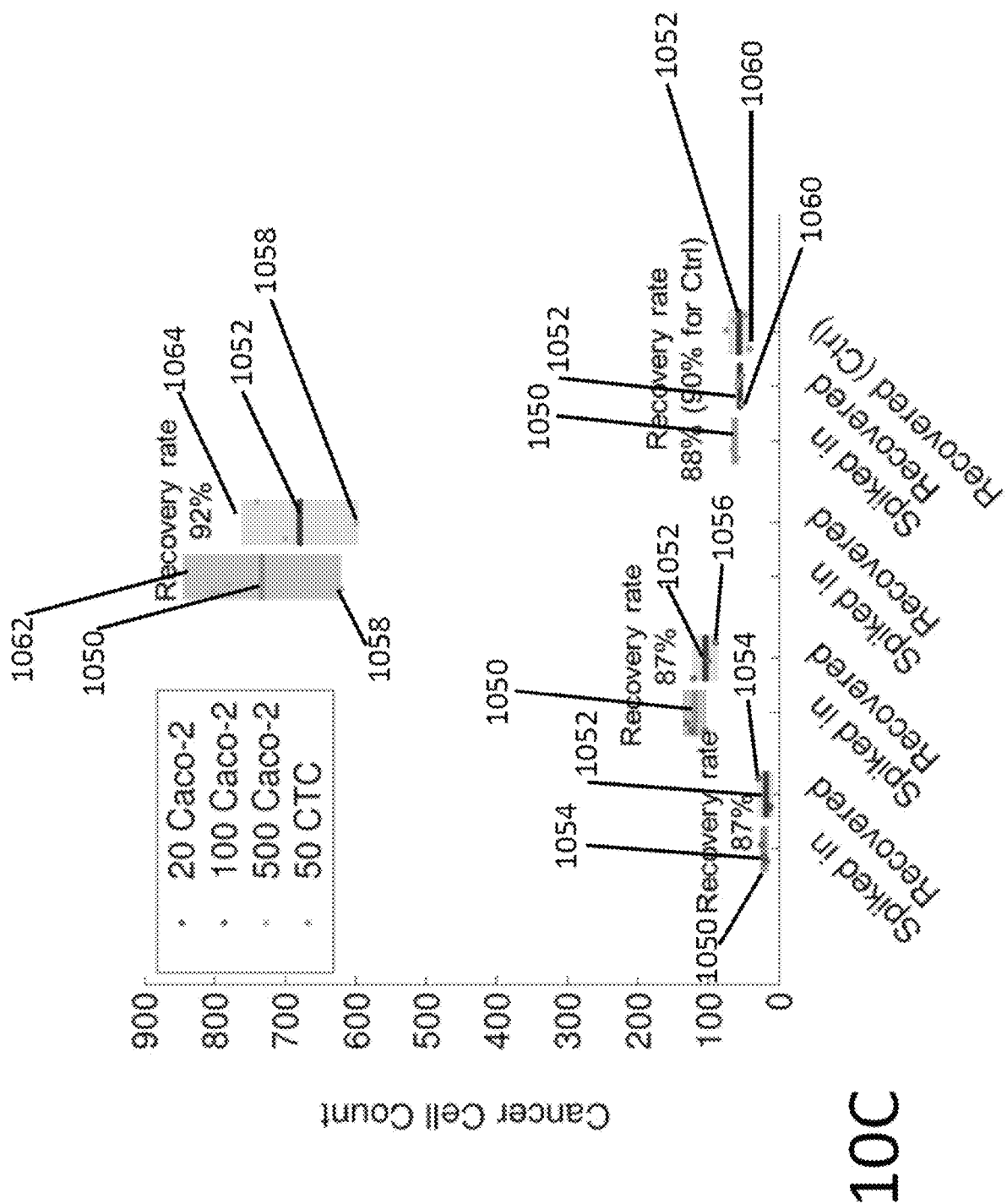
FIG. 10C is a graph illustrating recovery of Caco-2 and CTC cells.

With regard to FIG. 10C illustrating recovery of Caco-2 and CTC cells, recovery rate may be defined by the ratio of the mean of the number of recovered cancer cells (output) to the mean of number of spiked-in cancer cells (input). Cell counts (FIG. 10C) are displayed from triplicate measurements with the mean (1050 and 1052 lines), 95% confidence interval (or 1.96-SEM, 1062 and 1064 (or the boxes around lines 1050 and 1052)). Recovery rate (see 1054, 1056, 1058, 1060, 1062 1064) was 87%-92% for Caco-2s and CTCs. In control experiments with only Caco2 and CTCs (no PBMC mixing), no significant difference in cancer cell recovery rate was observed. Bead concentration was used for all experiments following the indirect technique protocol. CTC isolation assay was optimized for antibody concentration, wash and centrifuge time, to limit total assay time down to 30 minutes.

Figure 10D:
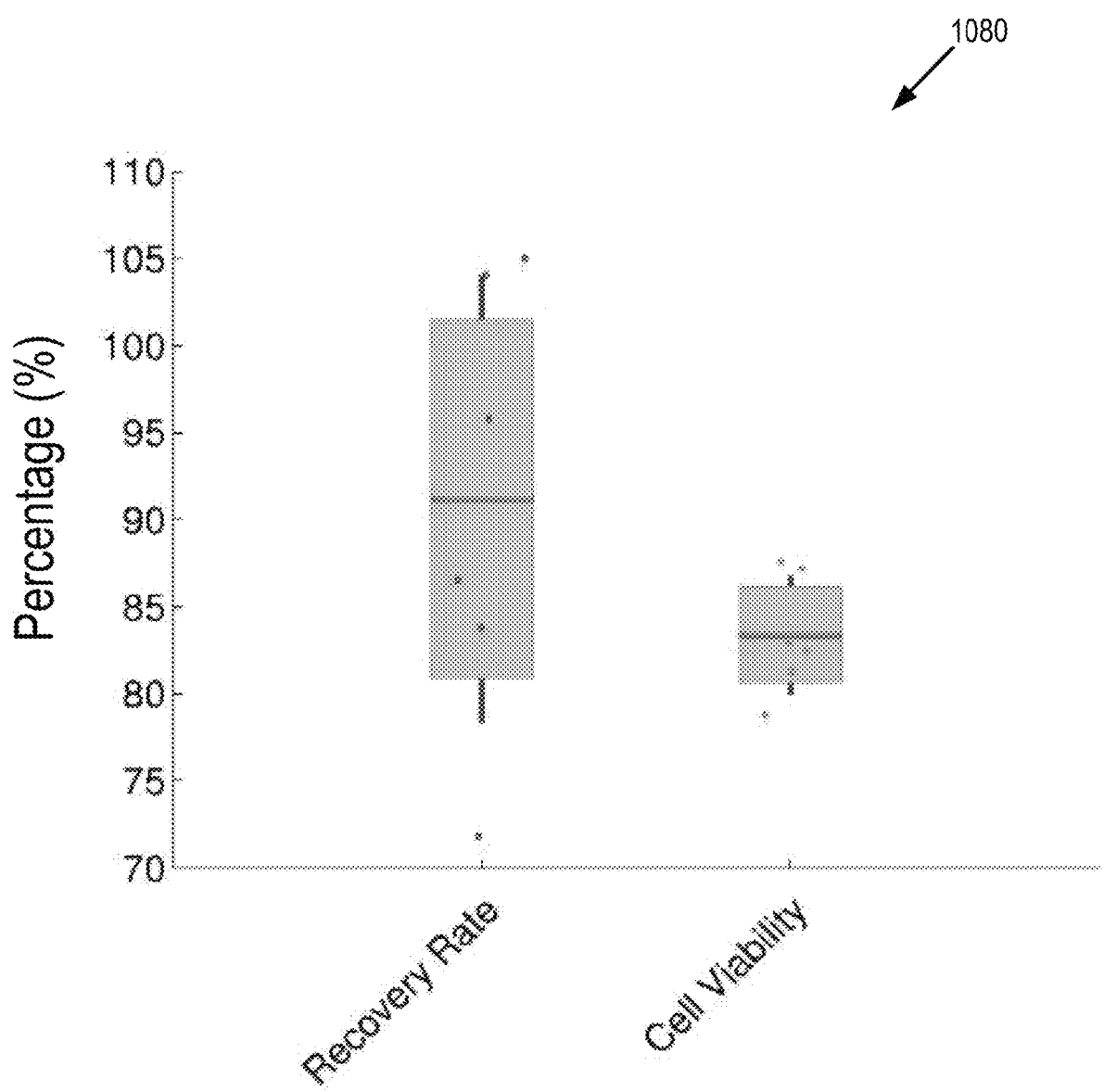
FIG. 10D is a graph illustrating automated cell isolation.

With regard to the graph 1080 in FIG. 10D illustrating automated cell isolation, an automated magnetic cell isolation protocol was developed by using a magnetic sample processor, which allowed isolation of anti-EpCAM magnetic bead coated cells from 6 CTC-spiked samples in 30 minutes simultaneously. About 100 CTCs were spiked into each sample containing $\sim 5 \times 10^6$ PBMCs. After automated magnetic cell isolation, over 91% CTCs are recovered without PBMC recovery. CTC viability (>83%) was determined by trypan blue exclusion.

Magnetic particles used in magnetic cell isolation are available in a range of sizes and can be divided into two categories: magnetic nanoparticles (MNPs) or microbeads. Compared to MNPs, microbeads are less susceptible to endocytosis, and not likely to interfere with a cell's structure. The magnetic particles used in the data illustrated in FIGS. 10A-D are 4.5-µm microbeads. These beads comprise many MNPs that are dispersed in a polymer matrix (FIG. 2B). These beads comprise many MNPs that are dispersed in a polymer matrix. The MNPs are randomly oriented when no magnetizing field (H) is applied so the net bead field is zero; when a magnetizing field is applied, the MNPs will align with H and there will be an induced bead field. This superparamagnetic property prevents the beads from clumping and is beneficial for magnetic detection.

Figure 11:
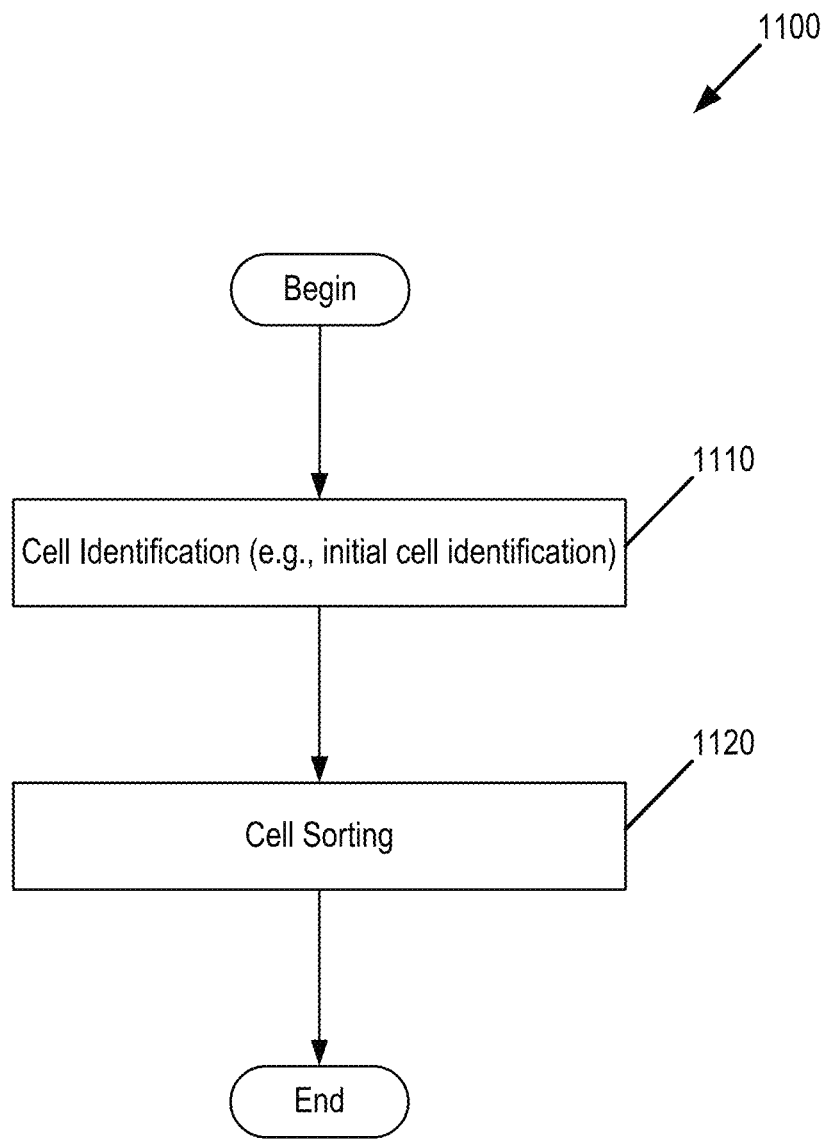
FIG. 11 illustrates a flow chart for cell identification and cell sorting.

FIG. 11 illustrates a flow chart 1100 for cell identification and cell sorting. At 1110, cell identification (such as initial cell identification) is performed. At 1120, cell sorting is performed. As discussed above, cell identification and cell sorting may be performed in series and in a same environment, such as identifying a cell within a well and after identifying the cell, sorting the cell within the well (and optionally out of the well). As discussed in more detail below, cell identification may comprise analyzing one or more particles in the well to determine one or both of the magnetic bead-labeled target cell or obstacles (e.g., contaminants, other magnetic bead-labeled target cells, clumps of free beads, etc.). The analysis may include determining whether the particles have one or more aspects associated with the magnetic bead-labeled target cells or the obstacles (e.g., any one, any combination, or all of: the magnetic field response (e.g., movement responsive to a certain strength applied magnetic field); size (e.g., whether the particle is greater than or equal to a certain size, such as 10 microns×10 microns and/or whether the particle is less than or equal to a certain size, such as 25 microns×10 microns); color; shape.

Further, the cell sorting may work in combination with the cell identification. As one example, the information determined in the cell identification may be used for the cell sorting, including using locations of one or both of the magnetic bead-labeled target cell(s) and the obstacle(s) (e.g., sorting the magnetic bead-labeled target cell to the outlet while accounting for the obstacles, such as avoiding or navigating around obstacles that do not move in response to an applied magnetic field (e.g., contaminants) or using applied magnetic fields to move one or both of the magnetic bead-labeled target cell or the clumps of free beads when sorting the magnetic bead-labeled target cell to the outlet).

The magnetic fields used in the cell identification may be similar in one or more aspects and different in other aspects than the magnetic fields used in the cell sorting. For example, any one, any combination, or all of: intensity (e.g., lower intensity to determine whether particle is a free bead during the cell identification versus higher intensity to determine whether the magnetic bead-bound target cell moves during cell identification or during cell sorting); frequency; pattern; or the like. In particular, the applied magnetic fields used in cell identification may be localized around or proximate to the location of the particles in the well whereas the applied magnetic fields used in cell sorting may be across a section of the well (such as across a quadrant of the well, as discussed below) in order to move the magnetic bead-labeled target cell into the outlet.

In addition, the applied magnetic fields used in cell identification and cell sorting may be used in order to reduce or minimize the time spent to perform the associated task and/or the wires activated in order to perform the associated task. As merely one example, in cell identification, the locations for a plurality of particles that may be magnetic bead-bound target cells may be used to determine which wire to select in order to generate the applied magnetic field (which is in turn used for potentially moving the plurality of particles). In particular, multiple wire layers (such as a chevron pattern wire layer and a complementary chevron wire pattern layer (e.g., a diagonal wire layer)) may be used to generate the magnetic fields. In order to reduce the number of wires activated (and in turn accelerate the determination), a common wire is selected for activation to generate the applied magnetic field. Commonality of the wire may be based on whether the wire is proximate to or in the vicinity of some or all of the plurality of particles that may be magnetic bead-bound target cells. In the example of the chevron wire layer and the diagonal wire layer, the system may determine whether to select a wire from the chevron wire layer or a wire from the diagonal wire layer based on whether the selected wire will generate the applied magnetic field to move the plurality of particles that may be the magnetic bead-bound target cells in combination. Likewise, during cell sorting, wires may be selected in order to generate applied magnetic fields to: move multiple bead-bound target cells to an outlet at least partly simultaneously (e.g., a common wire may be used to move both a first magnetic bead-bound target cell and a second magnetic bead-bound target cell at the same time toward the outlet); or separate multiple bead-bound target cells while sorting (e.g., either after moving the first magnetic bead-bound target cell and the second magnetic bead-bound target cell with a common wire activation or not, in the event that the first magnetic bead-bound target cell and the second magnetic bead-bound target cell get within a specified distance of one another, wire(s) are selected for activation in order to move one or both of the first magnetic bead-bound target cell or the second magnetic bead-bound target cell to separate them during the sorting process).

Further, in one embodiment, the selection of the wires in the different wire layers for generating the applied magnetic field in cell identification versus cell sorting may be different. In the example of a chevron wire layer and a diagonal wire layer, cell identification may use either wires in the chevron wire layer or in the diagonal wire layer (e.g., selection may be based on the common wire, as discussed above). In contrast, during cell sorting, the chevron wires are used primarily for moving the bead-bound target cells to the respective outlet whereas the diagonal wires are used primarily for obstacle avoidance. In this regard, the selection of the wires in the different layers may differ in cell identification versus cell sorting.

Alternatively, the selection of the wires in the different wire layers for generating the applied magnetic field in cell identification versus cell sorting may be the same. In the example of vertical wire layer and a horizontal wire layer, cell identification may use either wires in the vertical wire layer or in the horizontal wire layer (e.g., selection may be based on the common wire, as discussed above). Likewise, cell sorting may use either wires in the vertical wire layer or in the horizontal wire layer (e.g., selection may be based on the common wire, as discussed above).

Moreover, as discussed below, cell identification may apply a magnetic field and determine a response (e.g., determine whether a particle has moved in response to the applied magnetic field). Likewise, in a closed-loop implementation, cell sorting may be performed by applying a magnetic field and then determining the responsive movement. This determination of the responsive movement may be performed every time a magnetic field is applied. Or, this determination of the responsive movement may be performed less frequently, such as every predetermined number of wire activations (e.g., after every 5 wire activations) or in predetermined time intervals (e.g., every 10 seconds). Alternatively, cell sorting may be performed in an open-loop manner, in which the commands to activate the wires to sort a magnetic bead-bound target cell from its current location to the outlet is determined, and the commands are then implemented without any feedback as to the position of the magnetic bead-bound target cell as it travels from its current location to the outlet.

Figure 12:
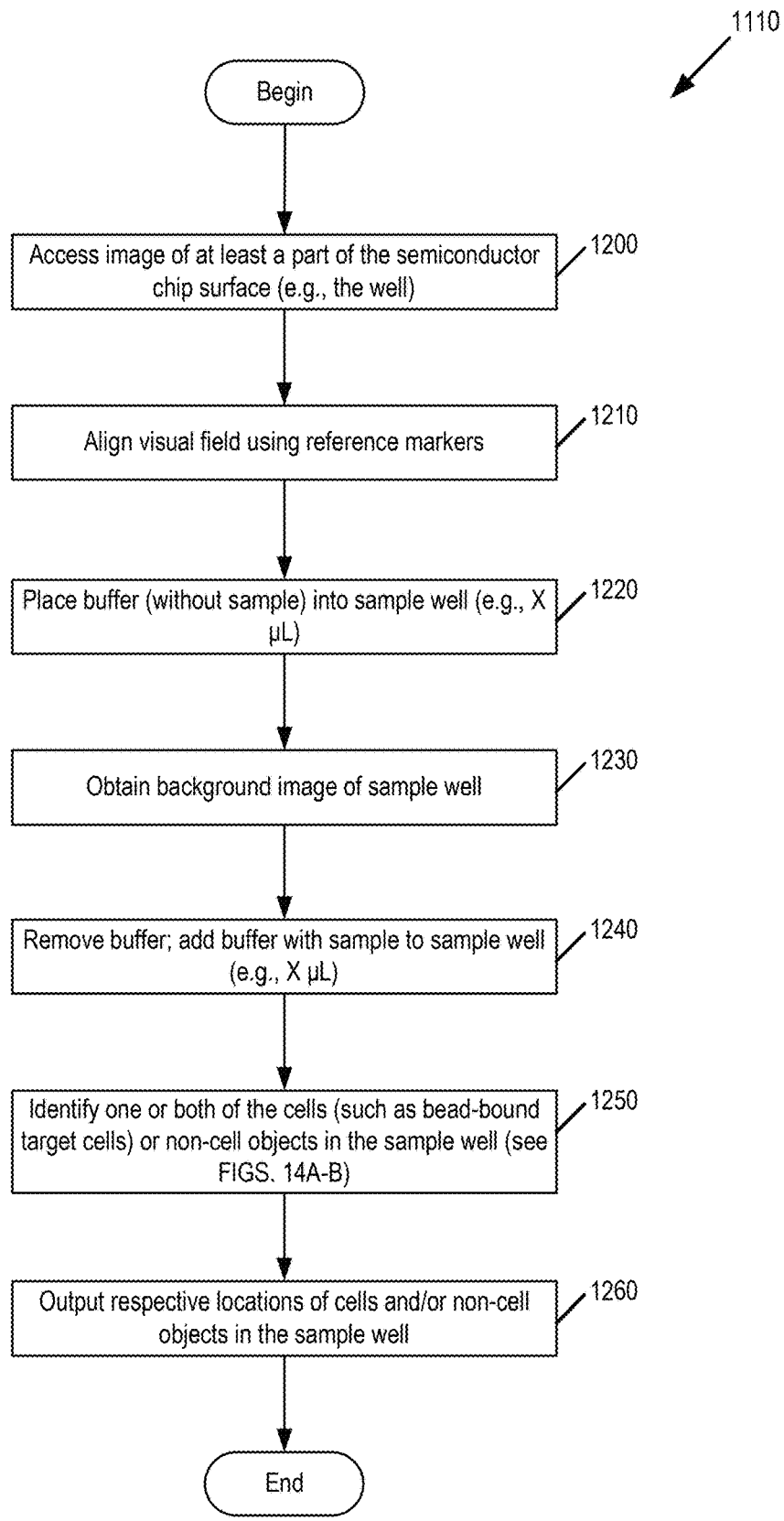
FIG. 12 illustrates an expanded flow chart for cell identification.

FIG. 12 illustrates an expanded flow chart for cell identification 1110. At 1200, input of at least a part of the system is accessed. For example, an image of at least a part of the semiconductor chip surface, such as the well on the chip surface, that is generated by a camera is accessed. At 1210, the visual field for the camera may be aligned using reference markers. At 1220, buffer (without the sample) is placed or deposited in the sample well. The amount of buffer deposited may be a predetermined amount of μL (such as X μL). At 1230, the camera may obtain or capture the background image (with the buffer). At 1240, the buffer is removed and buffer with the sample is deposited into the sample well. The amount of buffer with the sample deposited into the sample well may be the same as at 1220. At 1250, one or both of the cells (such as bead-bound target cells) or non-cell objects (e.g., obstacles) in the sample well may be identified. An example of a process to perform the identification is discussed in further detail below with regard to FIGS. 14A-B. At 1260, the respective locations of the cells identified on the chip surface and/or the respective locations of the obstacles identified on the chip surface is output.

Cell sorting may be performed in one of several ways. In one way, after the bead-bound target cell(s) have been identified (with the associated coordinate(s)), the system may determine a series of commands to control the current through the respective wires in order to control the magnetic fields (e.g., the entire sequence of commands in order to move the bead-bound target cells to the corner well(s)). After which, the system may perform the series of commands without dynamically tracking the bead-bound target cell(s) as it/they are sorted to a respective corner well. Alternatively, after the bead-bound target cell(s) have been identified (with the associated coordinate(s)), the system may determine command(s) (such as the commands for the entire process to move the bead-bound target cell(s) to the corner well(s) or the commands for only part of the process to move the bead-bound target cell(s) to the corner well(s)) to control the current through the respective wires in order to control the magnetic fields. After which, the system may perform the series of commands and dynamically track the bead-bound target cell(s) as it/they are sorted to a respective corner well. The dynamic tracking may then be used to modify the commands previously generated, or may be used to generate new commands in real-time or near real-time.

Figure 13:
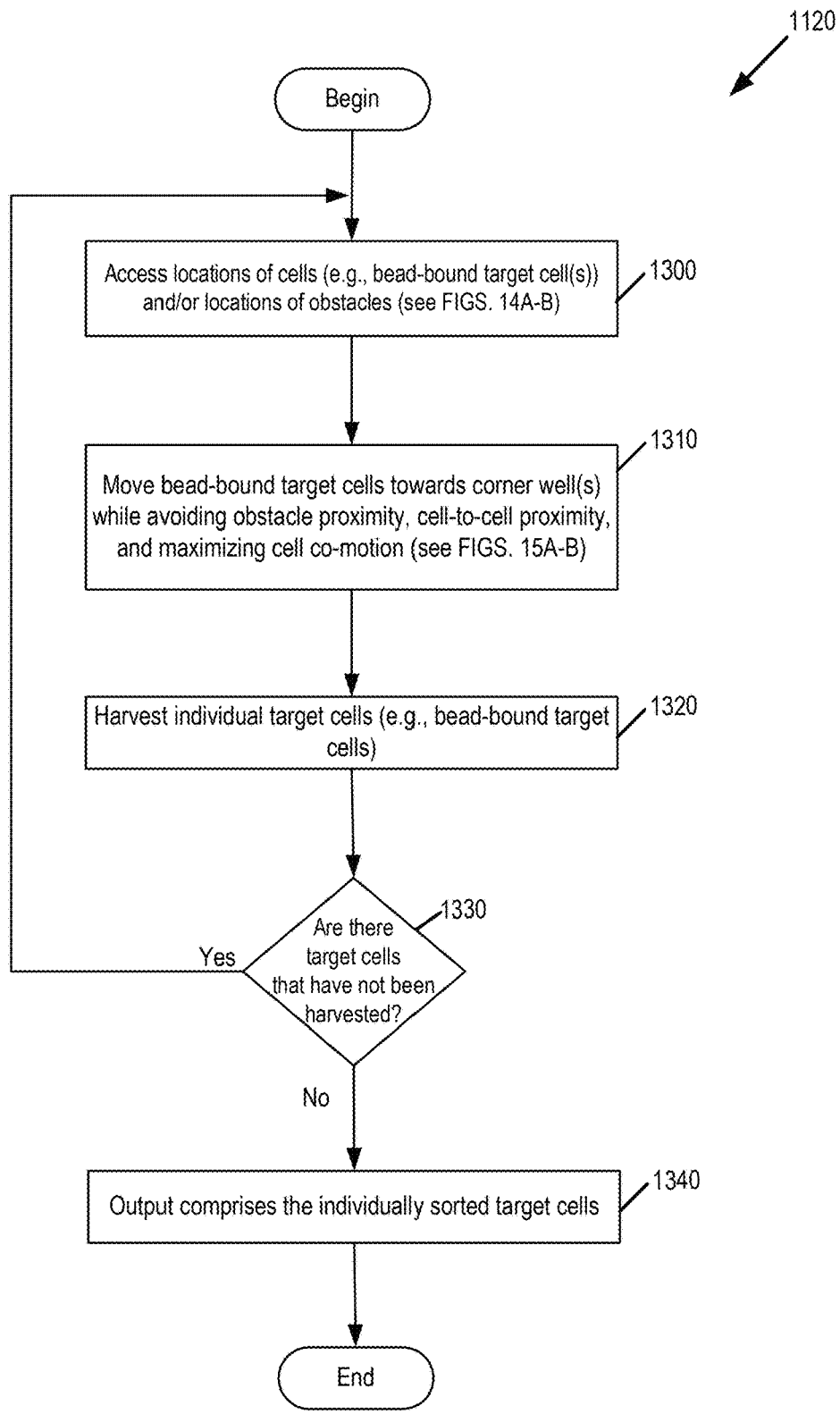
FIG. 13 illustrates an expanded flow chart for cell sorting.

FIG. 13 illustrates an expanded flow chart for cell sorting 1120 using dynamic tracking. At 1300, the respective locations of the cells (e.g., the bead-bound target cells) identified on the chip surface and/or the respective locations of the obstacles identified on the chip surface are accessed. As discussed above, example of this are illustrated in FIG. 12 (see 1260) and FIGS. 14A-B (1462). Various ways of sorting the target cells are contemplated. For example, the spacing between the target cells on the chip may be reduced or minimized using indiscriminate (e.g., not concerned with cell co-motion) wire activation while moving target cells towards corner well (or outlet) while also avoiding obstacles. In this regard, at 1310, bead-bound target cells are moved towards corner well(s) while avoiding obstacle proximity, cell-to-cell proximity, and maximizing cell co-motion. An example of this is illustrated FIG. 15A.

After the target cells are moved to the corners (e.g., the outlets) of the well, at 1320, the individually sorted target cells may be removed from the corner(s). This is illustrated, for example, in FIG. 6E, discussed above. At 1330, it is determined whether there are any other target cells that have not been harvested. If so, flow diagram 1120 loops back to 1300. If not, at 1340, the output comprises the individually sorted target cells.

As discussed further below, imaging may be performed in order to determine whether a particle in the well is greater than or equal to a predetermined size (e.g., 5 micron×5 micron; 10 micron×10 micron). The threshold may be selected based on one or both of: the size of the bead-bound target cell (which in one embodiment is approximately 10 micron×10 micron); or the size of a potential obstacle. In the event of an optical system with a higher resolution camera, the system may obtain an image and identify particles that are smaller (on the order of 5 micron×5 micron). In this regard, the system may identify obstacles and navigate the cell sorting accounting for the obstacles. Alternatively, in the event of a lower resolution camera, the system may obtain an image and identify particles that are larger (on the order of 10 micron×10 micron). In this way, larger particles may be encountered when cell sorting. So that, the system may more dynamically modify the selection of the applied magnetic fields in the event that the bead-bound target cell becomes stuck (such as on an obstacle that is less than 10 micron×10 micron) as it moves toward the outlet.

Figure 14A:
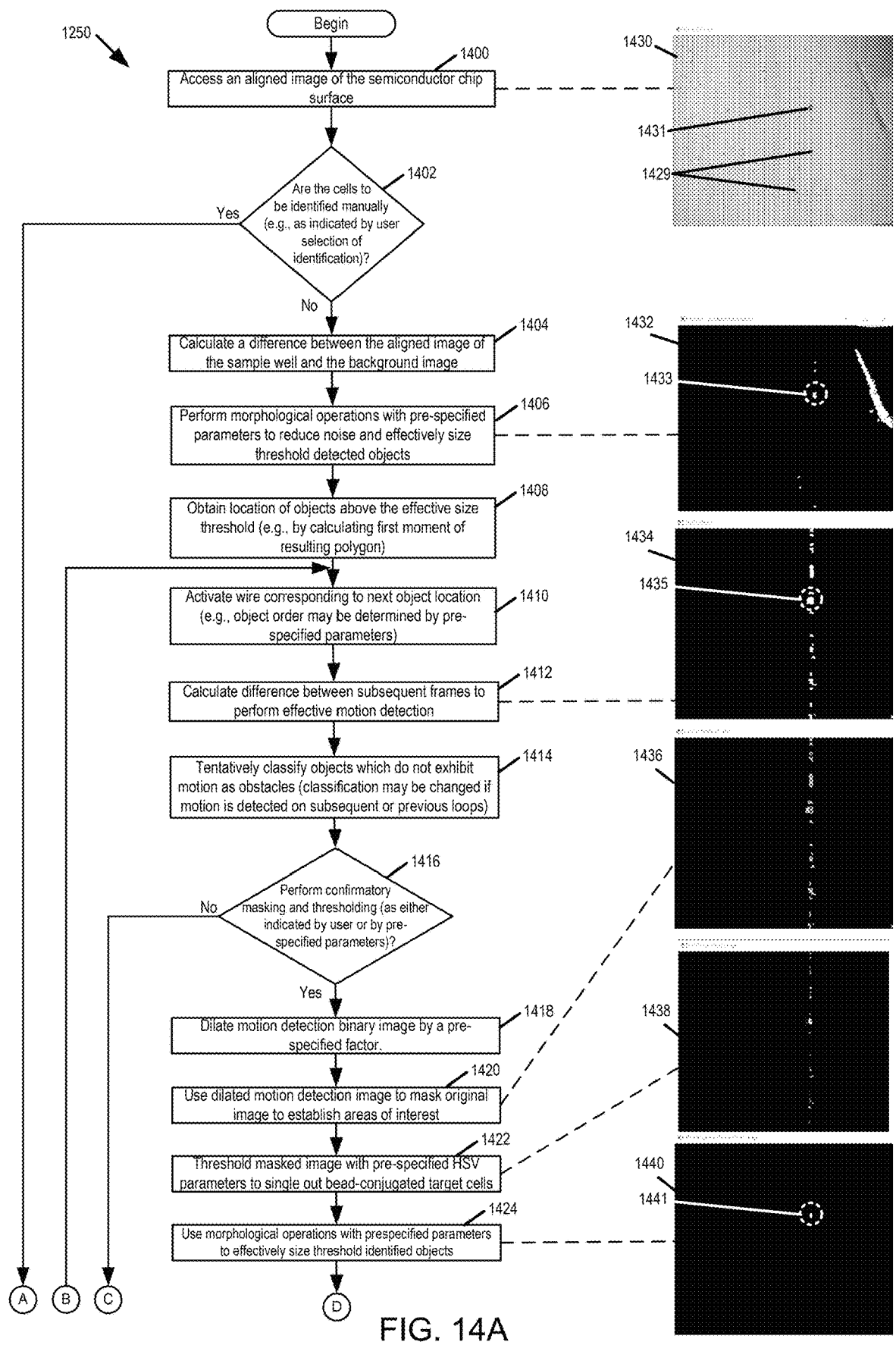
FIGS. 14A-B illustrate an example of cell and obstacle identification which may be part of cell identification.
Figure 14B:
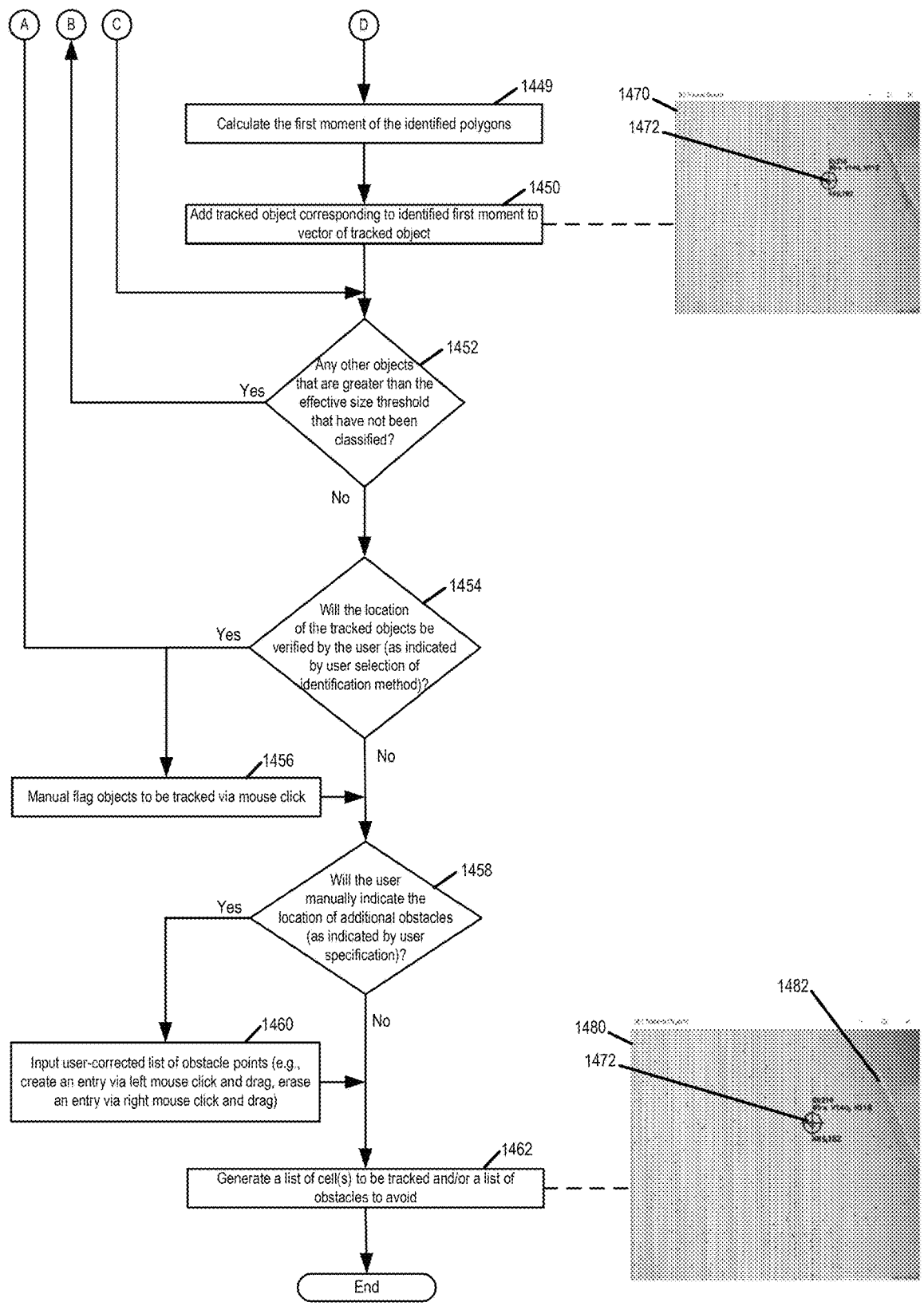

FIGS. 14A-B illustrate an example of cell and obstacle identification at 1250 which may be part of cell identification. At 1400, an aligned image of the semiconductor chip surface may be accessed. An example aligned image is shown at 1430 (which is the image illustrated in FIG. 17A, with the bead-bound target cell 1431 and free beads 1429). For example, the buffer containing the particles may be introduced into the sample well. After which, a camera may obtain an image that is automatically aligned based on one or more markings on the semiconductor chip surface. Alternatively, the camera may take an image of the semiconductor chip surface (with the image including the one or more markings). After which, the image may be cropped or a section of the image may be identified as correlated to the sample well. In either instance, an image may be obtained of the sample well.

At 1402, it is determined whether the cells are to be identified manually (such as by a technician identifying the cells through a microscope). If so, 1250 moves to 1456. If not, particles in the well of a certain size or greater may be identified. Detecting particles in the well of a certain size or greater may be performed in one of several ways. One way is disclosed in FIG. 14A, whereby at 1404, a difference is calculated between the aligned image (e.g., the current image of the sample well with the buffer containing the particles) and the background image (e.g., an image of the sample will without buffer or with buffer but no particles). At 1406, morphological operations with pre-specified parameters are performed in order to reduce noise and effectively size the threshold detected objects. An example of the output of performing the morphological operations is illustrated at 1432. As shown in 1432, based on the morphological operations, there is one location associated with 1433 (highlighted by a white dashed-line circle) that comprises a potential bead-bound target cell.

Morphological operations may include one or both of dilation (e.g., where the white areas are increased in size) and erosion (e.g., where the white areas are decreased in size). Morphological operations may use a thresholded image (e.g., black for pixels which do not meet the threshold, white for pixels that do meet the threshold). The pre-specified parameters primarily may include the kernel size for the dilation and erosion, which determine to what degree the white areas will be enlarged or shrunk.

At 1408, the location of objects that are greater than the effective size threshold are obtained. As discussed above, the bead-bound target cell is at least a certain size or greater. As such, to identify the potential candidates for the bead-bound target cell, particles greater than or equal to a certain size threshold are identified. Various ways to perform the size threshold analysis are contemplated. As merely one example, the size threshold analysis may be performed by calculating the first moment of the resulting polygon.

In one or some embodiments, the methodology will apply a magnetic field to one, some, or all of the objects. Further, in terms of sequence, the applied magnetic field may be for movement of objects one-at-a-time, movement of some but not all of the objects in a group, or movement of all of the objects in the well. In one way, the methodology activates a wire that is next to an identified object. If the object moves in response to the wire activation, then it is likely to be a bead-conjugated target cell. If the object does not move in response to the wire activation, then the object is either some sort of obstacle (e.g., dirt in the well) or the object is a bead-conjugated target cell that has gotten stuck on an obstacle. In this regard, in one or some embodiments, responsive to determining that the object does not move in response to wire activation, it is assumed that the object is an obstacle. Alternatively, responsive to determining that the object does not move in response to wire activation, the methodology may attempt one or more different sequences of wire activation in an attempt to move the object in the event the object is stuck. For example, a first applied magnetic field may spur movement of a magnetic bead-bound target cell in a first direction. In the event that the magnetic bead-bound target cell is blocked in the first direction (and thus does not move responsive to the first applied magnetic field), the system may generate a second applied magnetic field may spur movement of a magnetic bead-bound target cell in a second direction, with the second direction being at least 45° different than the first direction or at least 90° different than the first direction. In this way, in the event that the magnetic bead-bound target cell is not blocked in the second direction (and thus moves responsive to the second applied magnetic field), the system may identify the particle as a magnetic bead-bound target cell. Thus, different sets of wires, such as wires on different levels (e.g., horizontal versus vertical; chevron versus diagonal) may be activated in order to generate the first applied magnetic field and the second magnetic field.

Referring back to FIG. 14A, at 1410, wire(s) are activated corresponding to the next object location. Further, the object order for activating wires may be determined by pre-specified parameters. Motion may then be determined for the objects subject to the magnetic field. As merely one example, the objects may be tested from farthermost left in the well to farthermost right in the well. In particular, objects may be clustered together to test in combination, such as objects that are on the same wire, thereby decreasing the number of wire activations and, in turn, improving the speed of the methodology of cell identification.

Referring back to 1432, there is shown potential bead-bound target cell 1433. In this regard, the wires in the vicinity of the potential bead-bound target cell 1433 may be activated. As merely one example in which horizontal and vertical wires are used to generate the magnetic fields, the coordinates associated with the location of the potential bead-bound target cell 1433 may be correlated to wires, such as one or both of the horizontal wires or the vertical wires. In turn, the wires in the vicinity of the location of the potential bead-bound target cell 1433 may be activated. In one example, in which movement is expected in the rightward/leftward direction, activation in a sequence is performed for: the vertical wire that is most proximate to (e.g., underneath or nearest underneath) the location of the potential bead-bound target cell 1433; one or more vertical wires to the right of the vertical wire most proximate to the location of the potential bead-bound target cell 1433; and one or more vertical wires to the left of the vertical wire most proximate to the location of the potential bead-bound target cell 1433. The sequence may comprise activation first in one direction (e.g., the selected vertical wires in the rightward direction) and then in the opposite direction (e.g., the selected vertical wires in the leftward direction). In this way, the potential bead-bound target cell 1433, if it is actually is a bead-bound target cell, will move rightward/leftward. Alternatively, in which movement is expected in the upward/downward direction, activation in a sequence is performed for: the horizontal wire most proximate to (e.g., above or nearest above) the location of the potential bead-bound target cell 1433; one or more horizontal wires upward to the horizontal wire most proximate to the location of the potential bead-bound target cell 1433; and one or more horizontal wires upward to the vertical wire most proximate to the location of the potential bead-bound target cell 1433. The sequence may comprise activation first in one direction (e.g., the selected vertical wires in the upward direction) and then in the opposite direction (e.g., the selected vertical wires in the downward direction). In this way, the potential bead-bound target cell 1433, if it is actually is a bead-bound target cell, will move upward/downward. These movements are merely illustrative. Other movements are contemplated.

For example, at 1412, the difference between subsequent frames generated by the camera may be analyzed in order to calculate the differences in position, and in turn to perform effective motion detection for one, some, or all of the objects identified that are greater than the effective size threshold. An illustration of the calculated difference is shown at 1434. In this regard, the white pixels in 1434 indicate where a difference between the different frames (such as the subsequent frames) has been detected. As discussed above, the wires in the vicinity of the location of the potential bead-bound target cell are activated (see above where the vertical wires in the vicinity of the potential bead-bound target cell 1433 may be activated). Thus, 1434 illustrates movement around the vertical wires that were activated, with 1435 showing a greater number of pixels indicating greater movement in the rightward/leftward direction.

At 1414, objects that do not exhibit motion may be tentatively classified as obstacles. This classification may be changed if motion for these objects is detected in subsequent or previous loops through 1410 and 1412.

As discussed above, the bead-bound target cell has certain properties including that the bead-bound target cell may move subject to a magnetic field of sufficient strength. Further, as discussed above, the objects (associated with the locations obtained at 1408) may comprise contaminants greater than or equal to a certain size threshold, free beads in a clump greater than or equal to a certain size threshold, or the bead-bound target cell. Generally applying a magnetic field to the contaminants will not result in their movement since the contaminants are not magnetized. In contrast, free beads will move subject to an applied magnetic field. However, the free beads, being smaller and lighter than the bead-bound target cells, move subject to a smaller applied magnetic field. As such, one or more magnetic fields may be applied in order to determine whether any movement occurs. In particular, a first magnetic field, sufficient in magnitude to move free beads but insufficient in magnitude to move a bead-bound target cell, may be applied to determine whether any of the identified objects moves. If so, the objects that have moved under the first magnetic field may be identified as free beads and thus removed from being potential bead-bound target cells. A second magnetic field, sufficient in magnitude to move a bead-bound target cell, may be applied to determine whether any of the identified objects moves. If so, the objects that have moved under the second magnetic field (but not under the first magnetic field) may be identified as free beads and thus removed from being potential bead-bound target cells. Further, the objects that have not moved under either the first magnetic field or the second magnetic field may be identified as contaminants and thus potential obstacles.

At 1416, it is determined whether to perform confirmatory masking and thresholding (either as indicated by the technician or by pre-specified parameters) If not, 1250 moves to

1452. If so, at 1418, the system generates a dilated motion detection binary image by a pre-specified factor, and at 1420, uses the dilated motion detection binary image to mask the original image (e.g., 1430) to establish areas of interest. An example of this is illustrated at 1436, which dilates the image at 1434 to increase the resolution in order to use 1436 as a mask on the image at 1430 (in order to focus only on areas on the image at 1430 where motion was detected).

At 1422, the masked image is thresholded with pre-specified Hue, Saturation, Value (HSV) parameters to single out the bead-conjugated target cells. An example of this is illustrated at 1438 in which HSV thresholding is applied only to those parts of the image where movement was detected. In particular, the bead-bound target cells may have a specific set of HSV colors. The motion masking may be performed to segment (e.g., exclude or include) any areas which may have the same HSV color as the bead-conjugated target cells.

At 1424, morphological operations are used with pre-specified parameters in order to effectively size threshold identified objects to further isolate the object, in case there are small areas of color which may match the HSV color of the bead-conjugated target cell. An example of this is illustrated at 1440, in which 1441 is identified as an object that is greater than or equal to the size threshold. At 1449, the first moment of the identified polygons is calculated. The first moment may effectively be calculating the "center of mass" of the pixels in question, thereby obtaining an "average" location of the bead-bound target cell. At 1450, the tracked object corresponding to the identified first moment is added to a vector of the tracked object. An example of this is illustrated at 1470, with the tracked object identified at 1472.

It is noted that 1418, 1420, 1422, 1424, 1449 and 1450 may not be necessary to identify the bead-bound target cells and obstacles. However, they may improve the accuracy and specificity of the identification. For example, if the object of interest did not move in response to step 1412 but in actuality is a bead-conjugated target cell that happens to be stuck, then any one, any combination, or all of these steps may assist in identifying the object as a bead-conjugated target cell (that was potentially stuck or trapped) as opposed to an obstacle. In this regard, 1418, 1420, 1422, 1424, 1449 and 1450 may be considered confirmatory because they may be redundant most of the time, assuming that the bead-bound target cells do not get stuck upon initially being deposited onto the chip.

At 1452, it is determined whether there are any other objects that are greater than the effective size threshold that have not been classified. If so, 1250 moves to 1410. If not, at 1454, it is determined whether the location of the tracked objects will be verified by the technician (such as via manual input with a user selection identification method). If so, at 1456, the technician provides input (e.g., with the screen displaying 1470, the technician inputs a mouse click on a portion of the screen associated with 1472), thereby manually flagging objects to be tracked. If not, at 1458, it is determined whether the technician will manually indicate the location of additional obstacles (such as indicated by technician input). If so, at 1460, a user-corrected list of obstacle points is input. Thus, separate from or in addition to technician input as to the bead-bound target cells, the technician may provide input as to obstacles, such as removing obstacles that have been identified by the system and/or adding obstacles not identified by the system (e.g., the technician may create, via input such as a left mouse click and drag, an obstacle; the technician may erase, via right mouse click and drag, a previously system-identified obstacle). At 1462, the system may generate one or more outputs, such as a list of cell(s) to be tracked (e.g., list of bead-bound target cells) and/or a list of obstacle(s) to avoid. The output may be in one of several forms, such as in an image 1480, showing the tracked object identified at 1472 and the obstacle 1482. Alternatively, or in addition, the system may output a list of coordinates in text form.

Thus, in one or some embodiments, in practice, the images may be captured in real time by the optical system of the platform. The user may then indicate whether or not the user wishes to manually indicate the locations of the cells (which may be performed by clicking on the corresponding locations in the image), or if the user wants to have the software automatically identify potential target cells.

If the automatic cell identification is selected, the user may also indicate if the user wants to manually confirm whether or not the identified objects are cells and should be sorted, or if the user wants the software to continue with sorting without checking the identified objects.

As discussed above, the automatic cell identification may begin by performing a wire sweep, which may sequentially be activated one, some or every wire on the semiconductor chip and may look for resulting motion from the sweep. In particular The motion may be captured in a binary image, which may be used as a mask on the original image, in order to reduce false positive cell detection.

Thus, images may be analyzed to highlight potential target cells and their respective coordinates, such as by image masking and hue-saturation-value (HSV) filtering using predefined filtering parameters and morphological operations on binary images. In this way, HSV thresholding may be performed on the masked image in order to identify the location of bead-bound target cells, producing another binary image. Morphological operations (e.g., erosion and dilation) may be used to effectively perform size thresholding on the resulting image, which may filter out beads and bead clusters, leaving only bead-bound target cells in the resulting image. The location of the identified cells may then be noted and indicated. This sequence may be repeated until some or all bead-bound target cells are detected and tagged. After which, the user may manually check the results of the cell identification. The confirmed list of cells may then be used by the cell sorting algorithm to move the bead-bound target cells to the corner wells of the chip in an optimal manner.

As discussed above, various methodologies may be used to perform the cell sorting. As one example, the methodology may first detect whether any two cells or a cell-obstacle are too close to one another, and then resolve those proximities by moving the cells farther away from one another or the cell farther away from the obstacle. In one or some embodiments, too close a proximity is to be avoided in order to allow the bead-bound target cells to be moved individually when needed. Then, when the proximities are resolved, the methodology may select the target cell(s) to move (such as first focusing on target cells closest to the center of the well and then outward or first focusing on target cells closest to a corner well and then moving toward the center) and activate the wires sequentially so that the target cell(s) move towards the respective corner. In a dynamic cell sorting methodology, the system may activate the respective wires until the system detects another too-close proximity of cells or cell-obstacle; responsive to detecting the too-close proximity, the system may resolve it by separation (e.g., controlling current in the wires to move one or both of the cells in a cell-cell too-close proximity; controlling current in the wires to move the target cell away from the obstacle in a target cell-obstacle too-close proximity). The system may iterate with the dynamic cell sorting until the target cells are sorted in the respective corner well. In one embodiment, the system may attempt to increase or maximize co-motion of target cells such that multiple target cells are moved simultaneously.

Figure 15A:
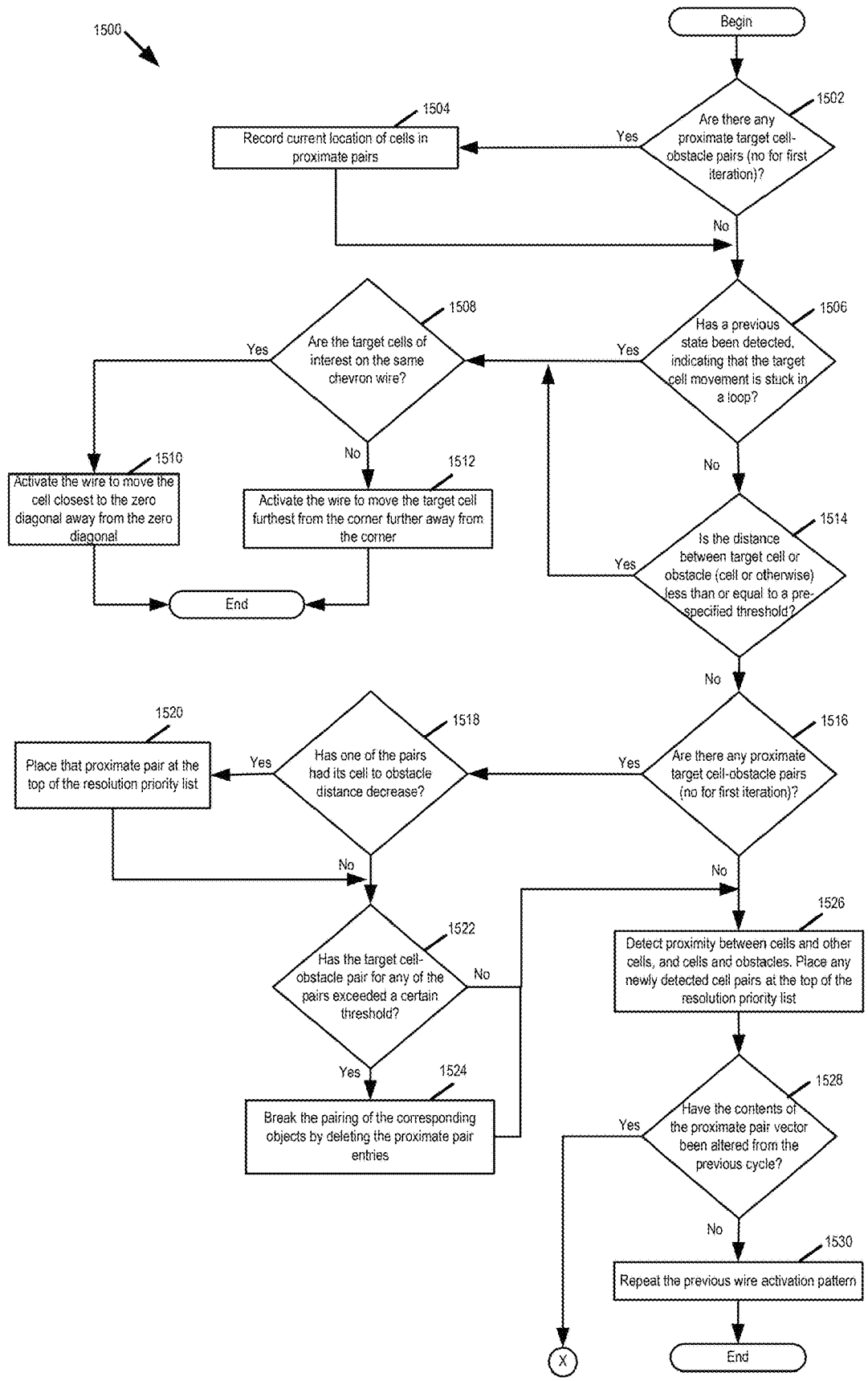
FIGS. 15A-B illustrate an example flow diagram for cell sorting.
Figure 15B:
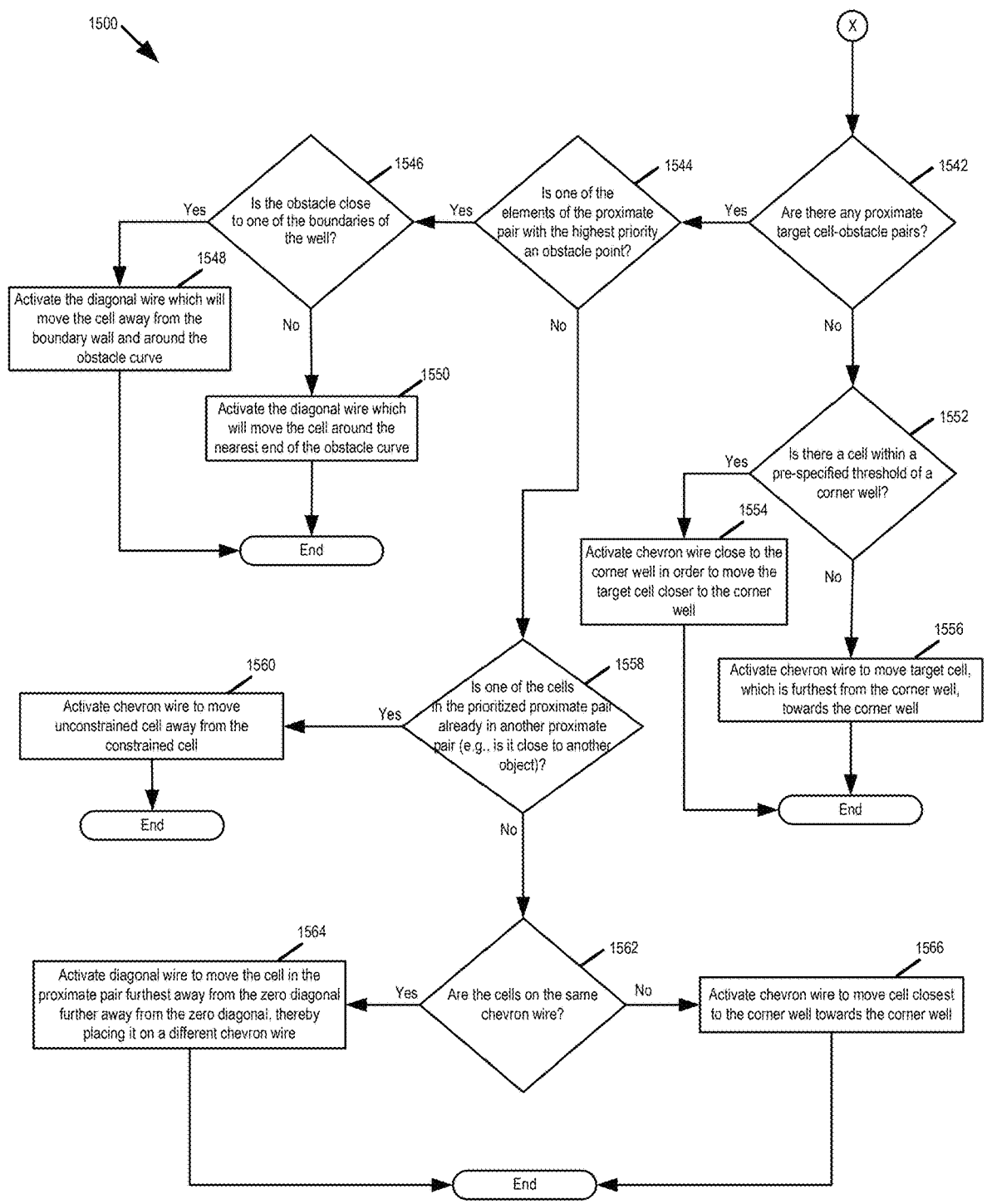

FIGS. 15A-B illustrate an example flow diagram 1500 for cell sorting (1120). At 1502, the system determines whether there are any proximate target cell-obstacle pairs. The target cell-obstacle pairs may comprise two bead-bound target cells or a bead-bound target cell and an obstacle (such as a contaminant or a clump of free beads). Two bead-bound target cells may be considered a target cell-obstacle pair since one of the two target cells is treated as an obstacle (e.g., one of the target cells remains stationary relative to the other target cell). Further, it is assumed that there are no proximate target cell-obstacle pairs in the first iteration.

If so, at 1504, the current location of the cells in proximate pairs are recorded. If not, flow diagram 1500 goes directly to 1506, which determines whether a previous state has been detected, indicating that the bead-bound target cell movement is stuck in a loop. Thus, in one or some embodiments, if the target cells return to a state they have already occupied in their movement, then the same sequence of wire activations may repeat as before, since this methodology is deterministic. As such, in order to prevent an infinite loop, if such a state is detected, an alternate movement method is utilized in order to break the methodology out of any instances where it may not terminate. If no proximate pairs are detected, then this type of infinite loop may not happen, since the target cells are free to simply move towards the corner.

Referring back to FIG. 15A, if yes, at 1508, it is determined whether the bead-bound target cells of interest are on the same wire (such as on the same chevron wire). If so, at 1510, the system activates the wire to move the target cell closest to the zero diagonal away from the zero diagonal. If not, at 1512, the system activates the wire to move the target cell furthest from the corner further away from the corner. After which, flow diagram 1500 ends.

If the previous state has not been detected, at 1514, the system determines whether the distance between target cell or obstacle (cell or otherwise) is less than or equal to a prespecified threshold (e.g., a secondary threshold which tracks if the objects in a proximate pair will nearly collide into each other (imminent collision threshold as opposed to proximity threshold)). If so, flow diagram 1500 goes to 1508. If not, at 1516, the system determines whether there are any proximate target cell-obstacle pairs. Further, it is assumed that there are no proximate target cell-obstacle pairs in the first iteration. If so, at 1518, the system determines whether one of the pairs had its cell to obstacle distance decrease. If yes, at 1520, the system places that proximate pair at the top of the resolution priority list. If not, at 1522, the system determines whether the target cell-obstacle pair for any of the pairs has exceeded a certain threshold (e.g., a respective target cell and its previously associated obstacle have separated sufficiently). If yes, at 1524, the system breaks the pairing of the corresponding objects by deleting the proximate pair entries.

At 1526, the system detects proximity between cells and other cells, and cells and obstacles, and places any newly detected cell pairs at the top of the resolution priority list. At 1528, the system determines whether the contents of the proximate pair vector have been altered from the previous cycle. If not, at 1530, the previous wire activation pattern is repeated and flow diagram 1500 ends. If so, at 1542, the system determines whether there are any proximate target cell-obstacle pairs. If so, at 1544, the system determines whether one of the elements of the proximate pair with the highest priority is an obstacle point. If so, at 1546, the system determines whether the obstacle is close to one of the boundaries of the well. If so, at 1548, the system activates the diagonal wire which will move the cell away from the boundary wall and around the obstacle curve. If not, at 1550, the system activates the diagonal wire which will move the cell around the nearest end of the obstacle curve. Thus, in one embodiment, obstacle avoidance may be performed by the diagonal wires whereas movement of the target cell to the corner well may be performed by the chevron wires.

If there are not any proximate target cell-obstacle pairs (at 1542), flow diagram 1500 goes to 1552 to determine if there is a cell within a pre-specified threshold of a corner well. If so, at 1554, the system activates a chevron wire close to the corner well in order to move the target cell closer to the corner well. Otherwise, at 1556, the system activates the chevron wire in order to move the target cell, which is further from the corner well, toward the corner well.

If so at 1544, at 1558, the system determines if one of the cells in the prioritized proximate pair is already in another proximate pair (e.g., is it close to another object). If so, at 1560, the system activates the chevron wire to move the unconstrained target cell away from the constrained target cell (e.g., the constrained cell comprises a cell which is close to another object). If not, at 1562, the system determines if the cells are on the same chevron wire. If yes, at 1564, the system activates the diagonal wire to move the target cell in the proximate pair furthest away from the zero diagonal further away from the zero diagonal, thereby placing it on a different chevron wire. If no, at 1566, the system activates the chevron wire which will move the cell closest to the corner well towards the corner well.

In this way, after the bead-bound target cells are identified, the identified bead-bound target cells may be moved to the outlets in an efficient matter. In one or some embodiments, once a bead-bound target cell has been located, a distance comparison algorithm may be used to determine which corner of the chip is closest to the cell. Distance minimization may be performed to reduce movement time, effectively accelerating the sorting process. In multi-target cell applications, the target cells which are closest to the center may be moved first to allow the target cells closer to the corners to be swept along with the central cells, reducing processing time. The wire which may move the bead-bound target cell towards the nearest corner may then be activated. Motion detection via temporal filtering (which may be performed by calculating the distance in color space between pixel values of sequential images) may be used to confirm the movement of the bead-bound target cell. HSV filtering may be used as a secondary method of confirming the bead-bound target cell's position, similar to the process (discussed above) used in the automatic identification of the bead-bound target cells prior to their movement. The movement process may then loop until the bead-bound target cell has been moved to the corner for harvesting.

In one or some embodiments, the cell sorting may be processed in sections of the well simultaneously, such as in 4 quadrants simultaneously. The platform may use an algorithm to align with the strategy (e.g., quickest) to move the bead-bound target cells to one of the corner outlets. The algorithm may take into account multiple scenarios including, but not limited to any one, any combination, or all of:

(1) bead-bound target cells being unevenly distributed across the 4 quadrants; (2) non-target cells blocking the path of target cells; or (3) the presence of multiple target cells along the same wire, causing all of the cells to move when the wire is activated. To make the algorithm more robust, multiple images may be taken during the cell sorting process and may be used as inputs to calibrate and adjust the algorithm in real time.

Further, a control program may control the magnetic tip movement. In particular, once a cell is moved to a corner outlet, the control program may send command(s) to the robot to move the magnetic tip to the corresponding location to collect the cell and transfer it to a well plate or PCR tube at a fixed location.

Figure 16A:
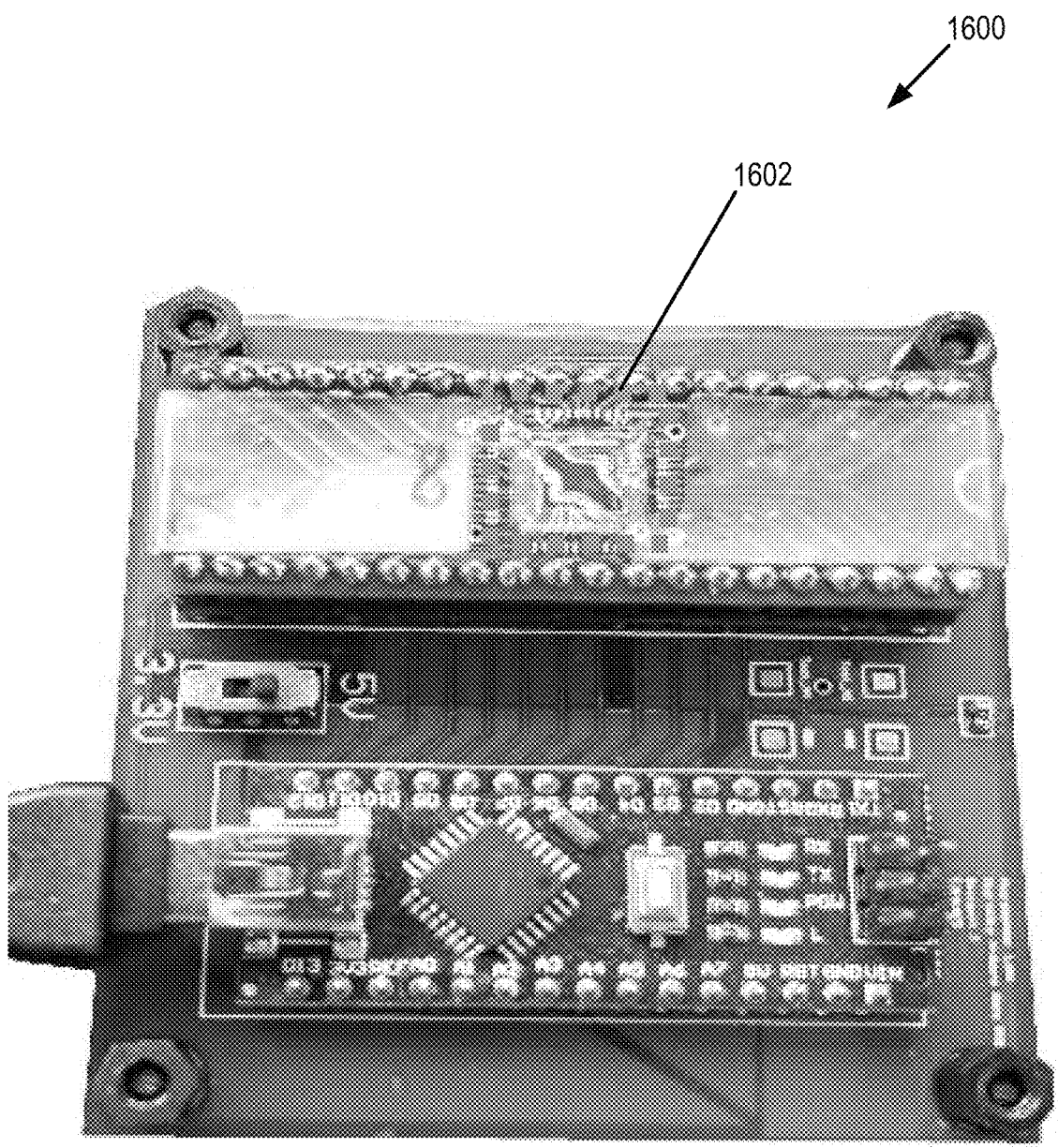
FIG. 16A illustrates a printed circuit board with the semiconductor chip.
Figure 16B:
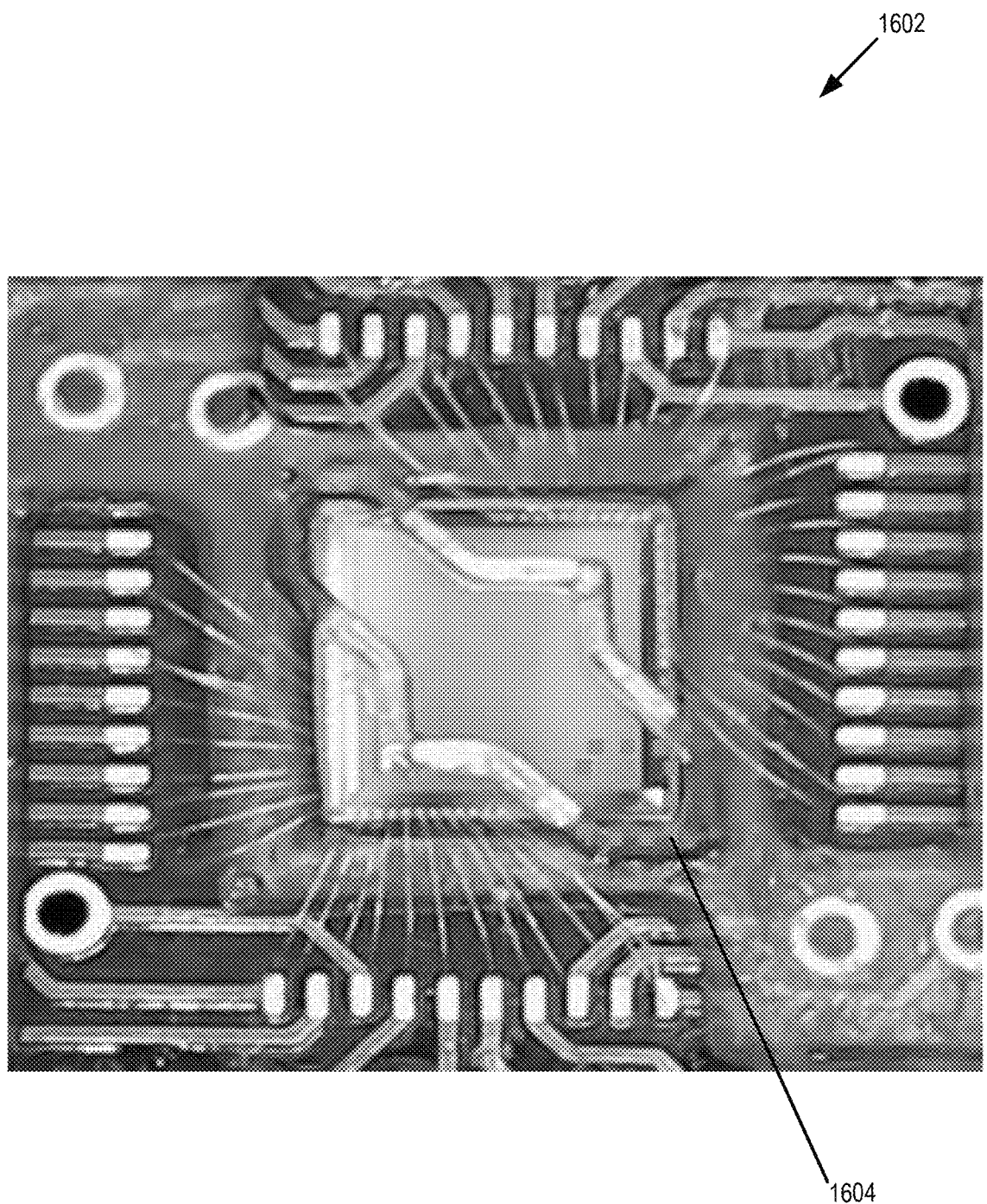
FIG. 16B illustrates the semiconductor chip.
Figure 16C:
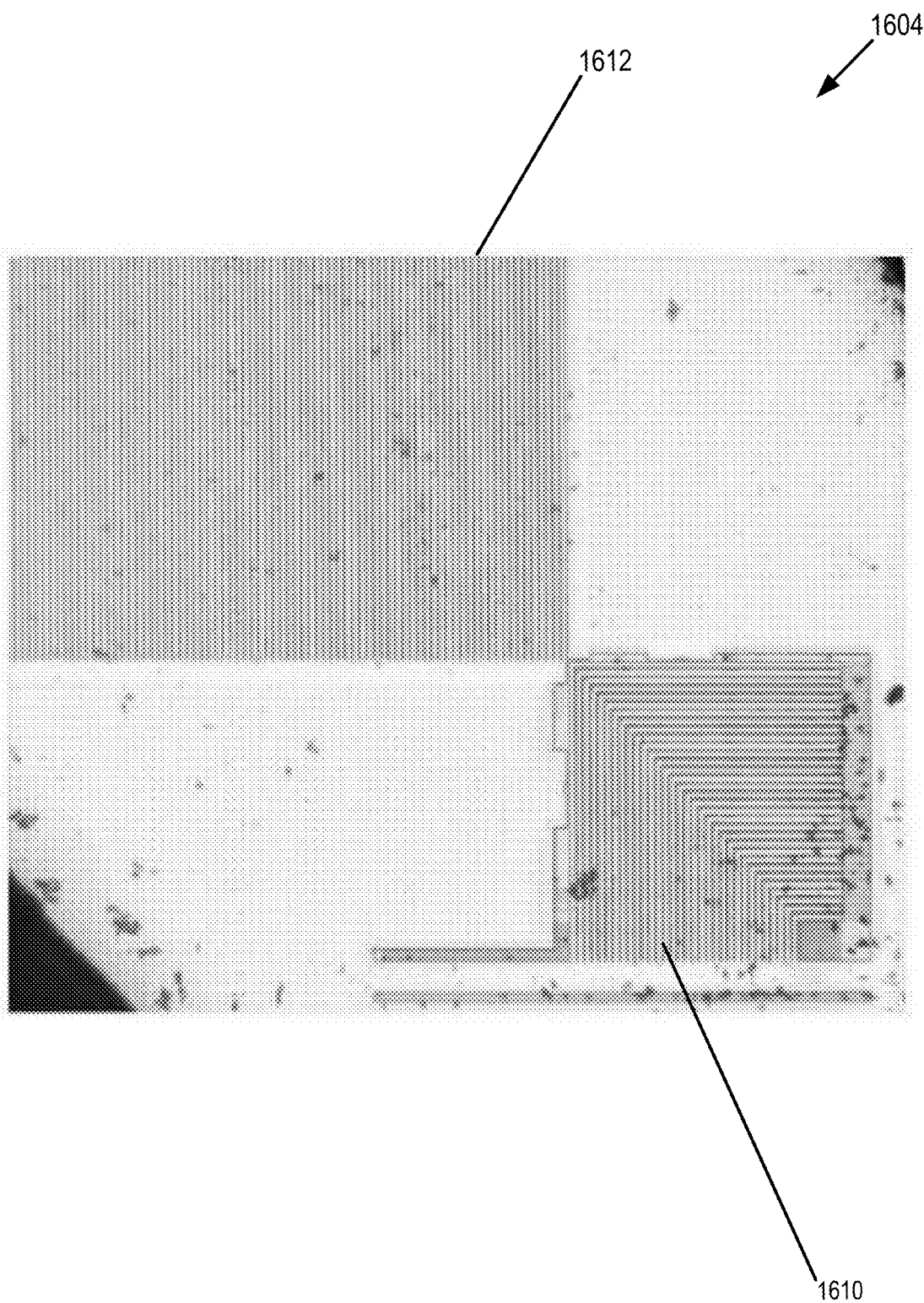
FIG. 16C illustrates example wire patterns on the semiconductor chip.
Figure 16D:
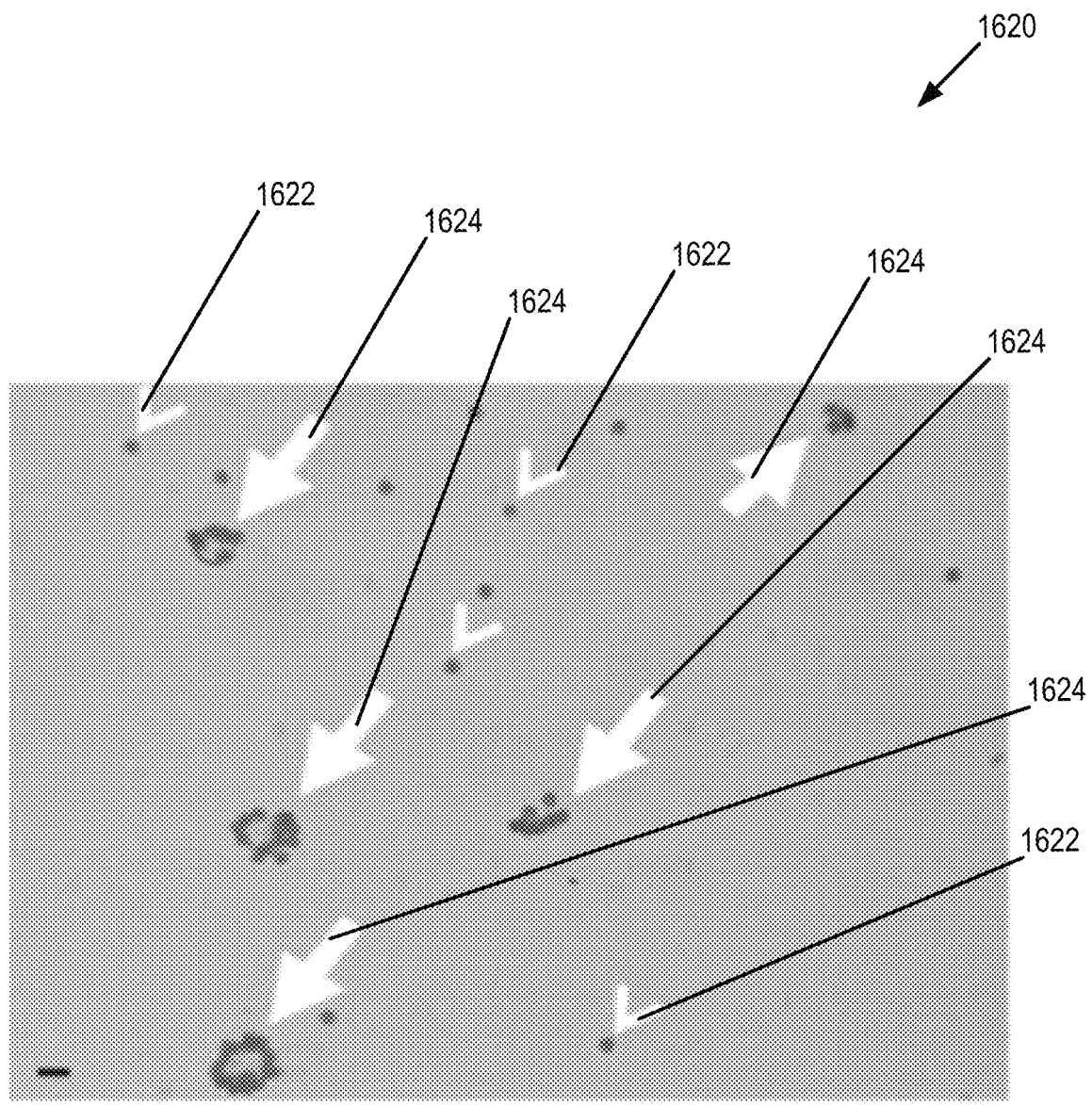
FIG. 16D illustrates an image with bead-labeled target cells and free beads.
Figure 16E:
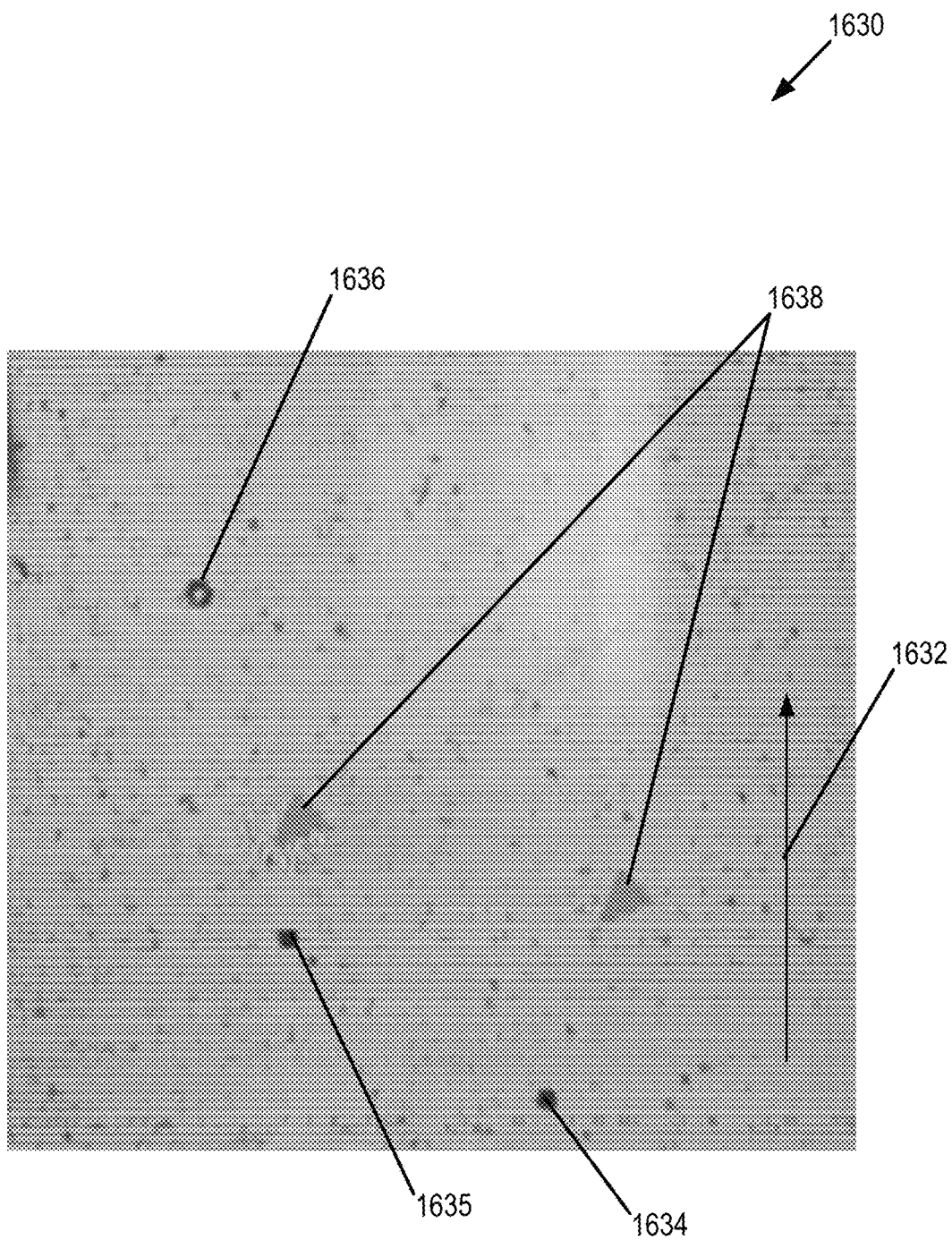
FIGS. 16 E-I show images of the movement of 3 CTCs and PBMCs responsive to the metal wires being activated in sequence.
Figure 16F:
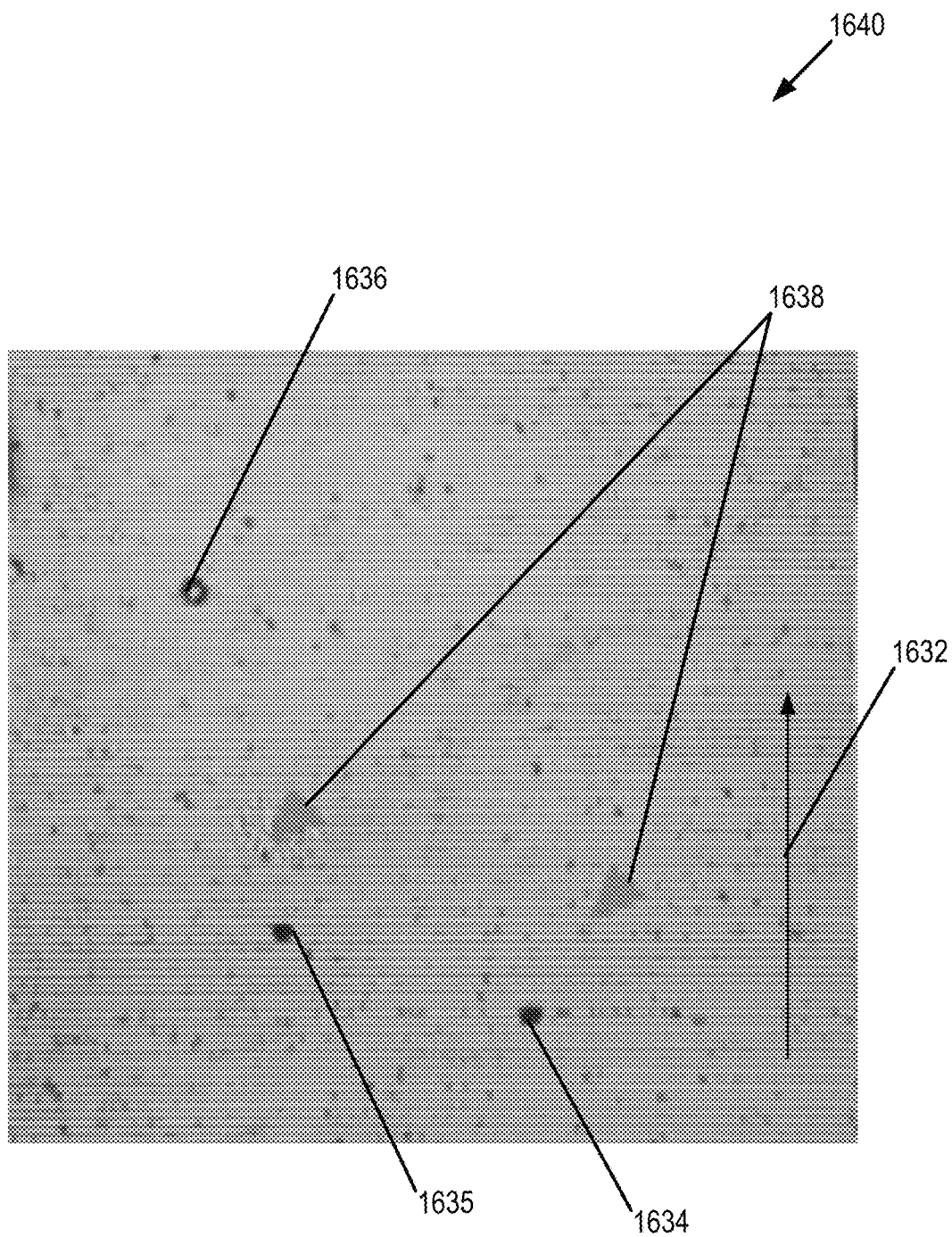
Figure 16G:
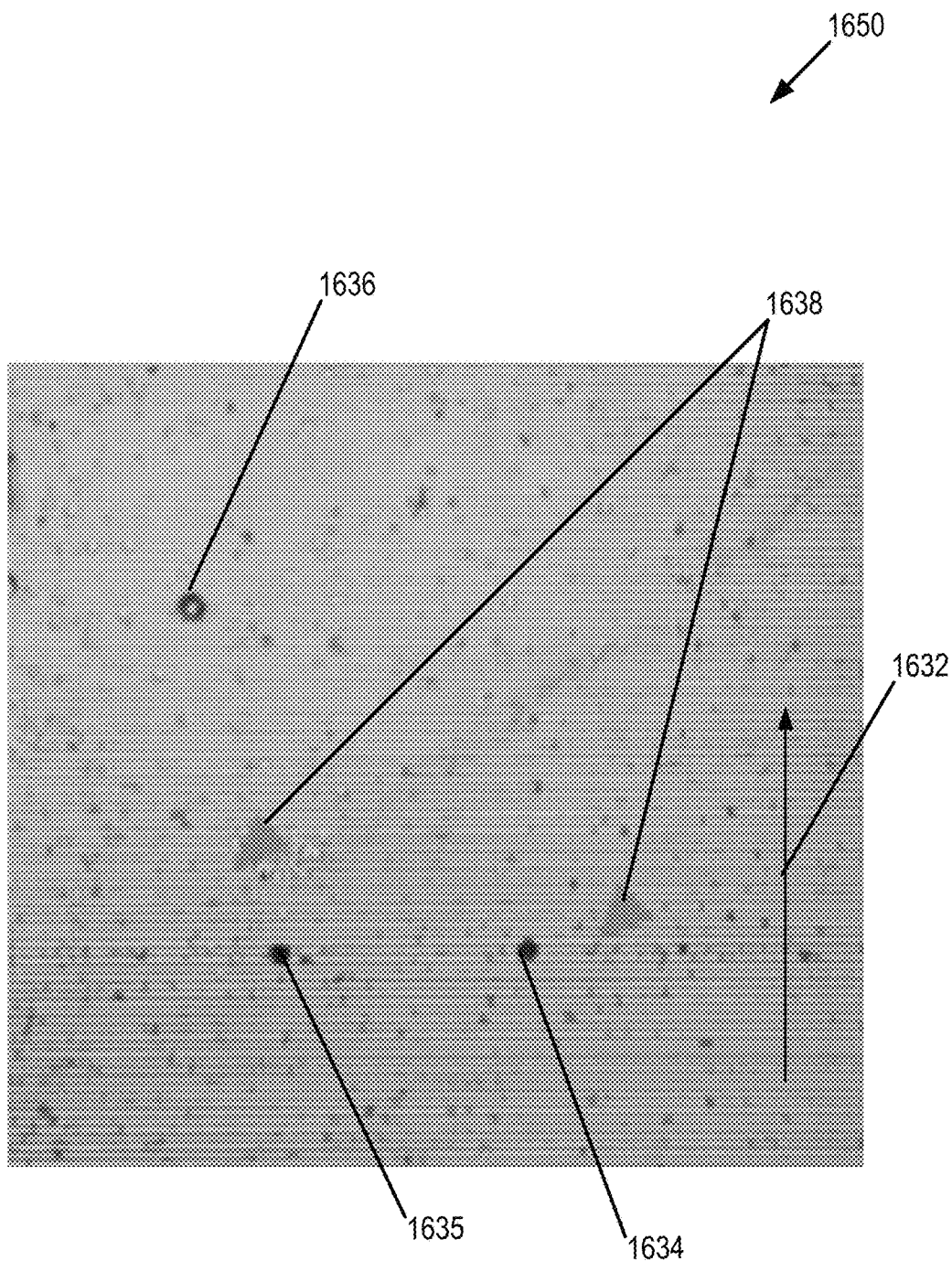
Figure 16H:
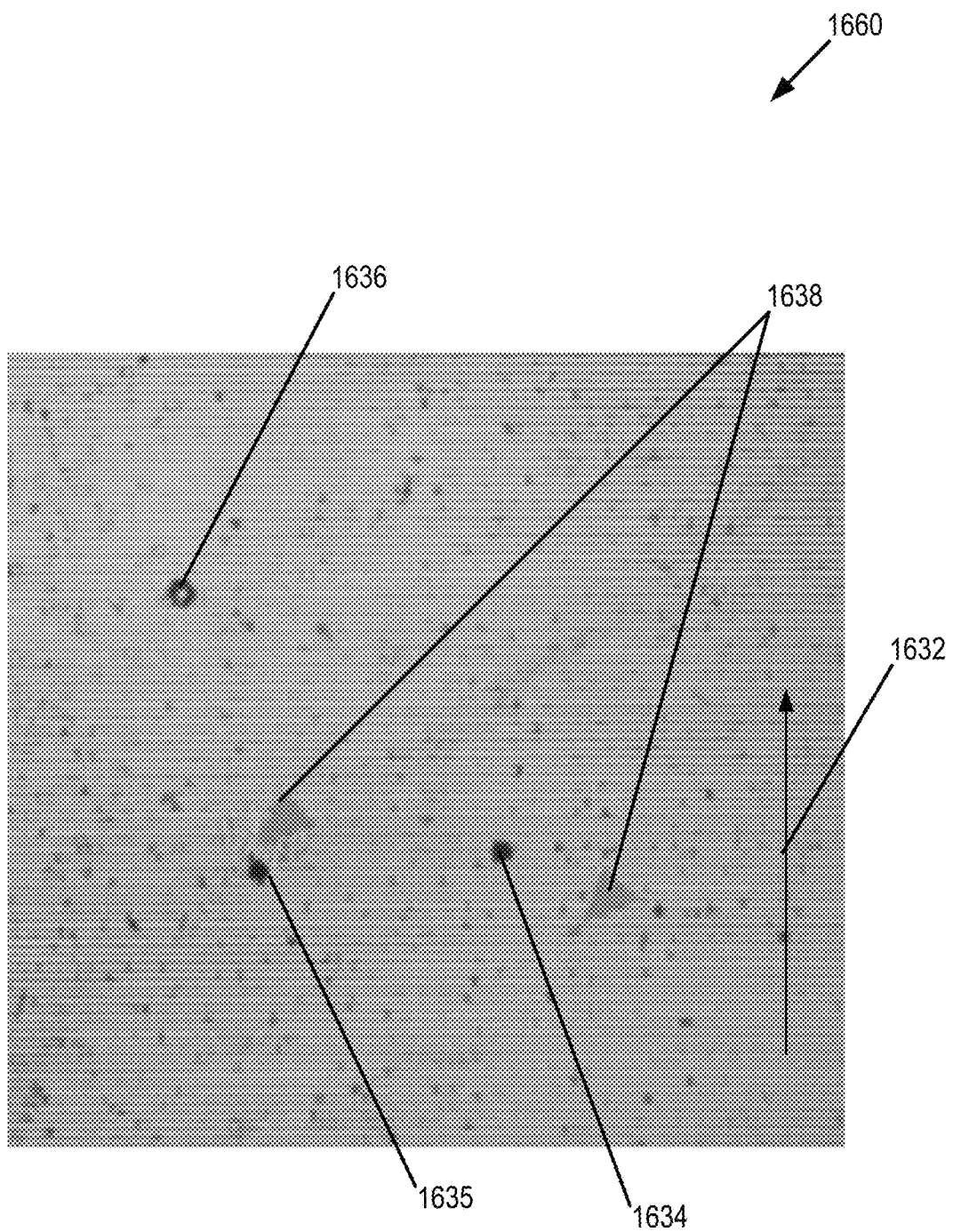
Figure 16I:
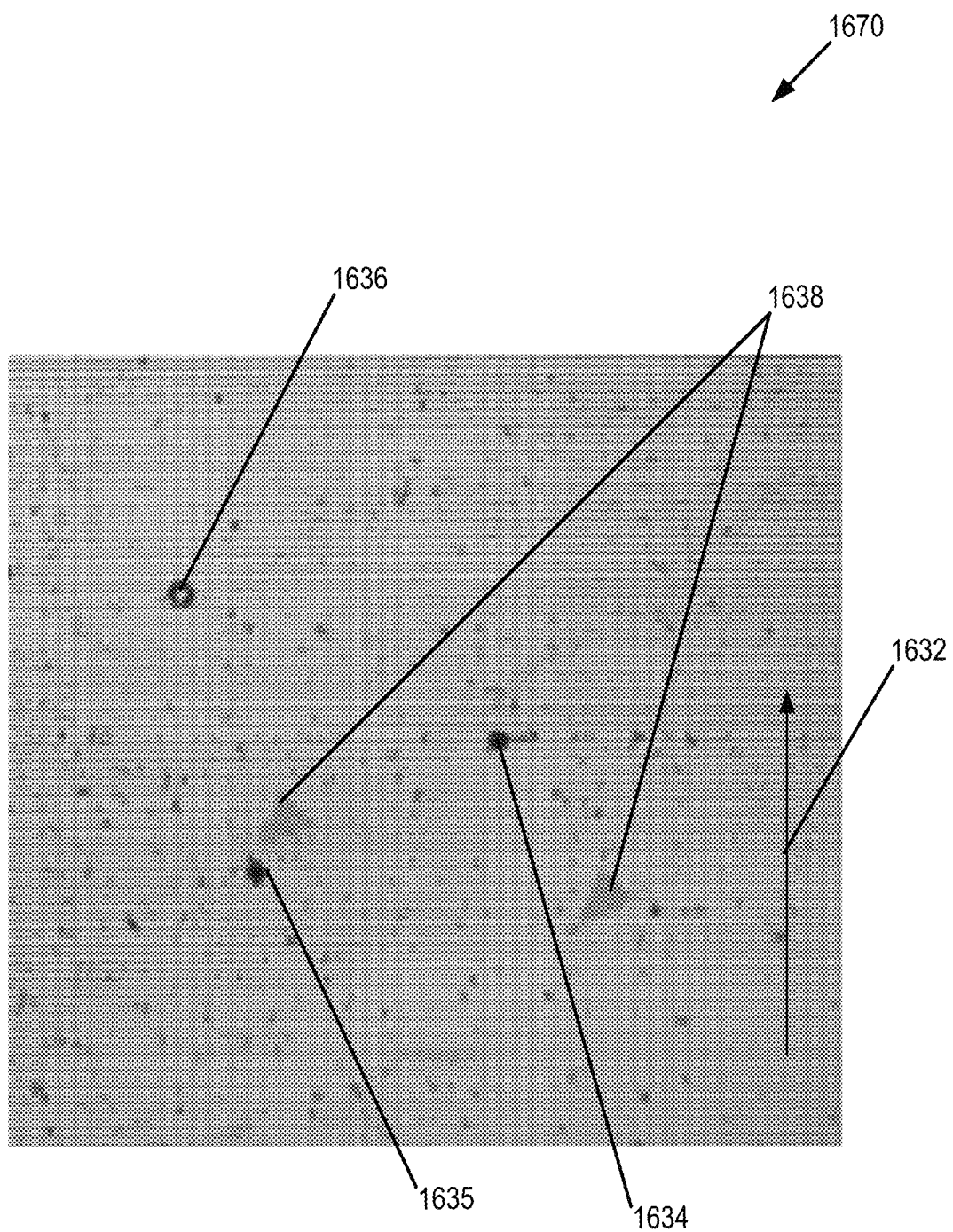
Figure 17A:
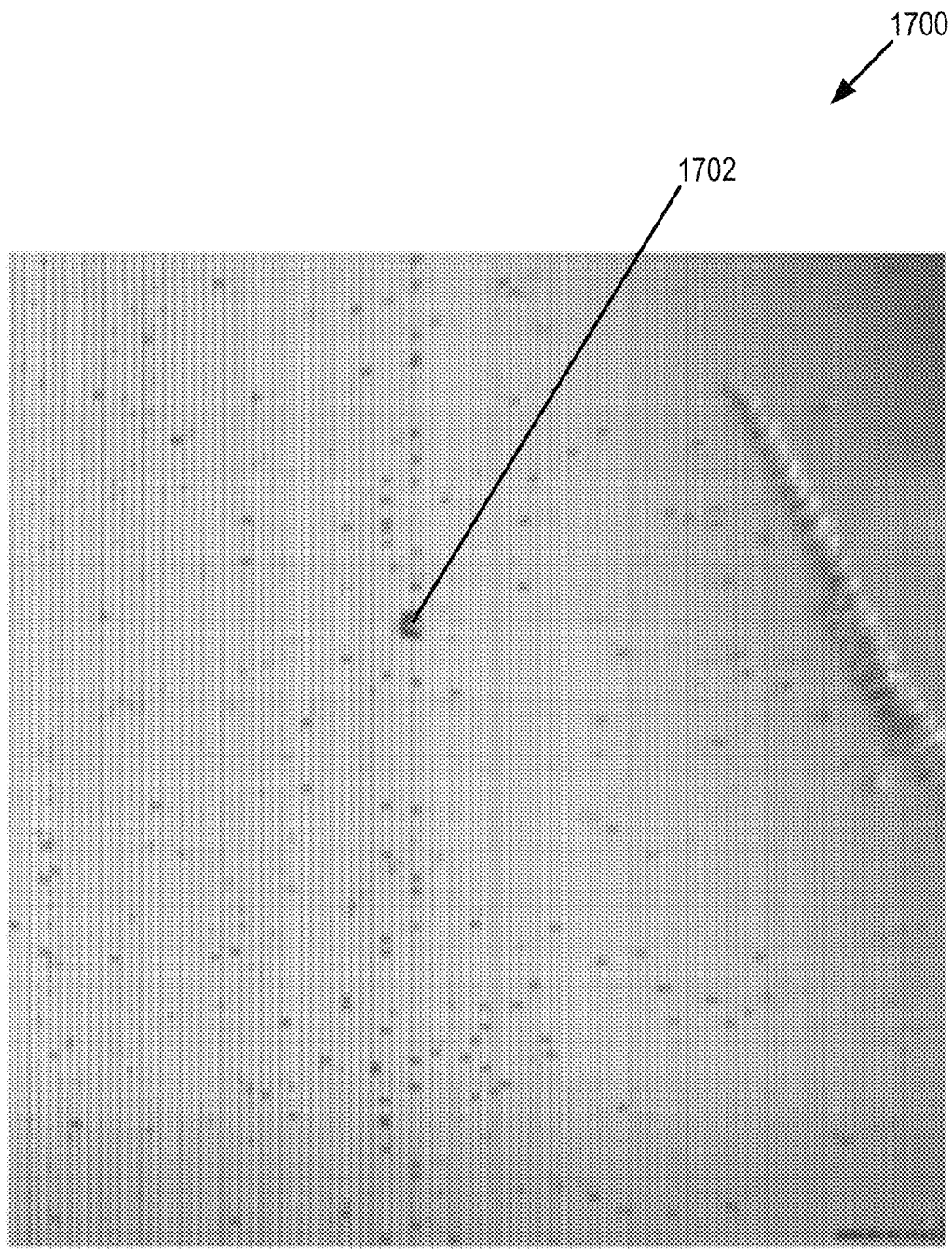
FIGS. 17A-E show images of on-chip magnetic manipulation of a single CTC to move in the shape of a "7".
Figure 17B:
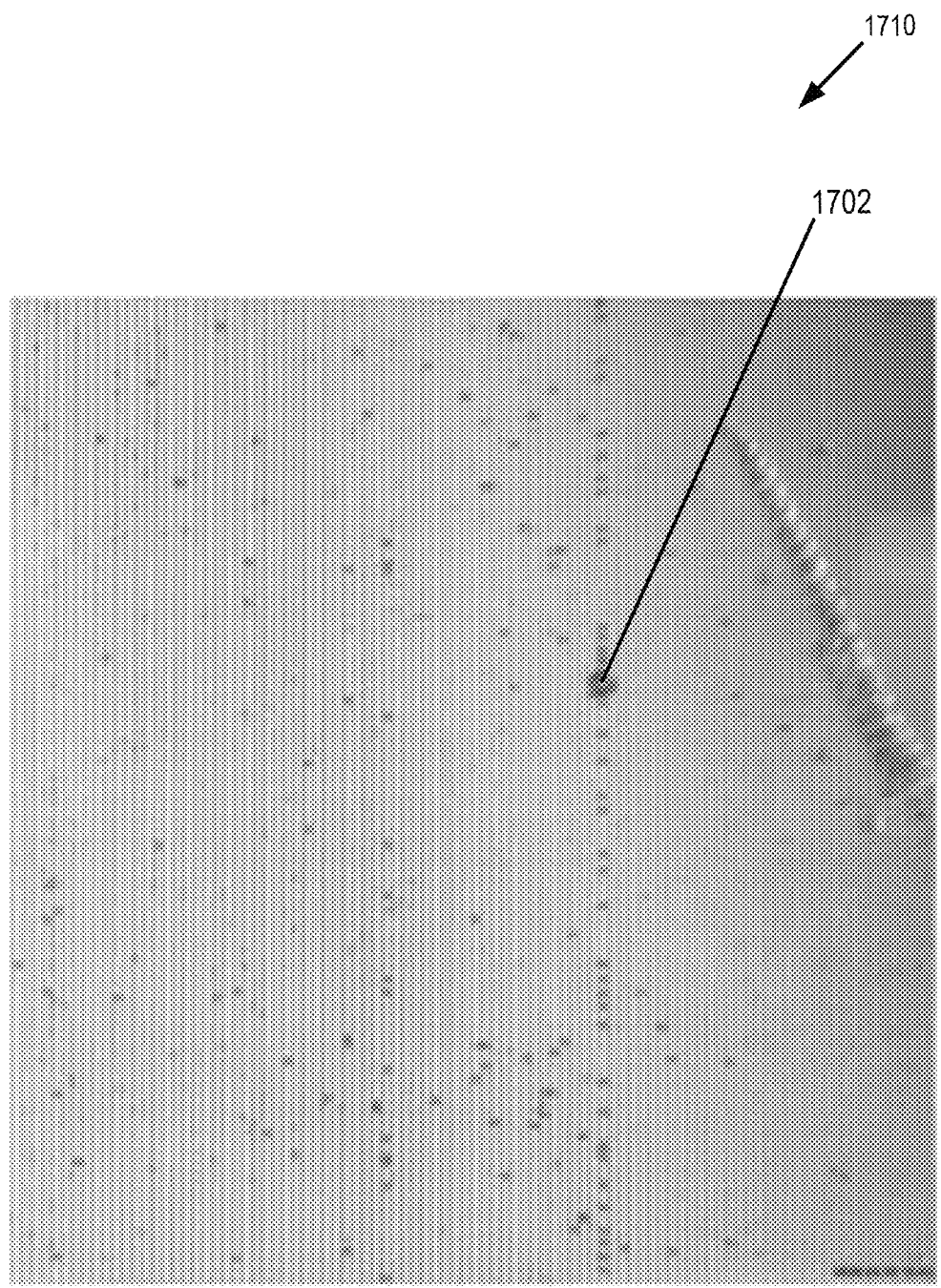
Figure 17C:
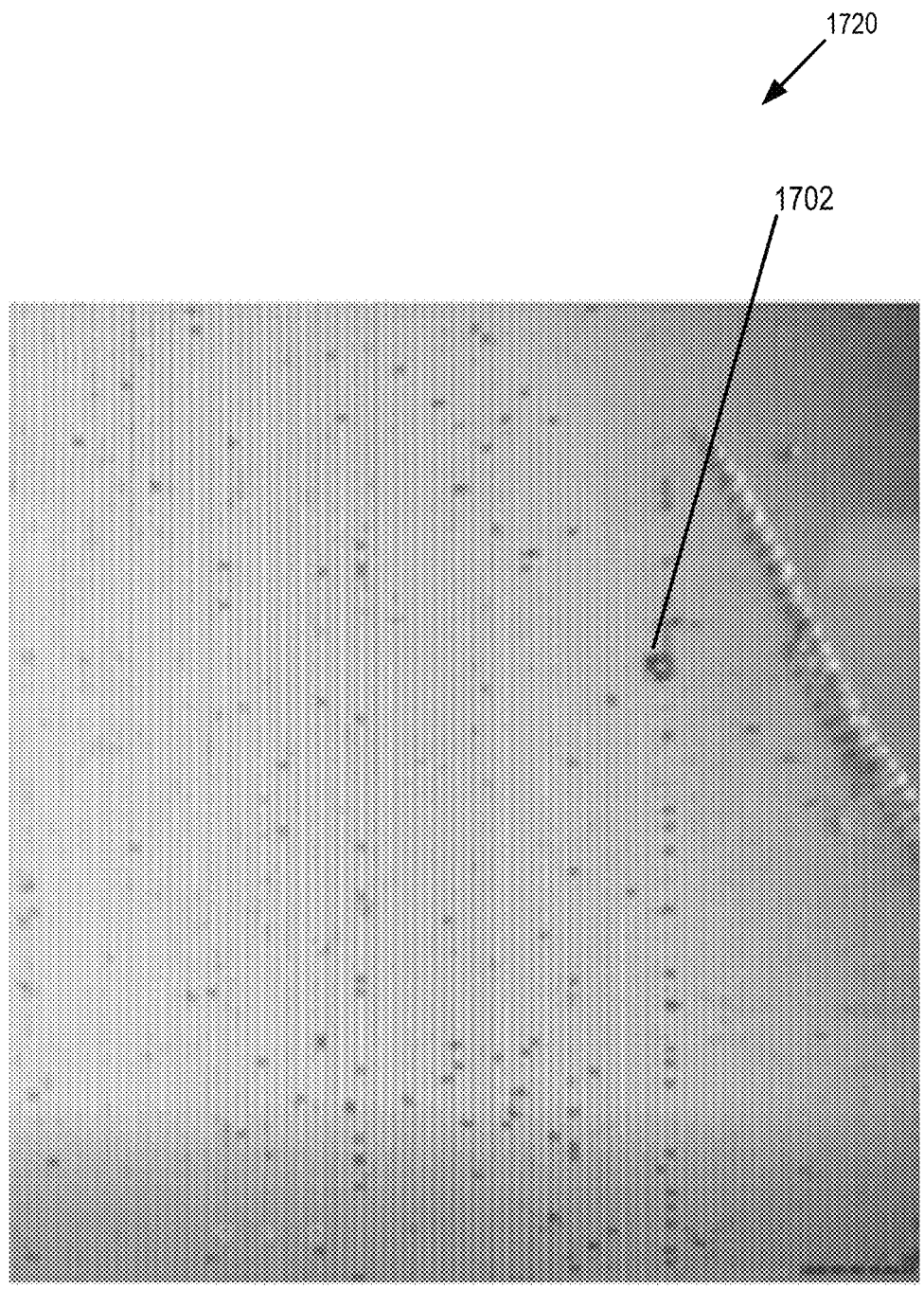
Figure 17D:
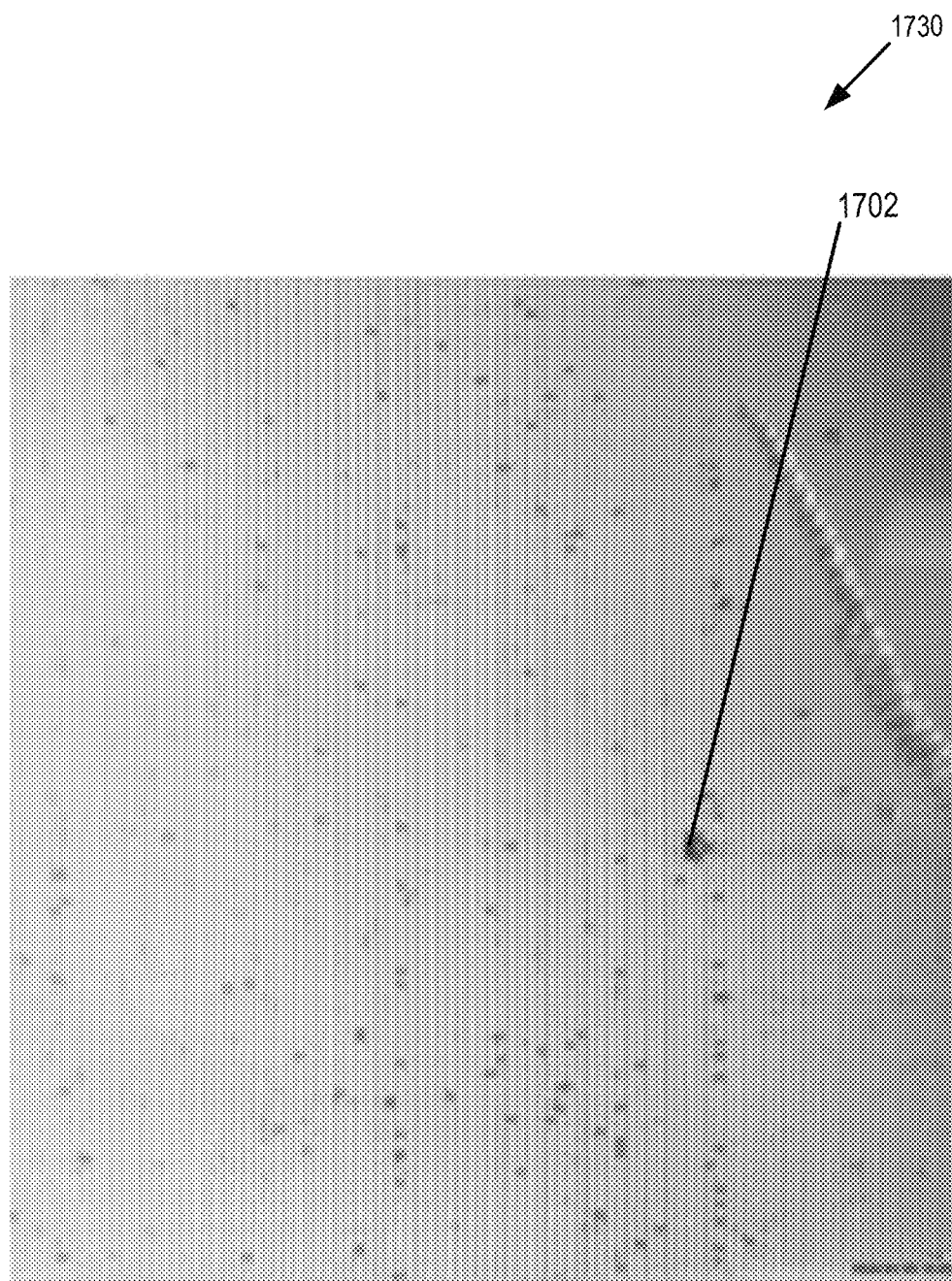
Figure 17E:
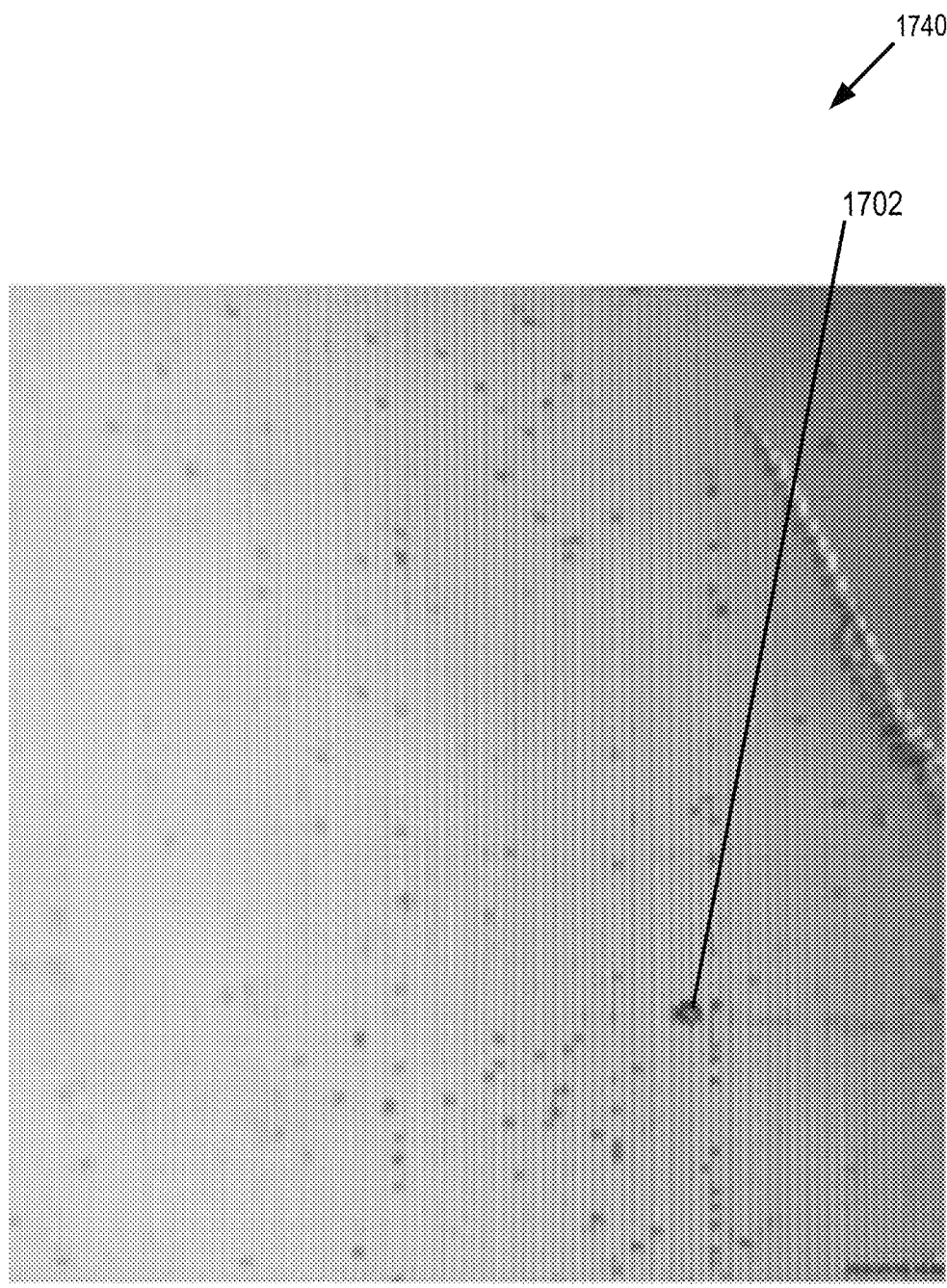
Figure 17F:
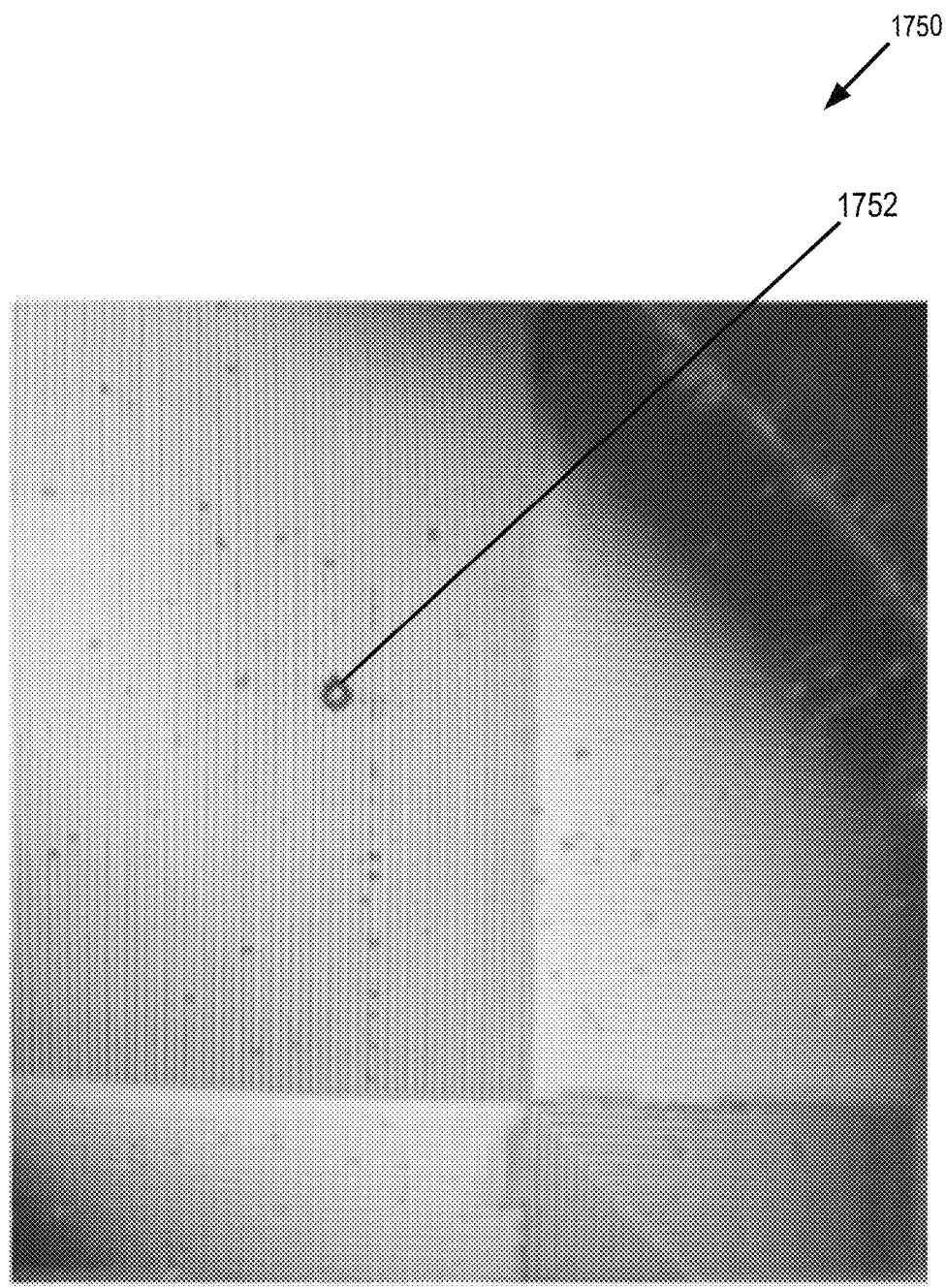
FIGS. 17F-J show images of on-chip magnetic manipulation of a single CTC to move in the shape of a "L".
Figure 17G:
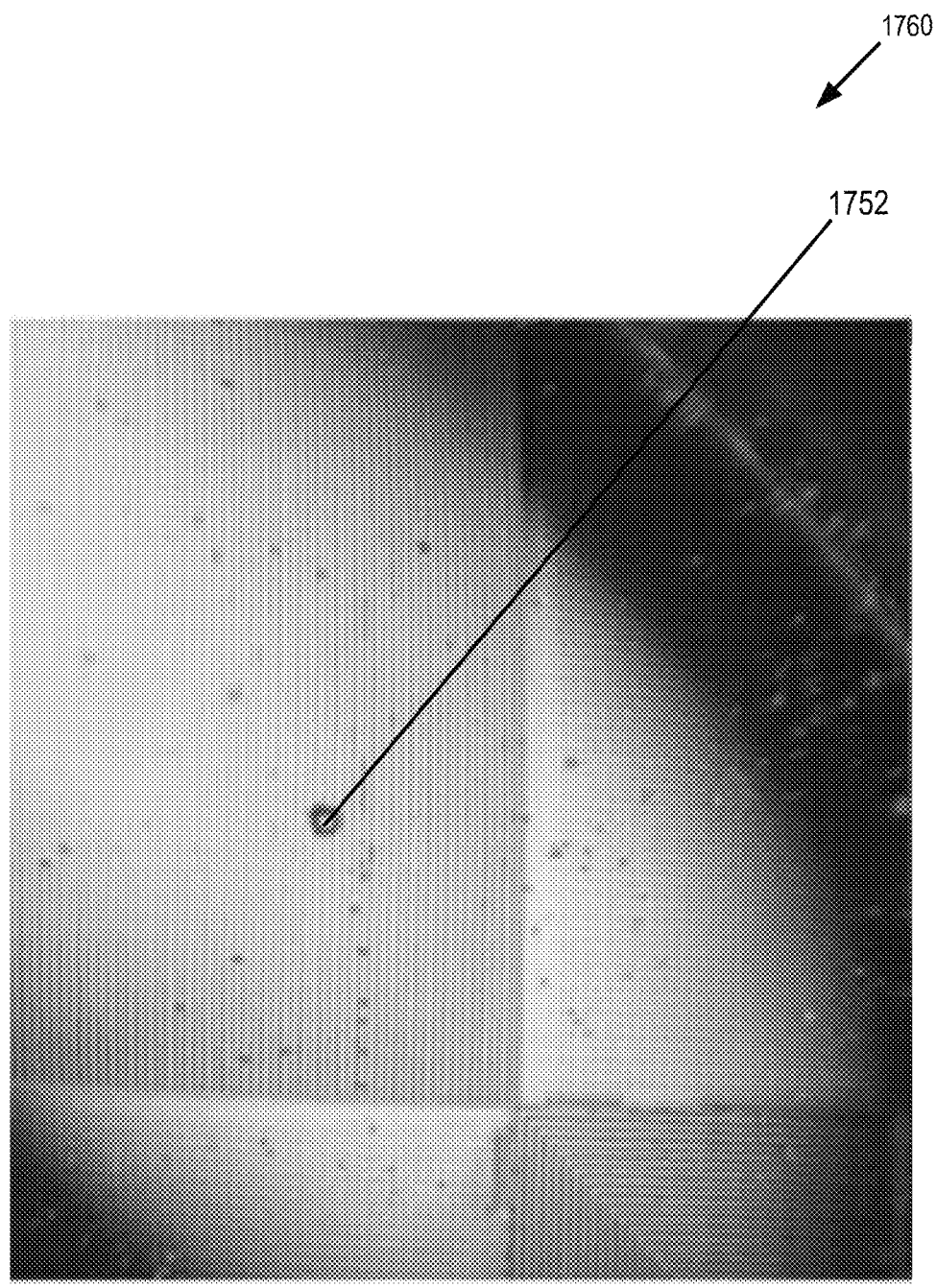
Figure 17H:
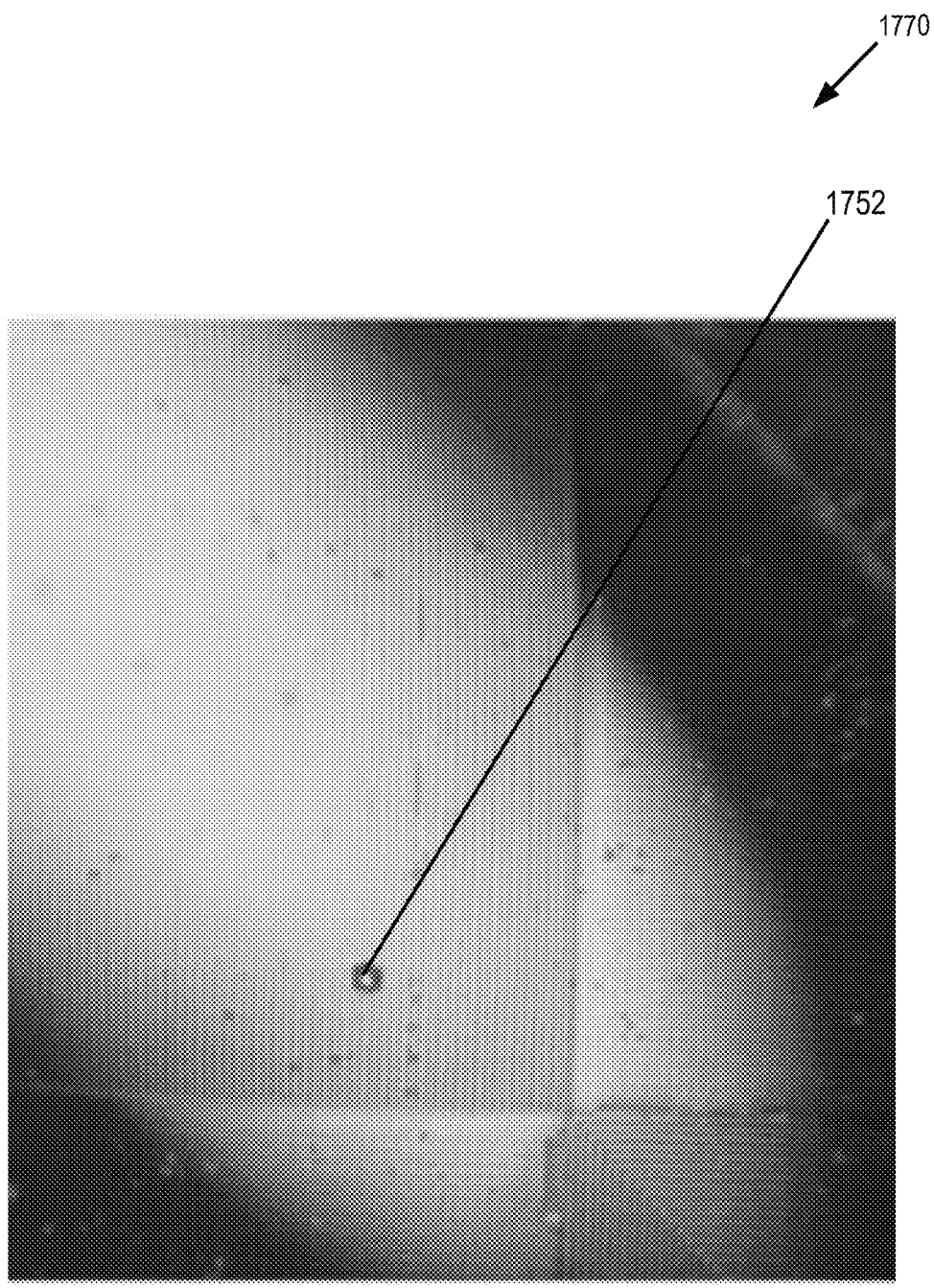
Figure 17I:
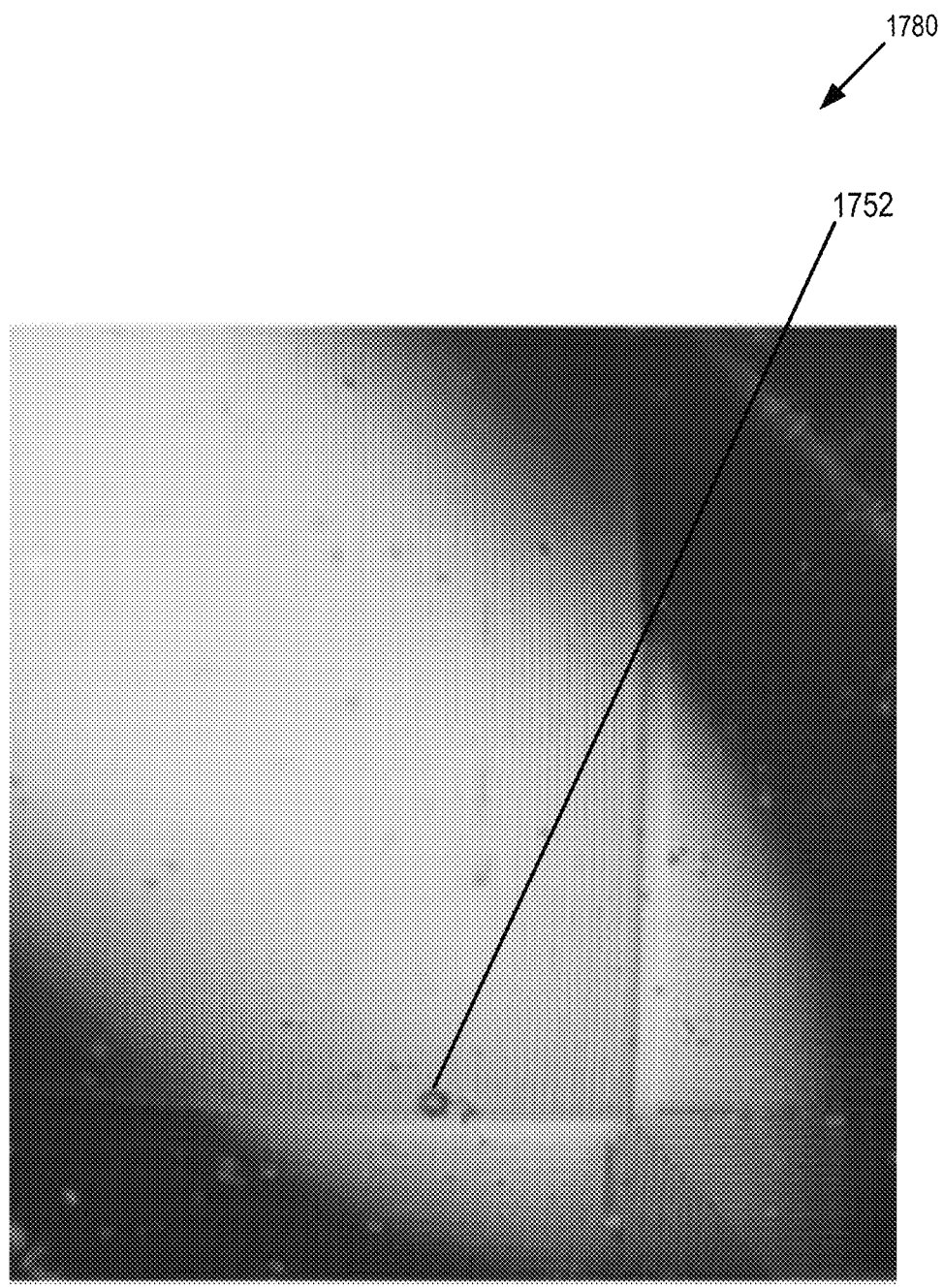
Figure 17J:
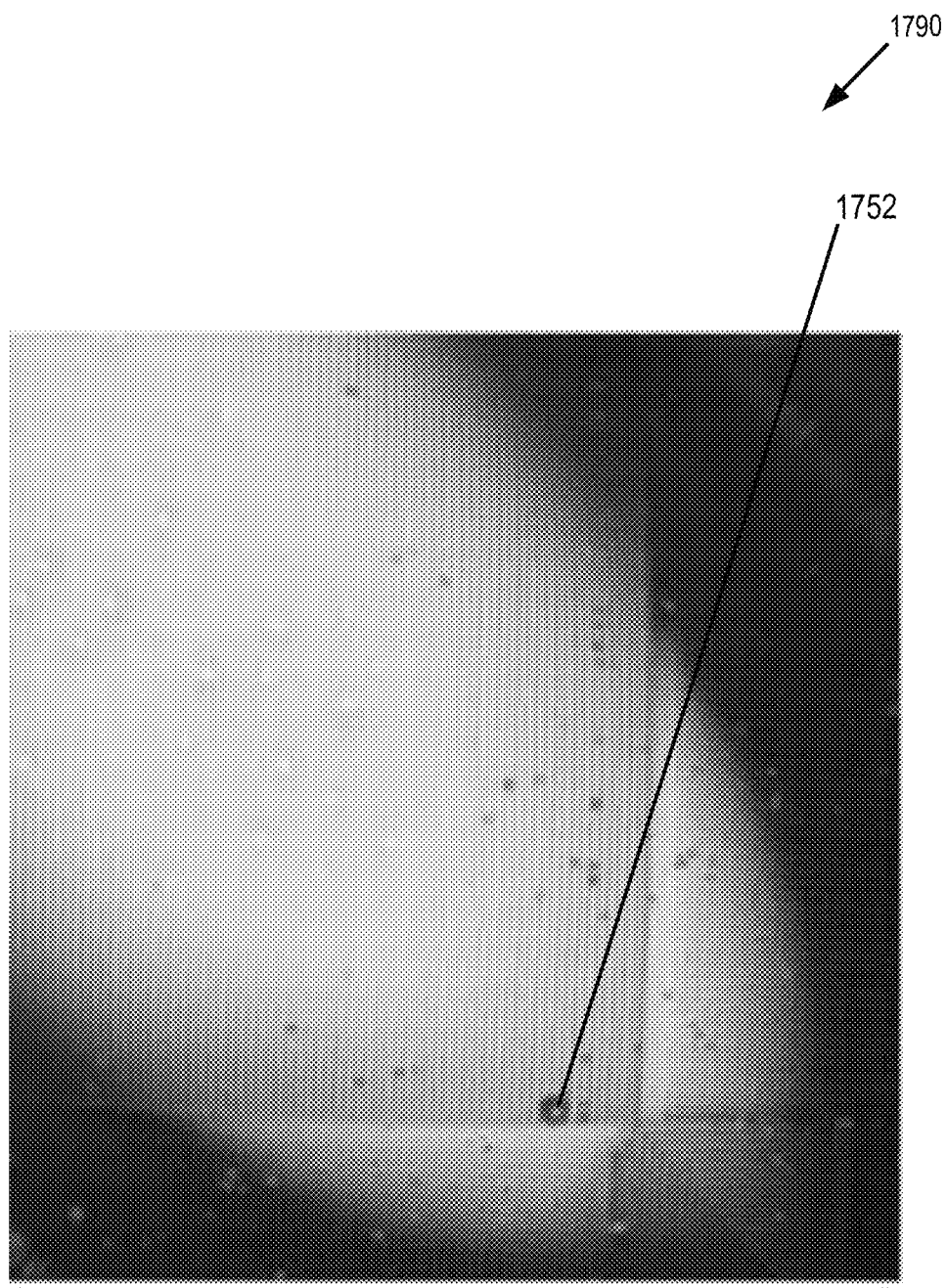

FIG. 16A illustrates a printed circuit board 1600 with the semiconductor chip 1602 which may be assembled on a 40-pin dual In-line package, and may be powered and controlled by a laptop through a USB cable and on-board microcontroller. FIG. 16B illustrates a top view of the semiconductor chip 1602. The semiconductor chip 1602 may comprise a 5 mm×5 mm CMOS chip fabricated in 4-metal technology. A sample well may be formed by a 3-D printed structure attached on semiconductor chip 1602 surface. The sample well may hold 50 μL with up to 500 bead-bound target cells on the chip surface. A zoomed-in view of the chip corner 1604 with example wire patterns 1610, 1612 is illustrated in FIG. 16C. As shown, wire pattern 1610 is different from wire pattern 1612. In this regard, various combinations of wire patterns are contemplated, such as unidirectional wire patterns (e.g., vertical lines, horizontal lines, etc.) and multidirectional patterns (e.g., chevron patterns). Further, the patterns may vary based for different sections of the well. As merely one example, the section(s) of the well proximate to and/or in the outlets may have a first pattern (e.g., a chevron pattern) and section(s) other than proximate to and/or in the outlets may have a second pattern (e.g., horizontal or vertical lines). Further, the wire patterns may be distributed on different levels, such as illustrated in FIGS. 6A-D, with the wire pattern on one level being different in at least one aspect from the wire pattern on a different level (e.g., complementary patterns on the different levels, such as patterns that are rotated a certain number of degrees, such as 90°, from one another). FIG. 16D illustrates an image 1620 with bead-labeled target cells (shown by arrows 1624) and free beads (shown by arrows 1622).

As discussed above, the platform may comprise a printed circuit board that includes a silicon chip embedded in a 3D-printed sample well and a microcontroller that communicates between the chip and computer (see FIGS. 16A-B). For example, the semiconductor chip may comprise a 5 mm×5 mm silicon chip that contains 512 vertical metal wires and 512 horizontal metal wires with each wire controlled by an on-chip MOS switch (see FIG. 16C). Users may program the microcontroller to control which metal wire is to be activated, causing current to flow through the activated wire and thus generating a local magnetic field to attract nearby magnetic-bead-bound cells.

In one or some embodiments, the metal wire patterns contain 512 vertical metal wires in metal-4 layer and 512 horizontal wires in metal-3 layer. Each wire (width: 4 μm, length: 4 mm, wire-to-wire pitch: 8 μm) may be controlled by an on-chip MOS switch. When a metal wire is activated, a current of 55 mA may flow through the metal wire and generate a magnetic field along the wire to attract nearby magnetic objects such as bead bound target cells. The sequence of wire activation may be controlled through a microcontroller and a computer.

The removal of free beads may be performed for reliable detection of bead-bound target cells on the chip. Since free beads and bead-bound cells are relatively different in size (4.5 μm vs. 20 μm), membrane filtration may be used to reduce free beads by a factor of $3\times10^4$ and with target cell loss less than 10% (FIG. 16D). After magnetic cell isolation and free bead removal, the sample may be added to the sample well. After the cells settle on the chip surface, the system may sweep the activation of wires in the semiconductor chip and observe the particles' movement in response to the generated magnetic field (FIG. 16E-I).

As discussed above, free beads may first be removed before the cell identification step. For example, $1\times10^7$ EpCAM-conjugated beads (CELLection® biotin binder, Invitrogen, Carlsbad, Calif.) may be mixed with ~200 Caco-2 cells. After membrane filtering (13 mm, 7-μm pores, Precision Membrane, Provo, Utah), free beads may be reduced to several hundreds. After magnetic cell isolation and free beads removal, bead-bound CTCs may be more easily identified on semiconductor chip.

FIGS. 16 E-I show images 1630, 1640, 1650, 1660, 1670 of the movement of 3 CTCs and PBMCs responsive to the metal wires being activated in sequence. In particular, FIGS. 16E-I show the movement of 3 CTCs 1634, 1635, 1636 and PBMCs (blue arrowhead 1638) when the metal wires were activated in sequence (arrow 1632). CTC 1 (1634) moved with the wire activation (FIGS. 16 E-I); CTC 2 (1635) moved (FIGS. 16 G-H) when its local wires are activated until its path was blocked by a PBMC cluster; CTC 3 (1636) did not move at all since its local metal wires have not been activated; PBMCs (at arrows 1638) did not move as they are non-magnetic. Thus, bead bound CTCs may be precisely manipulated on the semiconductor chip and may easily be distinguished from contaminants such as PBMCs. For purposes of illustration, some PBMCs were added into the sample well. Alternatively, no PBMCs may remain after the magnetic cell isolation step.

Multiple CTC samples were tested and recorded for the movement of more than 150 CTCs. 100% of the isolated CTCs may be easily distinguished from PBMCs by their on-chip movement. In particular, the platform may generate spatially patterned microscale magnetic fields to manipulate single cells in order to move the bead-bound target cells. Single-cell magnetic manipulation may be performed very effectively on microelectronic chips, such as illustrated in FIGS. 16A-C, which may contain an array of metal wires or coils. By programming the currents flowing through each metal wire, the semiconductor chip may generate a spatially patterned microscopic magnetic field on the chip surface, in turn transporting individual bead-bound target cells to desired locations.

Various speeds of moving the bead-bound target cells are contemplated. The speeds of the bead-bound target cells may vary by varying the amount of current injected into the wire and the rate of wire activation sweeping. In one or some embodiments, the maximum amount of current that may flow through a metal wire without causing damage to the semiconductor chip is 55 mA. By controlling the order in which wires are activated, the semiconductor chip may generate spatially patterned microscopic magnetic fields on the semiconductor chip surface which transport individual bead-bound cells to the desired locations (see FIGS. 17A-J). Thus, in one some embodiments, it is contemplated that when the current is swept through adjacent wires every predetermined number of seconds (e.g., every 2 seconds), most bead-bound CTCs may easily move along and stay healthy. In one or some embodiments, the pitch of the metal wires is 8 µm. In such a configuration, the speed of CTC manipulation is 4 µm/s. In this regard, it may take a CTC about 1250 seconds (21 minutes) to move from the center to the corner of the 5 mm×5 mm semiconductor chip. Since the bead-bound target cells may be manipulated to the 4 corners in parallel, the average time to sort a single CTC on semiconductor chip is approximately 2.5 minutes, which is several times (e.g., 3 times) faster than other cell routers.

FIGS. 17A-E show images 1700, 1710, 1720, 1730, 1740 of on-chip magnetic manipulation of a single CTC 1702 to move in the shape of a "7". FIGS. 17F-J show images 1750, 1760, 1770, 1780, 1790 of on-chip magnetic manipulation of a single CTC 1752 to move in the shape of a "L".

Figure 18A:
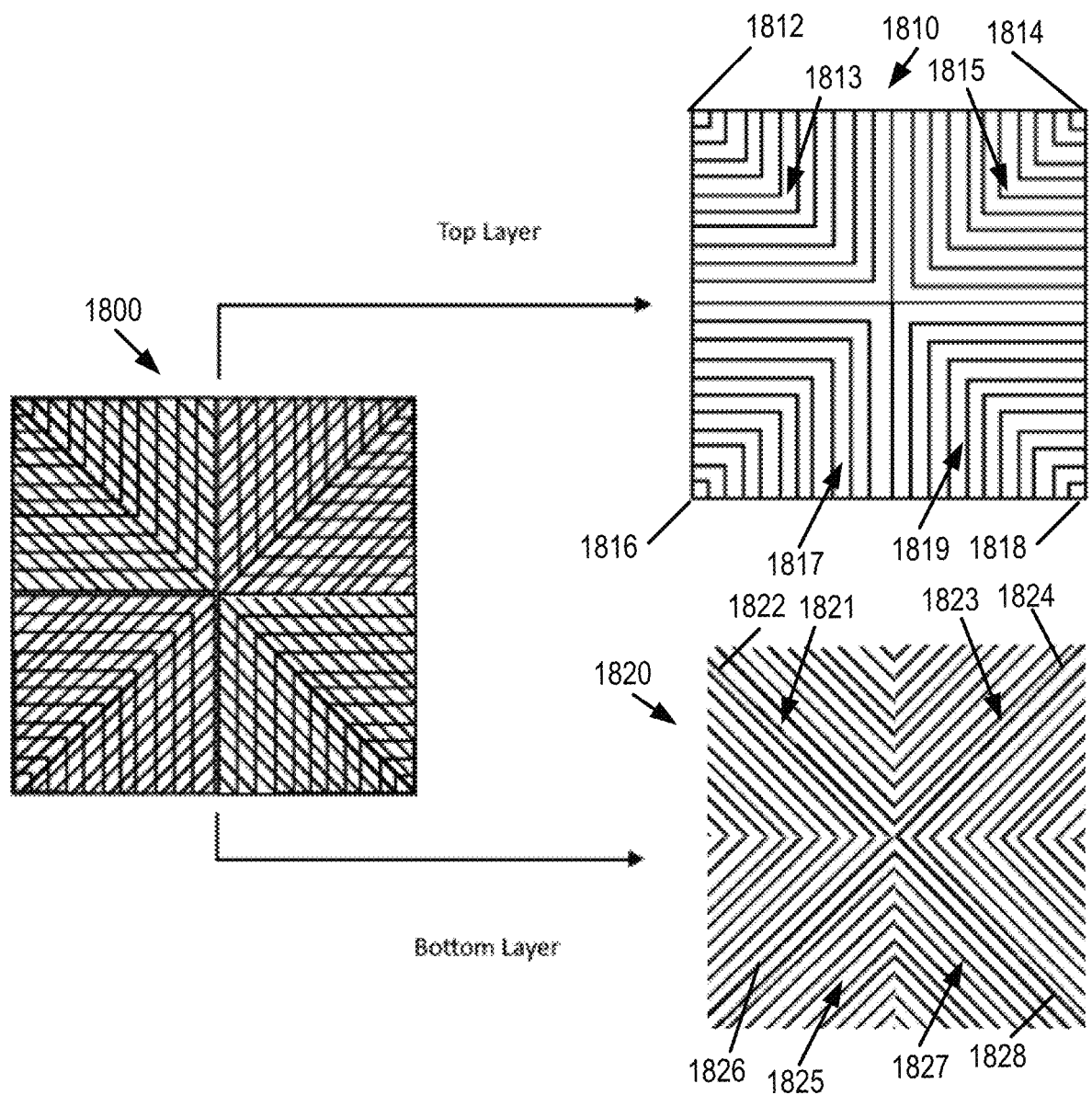
FIG. 18A illustrates the wire layout including a top view of the top layer and bottom layer superimposed, a top view of the top layer and a top view of the bottom layer.

FIG. 18A illustrates the wire layout including a top view of the top layer and bottom layer superimposed 1800, a top view of the top layer 1810 and a top view of the bottom layer 1820. "Bottom" and "top" layers are merely used for illustration. Two wire layers are contemplated. Alternatively, a single wire layer, or more than two wire layers are contemplated. Further, "bottom" and "top" are merely relative, with the positions of the respective wire patterns being reversed.

As shown, top layer 1810 is an example of a chevron pattern, with the pattern separated into 4 quadrants 1813, 1815, 1817, 1819. Further, one, some, or each quadrant at least partly (or entirely) includes a chevron pattern that is designed to frame a respective outlet, such as the chevron pattern in quadrant 1813 framing outlet 1812, the chevron pattern in quadrant 1815 framing outlet 1814, the chevron pattern in quadrant 1817 framing outlet 1816, and the chevron pattern in quadrant 1819 framing outlet 1818. In this regard, the number of distinct chevron patterns may equal the number of outlets (with each chevron pattern being tailored to guide magnetic bead-bound target cells to the respective outlet).

Bottom layer 1820 is an example of a diagonal pattern, with the pattern separated into 4 quadrants 1821, 1823, 1825, 1827. Further, one, some, or each quadrant includes a zero wire diagonal 1822, 1824, 1826, 1828, which is the longest wire in the respective quadrant from the outlet (or corner) for the quadrant to the center of the well.

Bottom layer 1820 are diagonal wires for each of the 4 quadrants, with the diagonal wires connecting down to a third layer in order to be grounded once they reach the central boundary. In this regard, the wire pattern for the top layer and the wire pattern for the bottom layer are segmented by different sections (e.g., quadrants), repeat based on the different sections, and complement one another in the different sections. Further, control of the movement of the bead-bound target cell may be performed by the different layers in combination. As merely one example, one layer (such as the top layer) may be used to move a respective bead-bound target cell to a well outlet whereas another layer (such as the bottom layer) may be use for obstacle avoidance (e.g., so that the respective bead-bound target cell avoids colliding with a contaminant or another cell). The obstacle avoidance performed by the another layer (such as the bottom layer) may be performed in order to do one or both of the following: (i) avoid the obstacle; or (ii) move the respective bead-bound target cell closer to its designated outlet).

Thus, as shown in the top layer 1800, for one, some or each wire in the respective bottom layer 1820 and the respective top layer 1810, there is 1 crossover point when the bottom layer 1820 with the diagonal wires and the top layer 1810 with the chevron wires are superimposed. Likewise, for a vertical wire layer and a horizontal wire layer, there is only 1 crossover point. The crossover point enables the system to discriminate cells if there are multiple target cells along the same wire (e.g., if multiple bead-bound target cells are on the same chevron wire, a wire on the diagonal layer (which crosses the same chevron wire layer) may separate those multiple bead-bound target cells, as discussed further in FIG. 18B).

Further, instead of the outlets 1812, 1814, 1816, 1818 at the respective corners, the outlets may be placed along a side (such as in the middle of a side) of the square boundary. In such an instance, the wire layout may nevertheless frame the outlet positioned on the side of the square boundary.

Figure 18B:
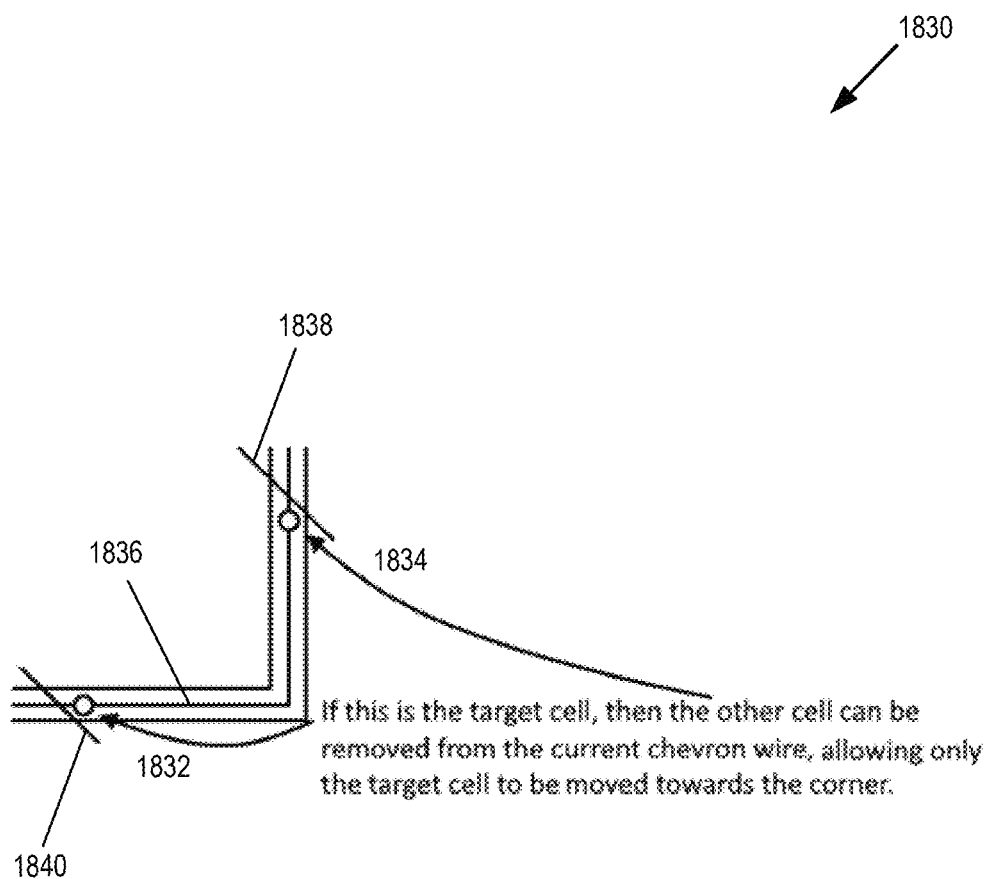
FIG. 18B illustrates controlling multiple cells via the chevron wire pattern.

FIG. 18B is an illustration 1830 for controlling multiple cells 1832, 1834 via the chevron wire pattern. As shown, 1832 is the bead-bound target cell and 1834 is another cell that are both proximate to or on top of a wire 1836 in the chevron wire pattern. In one or some embodiments, with 1832 as the bead-bound target cell, the another cell 1834 may, via controlling current in wire 1836, be removed from wire 1836, allowing only the bead-bound target cell 1832 to be moved toward a corner of the well. For example, 1834 may be removed from wire 1836 via activation of diagonal wire 1838. Alternatively, 1832 may be removed from 1836 via diagonal wire 1840.

Figure 19A:
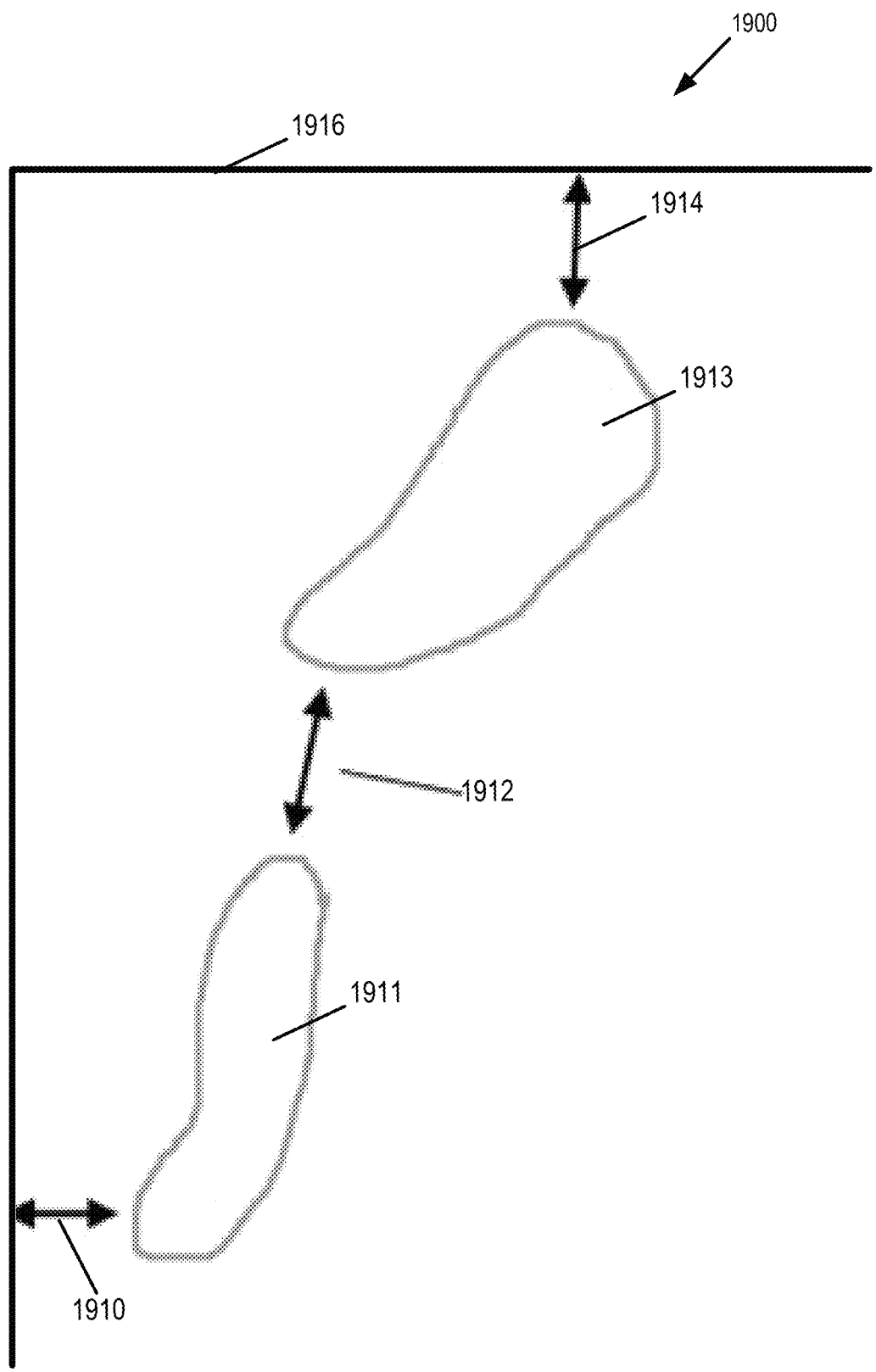
FIG. 19A illustrates a first example of obstacle avoidance when cell sorting in the well.

FIG. 19A illustrates a first example 1900 of obstacle avoidance when cell sorting in the well. Specifically, the system may track one, some or each of the obstacles within the well, such as obstacles 1911, 1913. Further, the tracking may be depending on the obstacle in relation to another object, such as in relation to a non-movable object (e.g., the boundary 1916 of the well) and/or in relation to a movable object (e.g., any one, any combination, or all of: another obstacle (see distance 1912 between obstacle 1911 and obstacle 1913), another cell not targeted, or a bead-bound target cell). For example, distance 1914 may be calculated from obstacle 1913 to boundary 1916 and/or distance 1910 may be calculated from obstacle 1911 to boundary 1916. In this way, each obstacle (with the obstacles associated potential curvature) may be tracked if the respective obstacle is within a certain distance of boundary 1916. Further, if the obstacle is within a predetermined distance to the boundary, the system may identify one, some, or all cell-obstacle pairs where, for the obstacle in a respective cell-obstacle pair, an obstacle point in part of a curve associated with the obstacle is within the predetermined distance to the boundary, thereby allowing for an alternate movement method to be utilized.

In addition, if two obstacle curves are within a certain distance of each other (e.g., distance 1912 between obstacle 1911 and obstacle 1913), the bead-bound target cells may not be able to readily pass between them. In such an instance, the system may modify at least one aspect of the obstacles, such as at least partially combining the obstacles (e.g., combining the obstacle curve associated with obstacle 1911 with the obstacle curve associated with obstacle 1913 in order to generate a single obstacle curve).

In one or some embodiments, the bead-bound target cell may travel a longer distance to navigate around an obstacle if the obstacle is not proximate or near the boundary. To at least partly correct for this, the obstacle may be compared with the wires in one of the layers. As merely one example, the diagonal wire span of a given obstacle may be calculated, and may then be compared to the diagonal wire location of a given bead-bound target cell. The bead-bound target cell may then be moved towards the closer diagonal wire bound of a given obstacle.

Figure 19B:
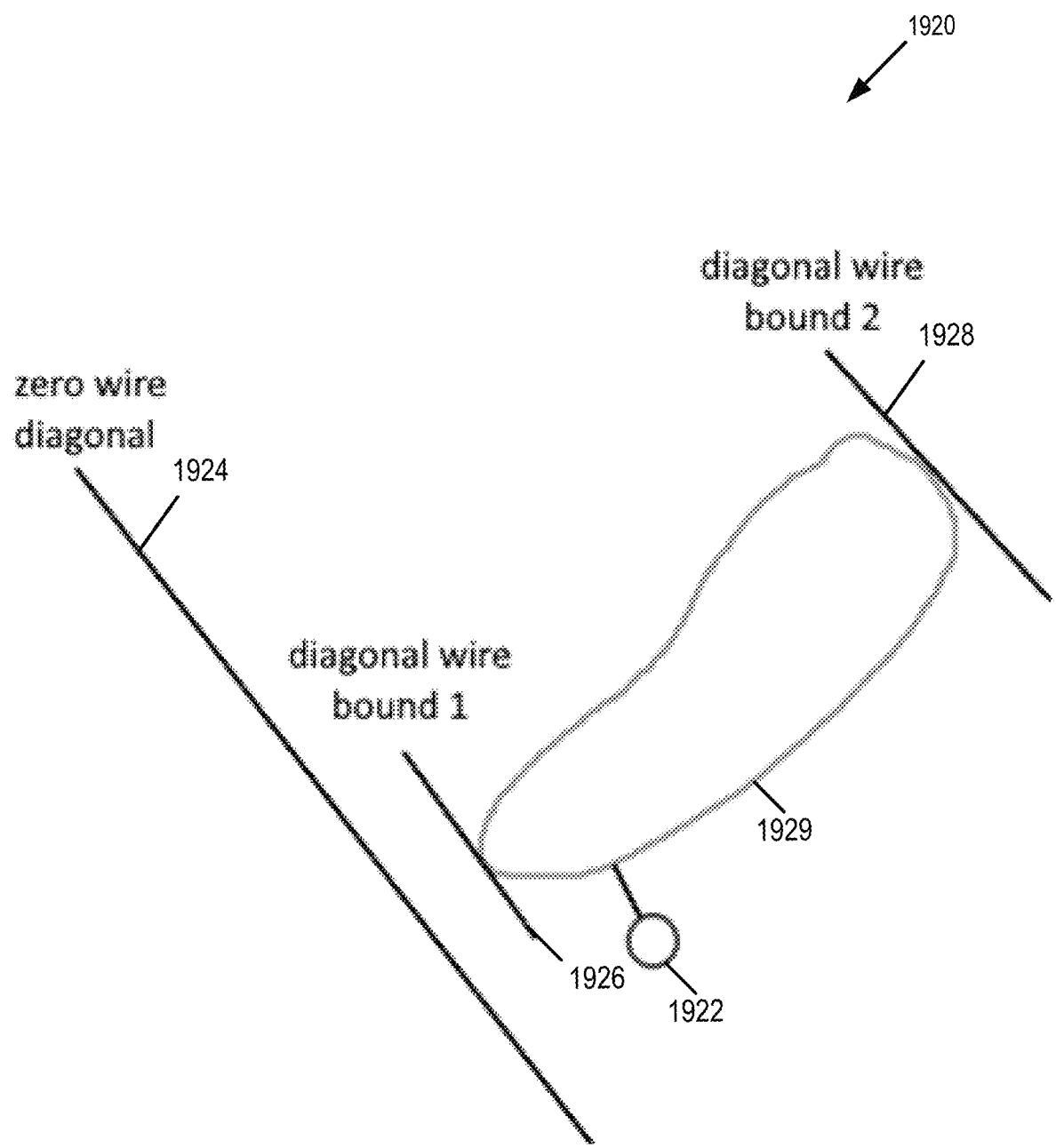
FIG. 19B illustrates a second example of obstacle avoidance when cell sorting in the well.

FIG. 19B illustrates a second example 1920 of obstacle avoidance when cell sorting in the well. In particular, various diagonal wires, which may be part of bottom layer 1820, are illustrated including zero wire diagonal (1924), diagonal wire bound 1 (1926), and diagonal wire bound 2 (1928). In one embodiment, the bead-bound target cell 1922 may be moved away from the zero wire diagonal (1924), causing the bead-bound target cell 1922 to take a longer way around the obstacle 1929.

Alternatively, the currents in one or some of the wires of in bottom layer 1820 may be controlled to reduce the travel distance of the bead-bound target cell 1922. As shown in FIG. 19B, the diagonal associated with the bead-bound target cell 1922 is closer to diagonal wire bound 1 (1926) than to diagonal wire bound 2 (1928); therefore, in one or some embodiments, the system controls the currents in one or some diagonal wires in bottom layer 1820 such that the bead-bound target cell 1922 is moved towards diagonal wire bound 1 (1926) during obstacle avoidance (such as in avoiding obstacle 1929).

Figure 19C:
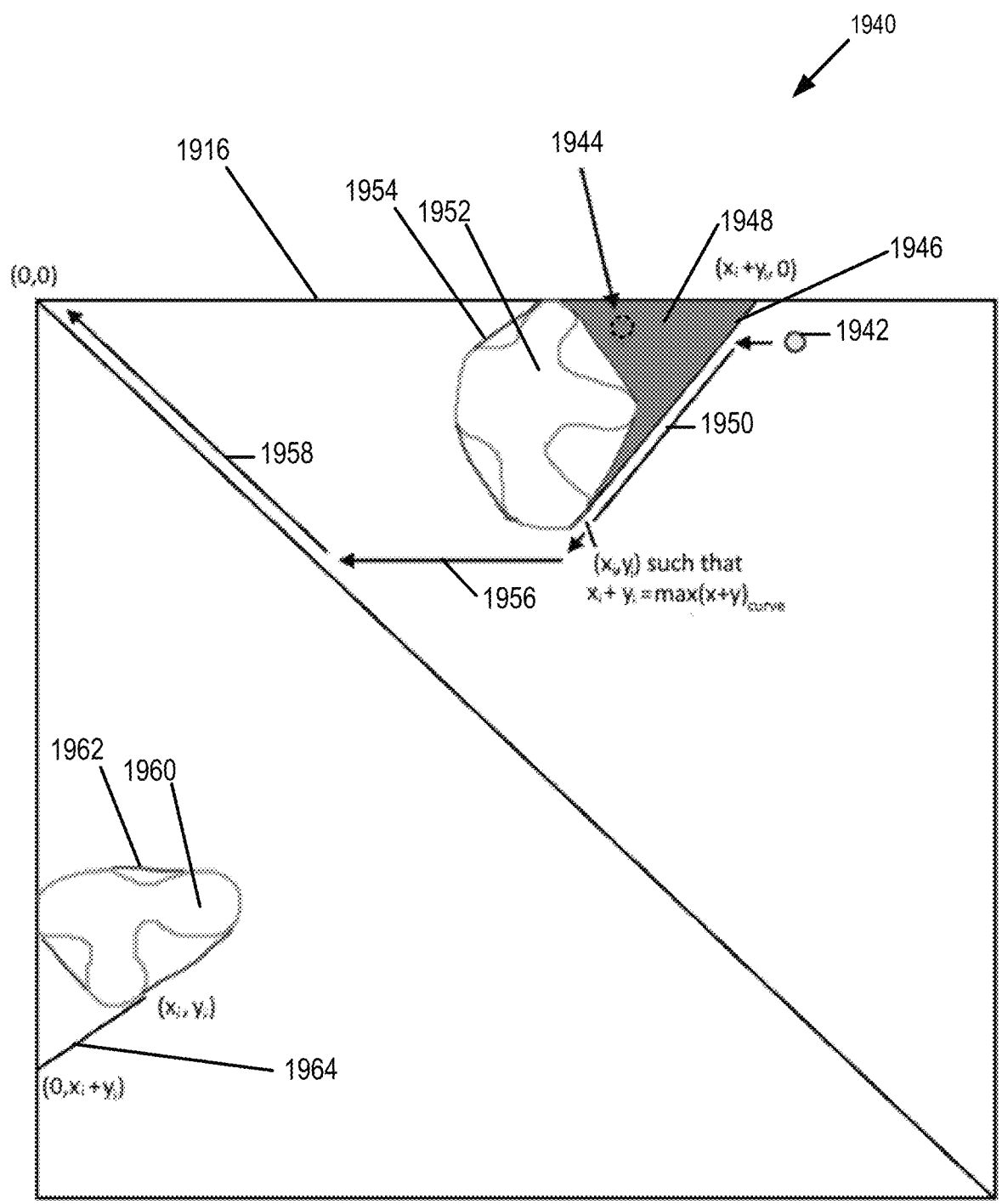
FIG. 19C illustrates a third example of obstacle avoidance when cell sorting in the well.

FIG. 19C illustrates a third example 1940 of obstacle avoidance when cell sorting in the well. Obstacle 1952 has an associated curve 1954, with the associated curve being used for obstacle avoidance. Bead-bound target cell 1942 is further shown in FIG. 19C. In performing obstacle avoidance, the system may identify a region associated with the obstacle and/or the associated curve of the obstacle. The identified region may then be used in order to control the path for sorting the bead-bound target cell 1942. For example, FIG. 19C illustrates region 1948, which is bounded by curve 1954, boundary 1916, and boundary line 1946. Various methodologies are contemplated to determine at least one aspect of the region (such as boundary line 1946) including the following:

Boundary line comprises all points where $x+y=\max(x+y)_{curve}$ $$y<y_i;(x_i,y_i) \text{ such that } x_i+y_i=\max(x+y)_{curve}.$$

These relations are for illustration purposes only and applies to the upper half to the top-left quadrant of the chip. Further, the boundary line may comprise all points where x+y (the coordinates of a given point) are equal to the largest x+y value of all the points in a given obstacle curve, and where the y coordinate of a given point is less than the y coordinate of the point corresponding to the location in a given obstacle curve which has the largest x+y value of all the points in that obstacle curve.

If the bead-bound target cell 1942 were to enter the region 1948 enclosed by the obstacle and the boundary (shown as 1944), the bead-bound target cell 1942 would either get stuck or would have to move backwards to move around the obstacle 1952. As such, the region may be used in order to identify the path of the bead-bound target cell 1942 for cell sorting, such as along vectors 1950, 1956, 1958. The system may determine the regions to avoid before beginning the cell sorting and/or during the cell sorting. In this way, the regions may be proactively avoided.

As discussed above, various wire layouts are contemplated. In one or some embodiments, the bead-bound target cell may only move down via the diagonal wires. As such, the line orthogonal to the diagonal wires and tangent to the obstacle curve may determine the beginning of the region to be avoided, such as illustrated by vector 1950.

Similar logic may apply to other sections of the well, such as other quadrants. For example, FIG. 19C further illustrates obstacle 1960 and associated curve 1962. Boundary line 1964 may comprise a line that includes $(x_i, y_i)$ and $(0, x_i+y_i)$, as shown in FIG. 19C.

Figure 20A:
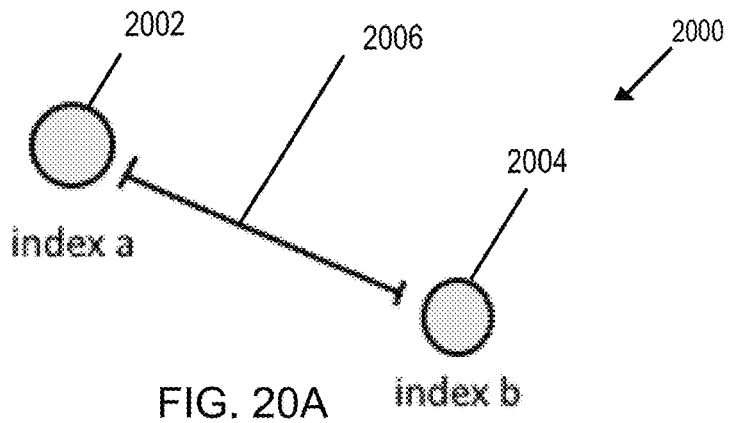
FIGS. 20A-C illustrate a series of depictions in which cells are tracked relative to other cells when cell sorting.
Figure 20B:
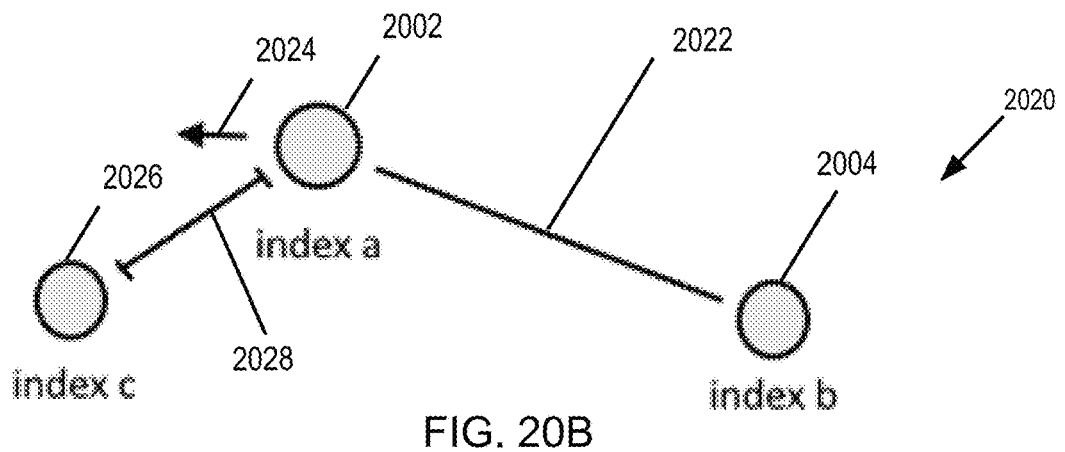
Figure 20C:
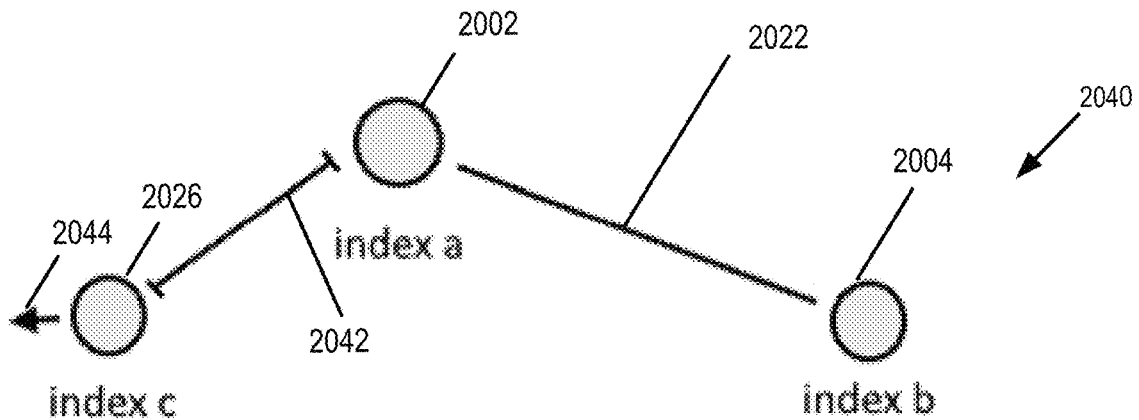

FIGS. 20A-C illustrate a series of depictions 2000, 2020, 2040 in which cells are tracked relative to other cells when cell sorting. One, some, or each cell, such as each bead-bound target cell, may comprise an element in a tracked objects vector. Each cell may thus be identifiable at a given instant by its associated index in that vector. Thus, 2002 represents cell a, with index a representing its associated location in the tracked objects vector, 2004 represents cell b, with index b representing its associated location in the tracked objects vector, and 2026 represents cell c, with index c representing its associated location in the tracked objects vector. As discussed above, one, some, or all cells may be tracked as the respective cell is sorted within the well (such as when the cell is sorted to a respective well outlet). When two cells come within a prespecified distance of each other, an ObstaclePair element may be added to the proximate_pairs_vector. Each ObstaclePair element may comprise (or consist) of the indices of the corresponding cells in the tracked_objects_vector. For example, FIG. 20A illustrates index a and index b with the separation 2006 between index a and index b described as an element of the proximate_pairs_vector: (a, b). Thus, in one or some embodiments, the pairs (a, b), (a, c), etc. are all the elements of a single vector, where each element is pair of indices.

If, while cell a (2002) is being moved away from cell b (2004) for separation 2022, shown as movement 2024, cell a (2002) may come closer to another cell (such as cell c (2026)), then a new proximate pair element may be added to the proximate_pairs_vector: (a, b). As merely one example, (a, c) may describe the separation 2028 between index a and index c, whereby (a, c) may comprise the last element in the proximate_pairs_vector (a, b) being prioritized for resolution. This is illustrated in FIG. 20B.

One or both of cell a (2002) or cell c (2026) may be moved to resolve the proximity between cell a (2002) or cell c (2026). For example, once pair (cell a, cell c) is resolved, such as by moving cell c (2026) sufficiently far away from cell a (2002) (shown by arrow 2044 with new separation 2042), proximate_pairs_vector: (a, b) may be resolved. This pattern of subsequent resolution may be used to resolve an arbitrary number of cell pairs. Further, in one or some embodiments, entries from the proximate_pairs_vector may be deleted once the corresponding objects are sufficiently far apart.

Figure 20D:
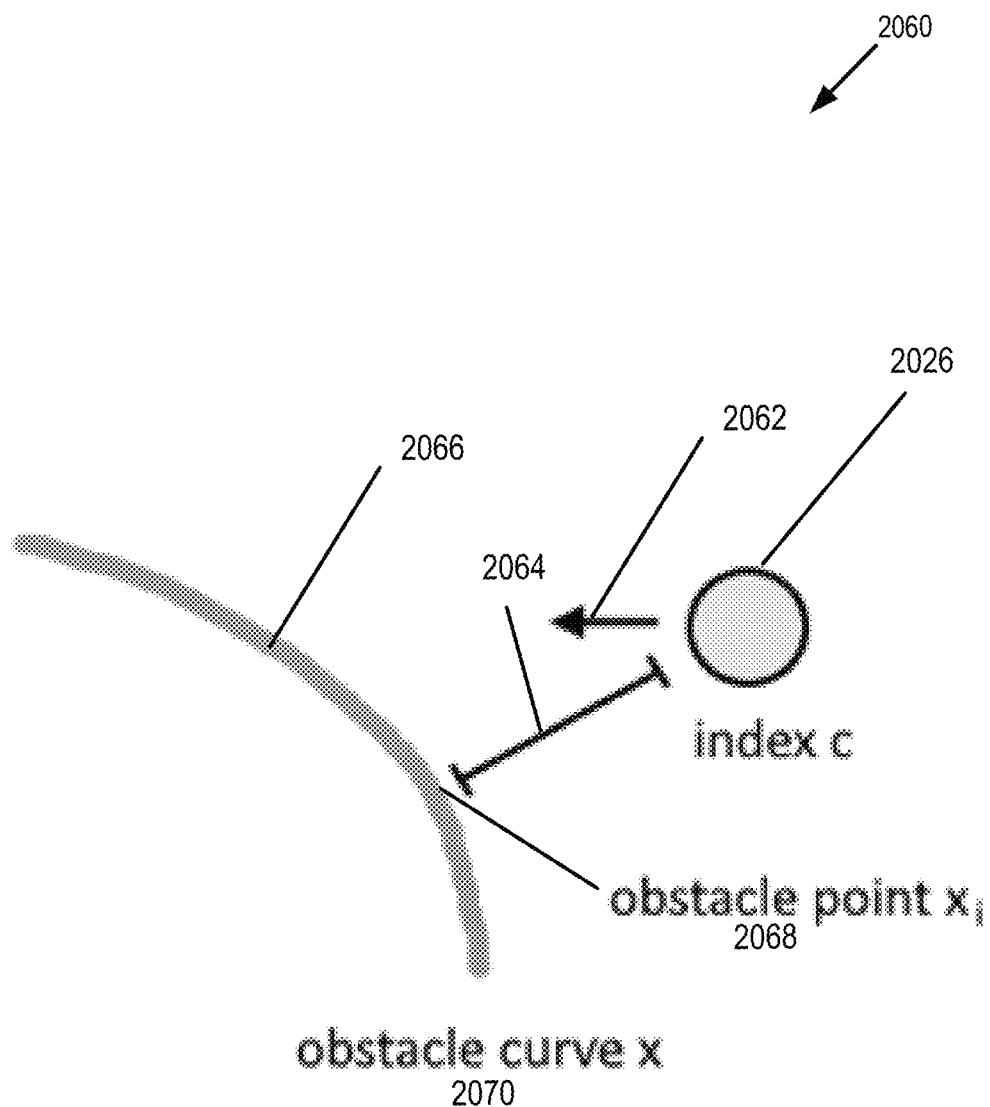
FIG. 20D illustrates a fourth example of obstacle avoidance when cell sorting in the well.

FIG. 20D illustrates a fourth example 2060 of obstacle avoidance when cell sorting in the well. As shown, cell c (2026) described by index c and may move in direction 2062, is separated by 2064 (the separation may be described as a vector $(c, x, x_1)$) from obstacle point $x_i$ (2068) on obstacle curve x (2070). In one or some embodiments, each obstacle curve may comprise an element in obstacle_curves_vector, and may be itself a vector comprising a plurality of obstacle points, such as obstacle point $x_i$ (2068).

The system may dynamically account for the changes in distance between a cell and an obstacle. For example, if a cell comes near an obstacle curve, such as within a predetermined distance of the outline of an identified obstacle, then the proximate_pairs_vector may be updated, such as by adding a triad to the proximate_pairs_vector. Thus, the updated proximate_pairs_vector may note the index of the relevant cell, the index of the obstacle curve, and the index of the point in the curve which is closest to the cell. The proximity may be resolved in a similar manner as with the cell-to-cell pairs, except here, only one of the elements in the pair (triad) can move. Further, it may be assumed that these pairs (a, b), (a, c) have not already been resolved.

The following example embodiments of the invention are also disclosed:

Embodiment 1. An apparatus configured to determining whether a magnetic bead-labeled target cell is present in a fluid, the apparatus comprising:
  a well configured to house the fluid containing particles and including at least one outlet;
  at least one magnetic field generator configured to generate a magnetic field to at least a part of the well;
  one or more sensors configured to generate sensor data; and
  at least one processor in communication with the magnetic field generator and the one or more sensors, the processor configured to:
    control the magnetic field generator to generate the magnetic field to the at least a part of the well;
    identify, based on the sensor data responsive to the magnetic field, the magnetic bead-labeled target cell and an associated location within the well; and
    control the magnetic field generator, based on the associated location within the well of the magnetic bead-labeled target cell and the at least one outlet, in order to move the magnetic bead-labeled target cell toward the at least one outlet, thereby sorting the magnetic bead-labeled target cell, in order to remove the magnetic bead-labeled target cell from the well.

Embodiment 2. The apparatus of embodiment 1:
  wherein the processor is further configured to identify another object in the well and an associated location; and
  wherein the processor is configured to control the magnetic field generator in order to sort the magnetic bead-labeled target cell based on both the associated location of the magnetic bead-labeled target cell and the associated location of the another object.

Embodiment 3. The apparatus of embodiments 1 or 2:
  wherein the another object in the well comprises a contaminant that does not move responsive to an applied magnetic field; and
  wherein the processor is configured to control the magnetic field generator in order to sort the magnetic bead-labeled target cell by controlling movement of the magnetic bead-labeled target cell to avoid the contaminant as the magnetic bead-labeled target cell is sorted to the at least one outlet.

Embodiment 4. The apparatus of embodiments 1-3:
  wherein the another object in the well comprises another magnetic bead-labeled target cell; and
  wherein the processor is configured to control the magnetic field generator in order to sort the magnetic bead-labeled target cell by controlling movement of the magnetic bead-labeled target cell and the another magnetic bead-labeled target cell in order to perform one or both of at least partly simultaneous movement of the magnetic bead-labeled target cell and the another magnetic bead-labeled target cell or separation of the magnetic bead-labeled target cell and the another magnetic bead-labeled target cell by at least a minimum distance.

Embodiment 5. The apparatus of embodiments 1-4:
  wherein the processor is configured to identify the magnetic bead-labeled target cell within the well based on both a determined size of the magnetic bead-labeled target cell and determined movement of the magnetic bead-labeled target cell responsive to an applied magnetic field.

Embodiment 6. The apparatus of embodiments 1-5:
  wherein the processor is further configured to analyze imaging to identify one or more potential magnetic bead-labeled target cells within the well and associated locations for the one or more potential magnetic bead-labeled target cells; and
  wherein the processor is configured to determine, from the one or more potential magnetic bead-labeled target cells, whether any of the one or more potential magnetic bead-labeled target cells are the magnetic bead-labeled target cell by:
    controlling the magnetic field generator such that a magnetic field is generated at the associated locations for the one or more potential magnetic bead-labeled target cells;
    determining whether there is movement within the well greater than a predetermined amount for the one or more potential magnetic bead-labeled target cells responsive to generating the magnetic field at the associated locations for the one or more potential magnetic bead-labeled target cells; and
    responsive to determining that the movement for a respective potential magnetic bead-labeled target cell within the well is greater than the predetermined amount:
      identifying the respective potential magnetic bead-labeled target cell as the magnetic bead-labeled target cell; and
      setting the associated location for the magnetic bead-labeled target cell as the location of the respective potential magnetic bead-labeled target cell after generating the magnetic field at the associated location of the respective potential magnetic bead-labeled target cell.

Embodiment 7. The apparatus of embodiments 1-6:
  wherein the processor is configured to analyze imaging to identify one or more potential magnetic bead-labeled target cells within the well and associated locations for the one or more potential magnetic bead-labeled target cells by:
    obtaining at least one image of the well;
    identifying one or more particles within the at least one image;
    determining which of the one or more particles is greater than or equal to a predetermined size; and identifying the one or more particles that are greater than or equal to the predetermined size as the one or more potential magnetic bead-labeled target cells.

Embodiment 8. The apparatus of embodiments 1-7:
  wherein the processor is configured to compare at least one image of the well without the fluid containing the particles and at least one image of the well with the fluid containing the particles in order to identify the one or more particles within the at least one image of the well with the fluid.

Embodiment 9. The apparatus of embodiments 1-8:
  wherein the one or more potential magnetic bead-labeled target cells include the magnetic bead-labeled target cell or free beads in a clump that are greater than or equal to the predetermined size; and
  wherein the processor is configured to control the magnetic field generator for at least one of magnetic field intensity or magnetic field frequency in order to determine whether the one or more potential magnetic bead-labeled target cells include the magnetic bead-labeled target cell or the free beads.

Embodiment 10. The apparatus of embodiments 1-9:
  wherein the one or more potential magnetic bead-labeled target cells includes contaminants that are greater than or equal to the predetermined size;

wherein the processor is configured to control the magnetic field generator in order to determine whether the one or more potential magnetic bead-labeled target cells include the magnetic bead-labeled target cell or the contaminants;

wherein, responsive to determining that the one or more potential magnetic bead-labeled target cells does not move responsive to an applied magnetic field, the processor is configured to label the one or more potential magnetic bead-labeled target cells as an obstacle; and wherein the processor is configured to sort the magnetic bead-labeled target cell to the at least one outlet by avoiding the obstacle.

Embodiment 11. The apparatus of embodiments 1-10:

wherein the processor is configured to identify the magnetic bead-labeled target cell and the associated location within the well by:

performing imaging in order to identify a plurality of potential magnetic bead-labeled target cells within the well and associated locations for the plurality of potential magnetic bead-labeled target cells; and select, based on the associated locations for the plurality of potential magnetic bead-labeled target cells, one or more wires to send current through in order to generate an applied magnetic field to determine which of the plurality of potential magnetic bead-labeled target cells moves responsive to the applied magnetic field.

Embodiment 12. The apparatus of embodiments 1-11:

wherein the magnetic field generator includes a plurality of wires on multiple layers; and wherein the processor is configured to select a common wire to send current through in order to generate the applied magnetic field based on the common wire being proximate to each of the plurality of potential magnetic bead-labeled target cells.

Embodiment 13. The apparatus of embodiments 1-12:

wherein the processor is configured to identify the magnetic bead-labeled target cell and the associated location within the well by:

performing imaging in order to identify one or more potential magnetic bead-labeled target cells within the well and associated locations for the one or more potential magnetic bead-labeled target cells; and generate, for the one or more potential magnetic bead-labeled target cells, an applied magnetic field in a variety of directions at the associated locations, wherein the variety of directions varies by at least 45°.

Embodiment 14. The apparatus of embodiments 1-13:

wherein the processor is configured to control the magnetic field generator in order to perform magnetic bead-labeled target cell identification of one or more magnetic bead-labeled target cells within the well and to control the magnetic field generator in order to perform magnetic bead-labeled target cell sorting of the one or more magnetic bead-labeled target cells to the at least one outlet; and wherein the control of the magnetic field generator in order to perform magnetic bead-labeled target cell identification is different than the control of the magnetic field generator in order to perform magnetic bead-labeled target cell sorting.

Embodiment 15. The apparatus of embodiments 1-14:

wherein the control of the magnetic field generator in order to perform magnetic bead-labeled target cell identification comprises applying a magnetic field localized to the associated location of the magnetic bead-labeled target cell whereas the control of the magnetic field generator in order to perform magnetic bead-labeled target cell sorting is across at least a region of the well in order to move the one or more magnetic bead-labeled target cells to the at least one outlet.

Embodiment 16. The apparatus of embodiments 1-15:

wherein the magnetic field generator comprises at least a first layer of wires and a second layer of wires;

wherein the first layer of wires are configured to generate magnetic fields in order to primarily move the one or more magnetic bead-labeled target cells to the at least one outlet; and wherein the second layer of wires are configured to generate magnetic fields in order to primarily avoid one or more obstacles as the one or more magnetic bead-labeled target cells move to the at least one outlet.

Embodiment 17. The apparatus of embodiments 1-16:

wherein the first layer of wires has a chevron pattern; and wherein the second layer of wires has a complementary-chevron pattern.

Embodiment 18. The apparatus of embodiments 1-17:

wherein the well includes a number of outlets, the number being greater than one; and wherein the magnetic field generator comprises a wire pattern, the wire pattern include the number of sections, with the wire pattern in each section tailored to moving the magnetic bead-labeled target cell to its respective outlet.

Embodiment 19. The apparatus of embodiments 1-18:

wherein the well includes a plurality of outlets;

wherein the processor is configured to:

identify multiple magnetic bead-labeled target cells; and control the magnetic field generator in order to move the multiple magnetic bead-labeled target cells toward a respective outlet such that the magnetic bead-labeled target cells move at least partly simultaneously.

Embodiment 20. The apparatus of embodiments 1-19:

further comprising means for extracting the magnetic bead-labeled target cell from the at least one outlet.

Embodiment 21. A method for performing any of the functions recited in embodiments 1-20:

further comprising means for extracting the magnetic bead-labeled target cell from the at least one outlet.

Embodiment 22. A method for determining whether a magnetic bead-labeled target cell is present in a fluid, the method comprising:

performing magnetic bead-labeled target cell identification of one or more magnetic bead-labeled target cells within a well; and performing magnetic bead-labeled target cell sorting of the one or more magnetic bead-labeled target cells to at least one outlet of the well, wherein applied magnetic fields used for performing the magnetic bead-labeled target cell identification are different than the applied magnetic fields used for performing magnetic bead-labeled target cell sorting.

Embodiment 23. The method of embodiment 22:

wherein performing magnetic bead-labeled target cell identification comprises analyzing one or more particles in the well for movement responsive to the applied magnetic fields in order to determine whether the one or more particles are the one or more magnetic bead-labeled target cells or are one or more obstacles; and wherein performing magnetic bead-labeled target cell sorting uses both locations of the one or more magnetic bead-labeled target cells and the one or more obstacles in order to sort the one or more magnetic bead-labeled target cells into the at least one outlet.

Embodiment 24. The method of embodiments 22 or 23:
wherein performing magnetic bead-labeled target cell identification comprises analyzing size of the one or more particles and analyzing applied magnetic field response in order to determine whether the one or more particles are the one or more magnetic bead-labeled target cells.

Embodiment 25: A system comprising:
a processor; and
a non-transitory machine-readable medium comprising instructions that, when executed by the processor, cause a computing system to perform a method according to any of embodiments 21-24 or to perform the functions recited in embodiments 1-20.

Embodiment 26: A non-transitory machine-readable medium comprising instructions that, when executed by a processor, cause a computing system to perform a method according to any of embodiments 21-24 or to perform the functions recited in embodiments 1-20.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claiamed is:

1. An apparatus configured to determine whether a magnetic bead- labeled target cell is present in a fluid containing particles, the apparatus comprising:
at least one magnetic field generator device configured to generate a magnetic field to at least a part of a structure, the structure configured to support the fluid containing the particles; and
at least one processor in communication with the at least one magnetic field generator device, the at least one processor configured to:
identify, based on image analysis indicative of size, at least one potential magnetic bead-labeled target cell in the fluid and at least one associated location for the at least one potential magnetic bead-labeled target cell;
identify, for the at least one potential magnetic bead-labeled target cell, at least one magnetic bead-labeled target cell by:
controlling the at least one magnetic field generator device to generate the magnetic field at the at least one associated location for the at least one potential magnetic bead-labeled target cell;
determining whether there is movement in the structure for the at least one potential magnetic bead-labeled target cell responsive to generating the magnetic field at the at least one associated location for the at least one potential magnetic bead-labeled target cell in order to determine that the at least one potential magnetic bead-labeled target cell is the at least one magnetic bead-labeled target cell and to determine an associated location of the at least one magnetic bead-labeled target cell;
control removing the at least one magnetic bead-labeled target cell from the structure.

2. The apparatus of claim 1, wherein the at least one potential magnetic bead-labeled target cell comprises any one of: the magnetic bead-labeled target cell; a particle not bound to a bead; or free beads in a clump; and
wherein the at least one processor is configured to control the at least one magnetic field generator device in order to generate a targeted magnetic field within the structure based on the at least one associated location to generate the movement for the at least one potential magnetic bead-labeled target cell.

3. The apparatus of claim 1, wherein the at least one processor is configured to identify, based on the image analysis indicative of size, a plurality of potential magnetic bead-labeled target cells in the fluid and associated locations for the plurality of potential magnetic bead-labeled target cells; and
wherein the at least one processor is configured to determine, from the plurality of potential magnetic bead-labeled target cells, whether any of the plurality of potential magnetic bead-labeled target cells are the magnetic bead-labeled target cell by:
controlling the at least one magnetic field generator device such that a magnetic field is generated at the associated locations for the plurality of potential magnetic bead-labeled target cells; and
determining whether there is the movement within the structure greater than a predetermined amount for the plurality of potential magnetic bead-labeled target cells responsive to generating the magnetic field at the associated locations for the plurality of potential magnetic bead-labeled target cells in order to determine that the plurality of potential magnetic bead-labeled target cell are magnetic bead-labeled target cells and to determine associated locations of the magnetic bead-labeled target cells.

4. The apparatus of claim 1, wherein the at least one processor is configured to identify, based on the image analysis indicative of size, the at least one potential magnetic bead-labeled target cell in the fluid and the at least one associated location for the at least one potential magnetic bead-labeled target cell by:
obtaining at least one image of the structure;
identifying one or more particles within the at least one image;
determining which of the one or more particles is greater than or equal to a predetermined size; and
identifying the one or more particles that are greater than or equal to the predetermined size as the at least one potential magnetic bead-labeled target cell.

5. The apparatus of claim 4, wherein the at least one processor is configured to compare at least one image of the structure without the fluid containing the particles and at least one image of the structure with the fluid containing the particles in order to identify the one or more particles within the at least one image of the structure with the fluid.

6. The apparatus of claim 4, wherein the at least one potential magnetic bead-labeled target cell includes particles not bound to a bead that are greater than or equal to the predetermined size;
wherein the at least one processor is configured to control the at least one magnetic field generator device in order to determine whether the at least one potential magnetic bead-labeled target cell include the magnetic bead-labeled target cell or the particles not bound to a bead; and wherein, responsive to determining that the at least one potential magnetic bead-labeled target cell does not move responsive to an applied magnetic field, the at least one processor is configured to label the at least one potential magnetic bead-labeled target cell as an obstacle.

7. The apparatus of claim 1, wherein the at least one processor is configured to:
generate, for the at least one potential magnetic bead-labeled target cell, applied magnetic fields in a variety of directions at the at least one associated location; and
responsive to the applied magnetic fields in the variety of directions, determine whether there is movement for the at least one potential magnetic bead-labeled target cell.

8. The apparatus of claim 1, wherein the structure includes a number of outlets, the number being greater than one; and
wherein the at least one magnetic field generator device comprises a wire pattern, the wire pattern include a number of sections, with the wire pattern in each section tailored to moving the magnetic bead-labeled target cell to its respective outlet.

9. The apparatus of claim 1, wherein the at least one processor is configured to control the at least one magnetic field generator device to generate magnetic fields at least one of different frequencies or different strengths;
wherein the at least one processor is configured to determine whether the at least one potential magnetic bead-labeled target cell is the magnetic bead-labeled target cell by analyzing the images for movement of the at least one potential magnetic bead-labeled target cell under the magnetic fields at the at least one of different frequencies or different strengths.

10. The apparatus of claim 9, wherein the at least one processor is configured to control the at least one magnetic field generator device to generate magnetic fields at the different frequencies in order to differentiate between free beads and the magnetic bead-labeled target cell.

11. The apparatus of claim 9, wherein the at least one processor is configured to control the at least one magnetic field generator device to generate magnetic fields at the different strengths in order to differentiate between free beads and the magnetic bead-labeled target cell.

12. The apparatus of claim 1, wherein the at least one processor is configured to control removing the at least one magnetic bead-labeled target cell from the structure by controlling the at least one magnetic field generator device.

13. The apparatus of claim 12, wherein the at least one processor is configured to control the at least one magnetic field generator device by controlling a magnetic tip.

14. The apparatus of claim 1, wherein the at least one processor is configured to identify, based on the image analysis indicative of size, a plurality of potential magnetic bead-labeled target cells in the fluid and associated locations for the plurality of potential magnetic bead-labeled target cells; and
wherein the at least one processor identify, for each of the plurality of potential magnetic bead-labeled target cells, at least one magnetic bead-labeled target cell by:
controlling the at least one magnetic field generator device to generate the magnetic field at the associated location for a respective potential magnetic bead-labeled target cell;
determining whether there is movement in the structure for the respective potential magnetic bead-labeled target cell responsive to generating the magnetic field at the associated location for the respective potential magnetic bead-labeled target cell in order to determine that the respective potential magnetic bead-labeled target cell is the at least one magnetic bead-labeled target cell and to determine an associated location of the at least one magnetic bead-labeled target cell.

15. The apparatus of claim 1, further comprising one or more sensors configured to generate sensor data; and
wherein the at least one processor is configured analyze the sensor data in order to perform the image analysis.

16. The apparatus of claim 1, wherein the at least one processor is further configured to:
responsive to not determining the movement within the structure for the at least one potential magnetic bead-labeled target cell, identifying the at least one potential magnetic bead-labeled target cell as not the at least one magnetic bead-labeled target cell.

17. The apparatus of claim 1, further comprising at least one camera;
wherein the at least one camera is configured to generate at least one image in order for the at least one processor to identify the at least one potential magnetic bead-labeled target cell;
and wherein the at least one camera is configured to generate one or more images in order for the at least one processor to determine whether there is the movement for the at least one potential magnetic bead-labeled target cell.

18. The apparatus of claim 1, wherein the at least one processor is configured to determine whether there is movement for the at least one potential magnetic bead-labeled target cell based on magnetic sensor data.

19. The apparatus of claim 18, further comprising a plurality of magnetic sensors configured to generate the magnetic sensor data.

20. The apparatus of claim 1, further comprising a magnetic tip on a robotic arm;
wherein the at least one processor is configured to control removing the at least one magnetic bead-labeled target cell from the structure by controlling the robotic arm.

21. The apparatus of claim 1, wherein the at least one processor is configured to control removing the at least one magnetic bead-labeled target cell based on the associated location of the at least one magnetic bead-labeled target cell.

* * * * *